(12) United States Patent
Dattawadkar

(10) Patent No.: US 11,304,059 B2
(45) Date of Patent: Apr. 12, 2022

(54) TECHNIQUES FOR DETERMINING AUTHENTICITY OF AN ITEM

(71) Applicant: Vyoma Software Inc., Cupertino, CA (US)

(72) Inventor: Milind Dattawadkar, Cupertino, CA (US)

(73) Assignee: VYOMA SOFTWARE INC., Cupertino, CA (US)

( * ) Notice: Subject to any disclaimer, the term of this patent is extended or adjusted under 35 U.S.C. 154(b) by 299 days.

(21) Appl. No.: 16/530,958

(22) Filed: Aug. 2, 2019

(65) Prior Publication Data
US 2020/0045538 A1 Feb. 6, 2020

Related U.S. Application Data

(60) Provisional application No. 62/714,603, filed on Aug. 3, 2018, provisional application No. 62/767,460, filed on Nov. 14, 2018.

(51) Int. Cl.
*H04W 12/77* (2021.01)
*G06F 16/955* (2019.01)
(Continued)

(52) U.S. Cl.
CPC .......... *H04W 12/77* (2021.01); *G06F 16/955* (2019.01); *G06Q 30/0609* (2013.01); *H04L 9/0643* (2013.01); *H04L 2209/56* (2013.01)

(58) Field of Classification Search
CPC ................ H04W 12/77; G06F 16/955; G06Q 30/0609; H04L 9/0643; H04L 2209/56;
(Continued)

(56) References Cited

U.S. PATENT DOCUMENTS 9,641,342 B2   5/2017 Sriram et al.
10,810,167 B1 * 10/2020 Mahajan ............... H04L 9/0637
(Continued)

OTHER PUBLICATIONS

Transcript for YouTube video "SigmaLedgerHelp Combat Products Counterfeiting and Illegal Re-Import" https://youtu.be/s4IXSJsxW0k (total length of video: 2:15) retrieved from sigmaledger.com, 6 pages.
(Continued)

*Primary Examiner* — Mohammad W Reza
(74) *Attorney, Agent, or Firm* — Kilpatrick Townsend & Stockton LLP

(57) ABSTRACT

Techniques are described for verifying the authenticity an item using a computer network comprising a plurality of databases associated with various entities in a chain of ownership of the item. The databases store records of transactions involving transfers of ownership of the item, along with other authenticity relevant information. In some embodiments, an item is deemed to be authentic upon determining, based on information stored in the databases, at least the following: that an item identifier, received from a device associated with an entity requesting authenticity verification, exists in a database associated with a manufacturer of the item; that an entity offering the item for sale is associated with the manufacturer; and that a database associated with the entity offering the item for sale (1) contains an entry corresponding to the item identifier and (2) the entry indicates the item is available for sale by that entity.

20 Claims, 32 Drawing Sheets

(51) Int. Cl.
  *G06Q 30/06* (2012.01)
  *H04L 9/06* (2006.01)
(58) Field of Classification Search
  CPC ..... H04L 63/12; H04L 9/3297; H04L 9/3239; H04L 2209/38
  See application file for complete search history.

(56) References Cited

U.S. PATENT DOCUMENTS

| | | |
|---|---|---|
| 2017/0262862 A1 | 9/2017 | Aljawhari |
| 2018/0137503 A1 | 5/2018 | High et al. |
| 2018/0174097 A1 | 6/2018 | Liu et al. |
| 2018/0211213 A1 | 7/2018 | Vivier |
| 2020/0045538 A1* | 2/2020 | Dattawadkar ......... H04L 9/3297 |

OTHER PUBLICATIONS

Counterfeit Protection "Solution" retrieved from sigmaleder.com on Jul. 29, 2020, 1 page.
Counterfeit Protection "Solution > Typical cases" retrieved from sigmaleder.com on Jul. 29, 2020, 1 page.
Counterfeit Protection "Solution > Business Values" retrieved from sigmaleder.com on Jul. 29, 2020, 1 page.
Counterfeit Protection "Solution > Core Features" retrieved from sigmaleder.com on Jul. 29, 2020, 1 page.
Counterfeit Protection "Technology" retrieved from sigmaleder.com on Jul. 29, 2020, 1 page.
Supply Chain Transparency "Solution" retrieved from sigmaleder.com on Jul. 29, 2020, 1 page.
Supply Chain Transparency "Solution > Business Values" retrieved from sigmaleder.com on Jul. 29, 2020, 1 page.
Supply Chain Transparency "Solution > Core Features" retrieved from sigmaleder.com on Jul. 29, 2020, 1 page.
Supply Chain Transparency "Technology" retrieved from sigmaleder.com on Jul. 29, 2020, 1 page.
Digital Direct Marking "Solution" retrieved from sigmaleder.com on Jul. 29, 2020, 1 page.
Digital Direct Marking "Solution > Business Values" retrieved from sigmaleder.com on Jul. 29, 2020, 1 page.
Digital Direct Marking "Solution > Core Features" retrieved from sigmaleder.com on Jul. 29, 2020, 1 page.
Digital Direct Marking "Technology" retrieved from sigmaleder.com on Jul. 29, 2020, 1 page.
Hughes, "ScryptoTrace App Helps Fight Counterfeiting," EPM Magazine, published on May 13, 2016, https://www.epmmagazine.com/technology/scryptotrace-app-helps-fight-counterfeiting/, retrieved on Jul. 29, 2020, 3 pages.

* cited by examiner

TECHNIQUES FOR DETERMINING AUTHENTICITY OF AN ITEM

CROSS-REFERENCES TO RELATED APPLICATIONS

This application claims the benefit of and priority to U.S. Provisional Application No. 62/714,603 filed Aug. 3, 2018, entitled "TECHNIQUES FOR DETERMINING AUTHENTICITY OF AN ITEM." This application also claims the benefit of and priority to U.S. Provisional Application No. 62/767,460 filed Nov. 14, 2018, entitled "TECHNIQUES FOR DETERMINING AUTHENTICITY OF AN ITEM." The contents of U.S. Provisional Application Nos. 62/714,603 and 62/767,460 are incorporated herein in their entirety for all purposes.

TECHNICAL BACKGROUND

The present disclosure relates generally to computer implemented techniques for determining the authenticity of an item (e.g., a product offered for sale by a retailer). A distributed computing infrastructure is provided that is configured to, on demand, check for and determine the authenticity of an item.

BACKGROUND

In today's market, products are sold through multiple channels such as through multiple Internet retailers, through brick-and-mortar retail channels with a physical point of presence, through other types of channels, and combinations thereof. Given the complexities of these channels and distribution chains, ascertaining the authenticity of an item or product is a big challenge not only for the end consumer of the items but also for the various entities (e.g., distributors and retailers) involved in the chain of ownership leading to the end consumer. For example, the end consumer wants to know that the items they are purchasing are authentic and not fake or counterfeit. Manufacturers and retailers also wish to prove to their customers that the products they are offering or selling are authentic. This is especially important for products sold via the Internet where the end consumer is not able to physically scrutinize the item to-be-purchased to determine whether it is authentic or fake.

Authentic means that an item is what the item is claimed to be. For instance, when a retailer offers a product for sale, the retailer is asserting, at least implicitly, that the product is of a certain origin (e.g., from a particular manufacturer) and has certain attributes (e.g., the product is a particular model of an item made by the manufacturer). The retailer also asserts, at least implicitly, that the retailer is the current rightful owner of the item (e.g., that the retailer acquired the item directly from the manufacturer, through a distributor, or from another retailer, and that the retailer has not yet sold the item). Checking the authenticity of an item refers to checking if the item is what it is claimed to be. This involves checking the item's identity and its origin or parentage. For instance, when a retailer offers a particular product for sale, for example, a perfume from a particular brand, checking the authenticity of the product involves determining that the particular product is indeed manufactured or backed by the brand and has a certain origin (e.g., is from a particular manufacturer). Checking the authenticity of the product also involves ascertaining that the product has certain attributes. For example, if the product is a perfume, checking the authenticity of the perfume may involve verifying one or more attributes of the perfume (e.g., perfume name, bottle size, product code, etc.). Checking the authenticity of the product may also include determining that the retailer selling the particular product has the right to sell that product. For example, checking that the retailer legally acquired the right to sell the product (e.g., the retailer acquired the product directly from the manufacturer, or through an entity (e.g., a distributor or another retailer) in the chain of ownership and the current retailer has not yet sold the item.

Some existing solutions that attempt to solve the authenticity problem include, for example, near-field communication (NFC) based chips attached to products. A typical NFC chip contains a code identifying a product. Some NFC chips contain unique product codes. When scanning an NFC chip, the user is directed to a web site, usually that of the manufacturer, that will display a message indicating whether the product is authentic or not. However, the user typically does not know which web site the user will be directed to upon scanning the code. A counterfeiter could potentially create a fake code and set up a web site to which the user is directed upon scanning an NFC chip containing the fake code, thereby misleading the user into believing the product is authentic. Other examples include embedding authenticity information onto the product packaging or in the product itself. Another solution is to use artificial intelligence and machine learning based platforms to detect counterfeit products or retailers who sell counterfeit products. However, these solutions have shortcomings such as not being cost effective, being easily circumvented (e.g., as explained above, NFC chips are subject to counterfeiting), being unable to protect privacy of the consumer, and so on.

BRIEF SUMMARY

The present disclosure relates generally to computer implemented techniques for determining the authenticity of an item (e.g., a product offered for sale by a retailer). A distributed computing infrastructure is provided that is configured to, on demand, check for and determine the authenticity of an item. In certain embodiments, techniques are described for tracking ownership of an item and, more particularly, to techniques (e.g., a method, a system, and a computer-readable code stored in non-transitory memory and executed by one or more processors) for determining the authenticity of an item using a distributed computing infrastructure comprising one or more computers and computer networks (e.g., over the Internet). In some embodiments, the techniques may be implemented using a private network of computers that responds to a request from a user (e.g., a potential consumer interested in purchasing an item) to check the authenticity of the item. This private network may be operated or managed by an authenticity service provider (ASP) where the services provided by the ASP include a service to, on demand, verify the authenticity of items for a user requesting the service. The infrastructure or system for verifying the authenticity of items may include various computing devices communicatively coupled to one another via one or more communication networks. The computing devices may include computers of various types including, but not limited to, mobile devices (e.g., a smartphone or tablet), non-mobile devices (e.g., a desktop, a point-of-sale machine at a brick-and-mortar store, or a physical server), and the like.

In certain embodiments, the infrastructure or system (referred to herein as an "authenticity infrastructure) verifying the authenticity of items may include one or more computer systems communicatively coupled to each other via one or more communication networks. The infrastructure or system may store information about items and this information is used to perform the authenticity verification. For example, information regarding the items may be stored in one or more databases accessible to the one or more computer systems.

In certain embodiments, techniques are described for determining the authenticity of an item in both a physical retail environment (e.g., a physical store) and an electronic commerce (ecommerce) environment (e.g., an online store hosted on the Internet). In certain embodiments, a user is able to check the authenticity of an item being sold on an ecommerce site or in a physical store by a retailer using a mobile application (app), for example, before they make their purchase decision. Information provided by the retailer for the item is used for performing the authenticity check. As will be explained below, the retailer provided information can include various pieces of information related to the item itself and/or related to the identity of the retailer. The retailer provided information can be provided in different forms, such as a machine-readable code (e.g., a barcode and/or a Quick Response (QR) code) or in plain text, and is used to determine whether the item is authentic. For example, the authenticity infrastructure can use the retailer provided information to look up information in the one or more databases maintained by the authenticity infrastructure to determine whether the retailer has been registered with the authenticity infrastructure, whether the retailer is a member of the chain of ownership originating with the manufacturer, and whether the item matches an item in a record maintained for the manufacturer.

As part of determining the authenticity of the item, the authenticity infrastructure may also check the information stored in the one or more databases to confirm that the retailer is the current owner of the item (e.g., based on a database entry indicating that the item exists in an inventory of the retailer and has not yet been sold to a consumer). In certain embodiments, ownership of the item is further verified by the authenticity infrastructure checking against a database comprising transaction records associated with every entity in the chain of ownership to locate a record of a transaction transferring ownership to the retailer. This database of transaction records may comprise a master ledger (e.g., a ledger associated with the manufacturer or some other trusted entity).

In certain embodiments, after an item has been determined to be authentic by the authenticity infrastructure and the item is later purchased by a user, the authenticity infrastructure may generate for the user a digital certificate of authenticity, which is then provided to the user. In certain embodiments, the authenticity infrastructure may store the authenticity certificate on behalf of the user (e.g., in a consumer database) and make the authenticity certificate available to the user, e.g., accessible on-demand over the Internet.

In certain embodiments, the functionality provided by the authenticity infrastructure may be offered as a cloud or web service, for example, by an ASP. The ASP may host a private computer network comprising multiple nodes, including a node for each entity involved in the chain of ownership and for multiple items. For example, for an item, the private computer network may include a node for the manufacturer of the item and additional nodes for other entities in the chain of ownership. This private network may comprise multiple nodes for various entities in the chain of ownership, such as nodes for the manufacturer, one or more retailers, one or more distributors, and the like. Each node may be implemented using a computer system having access to information stored for the item (such as a database storing item information and/or information about transactions transferring ownership of the item between entities).

In certain embodiments, a system comprising one or more processors is configured to perform a method implemented using instructions that are stored in a memory coupled to the one or more processors. The method involves receiving, by a computer system and through a computer network, information from a requester device, the information including an item identifier identifying an item; and searching, by the computer system, a first database to determine that the item identifier exists in the first database, the first database storing a plurality of item identifiers, each item identifier of the plurality of item identifiers corresponding to an item whose authenticity is verifiable. The method further involves identifying, by the computer system, a manufacturer based upon the item identifier; searching, by the computer system, a second database associated with the manufacturer to determine that the second database stores a first entry corresponding to the item identifier, the first entry indicating that the item identified by the item identifier is manufactured by the manufacturer; and receiving, by the computer system, an entity identifier from the requester device, the entity identifier identifying an entity offering the item for sale. The method further involves searching, by the computer system, the first database to determine that the first database stores an association between the entity and the manufacturer; searching, by the computer system, a third database associated with the entity to determine that the third database stores a second entry corresponding to the item identifier; and determining, by the computer system, that the second entry contains information indicating that the item is available for sale by the entity. The method further involves generating, by the computer system, a message indicating successful authenticity verification of the item due to the item being manufactured by the manufacturer, the entity being associated with the manufacturer, the second entry corresponding to the item identifier, and the second entry containing information indicating that the item is available for sale by the entity; and communicating, by the computer system and through the computer network, the message to the requester device.

The foregoing, together with other features and embodiments will become more apparent upon referring to the following specification, claims, and accompanying drawings.

DETAILED DESCRIPTION

Figure 1:
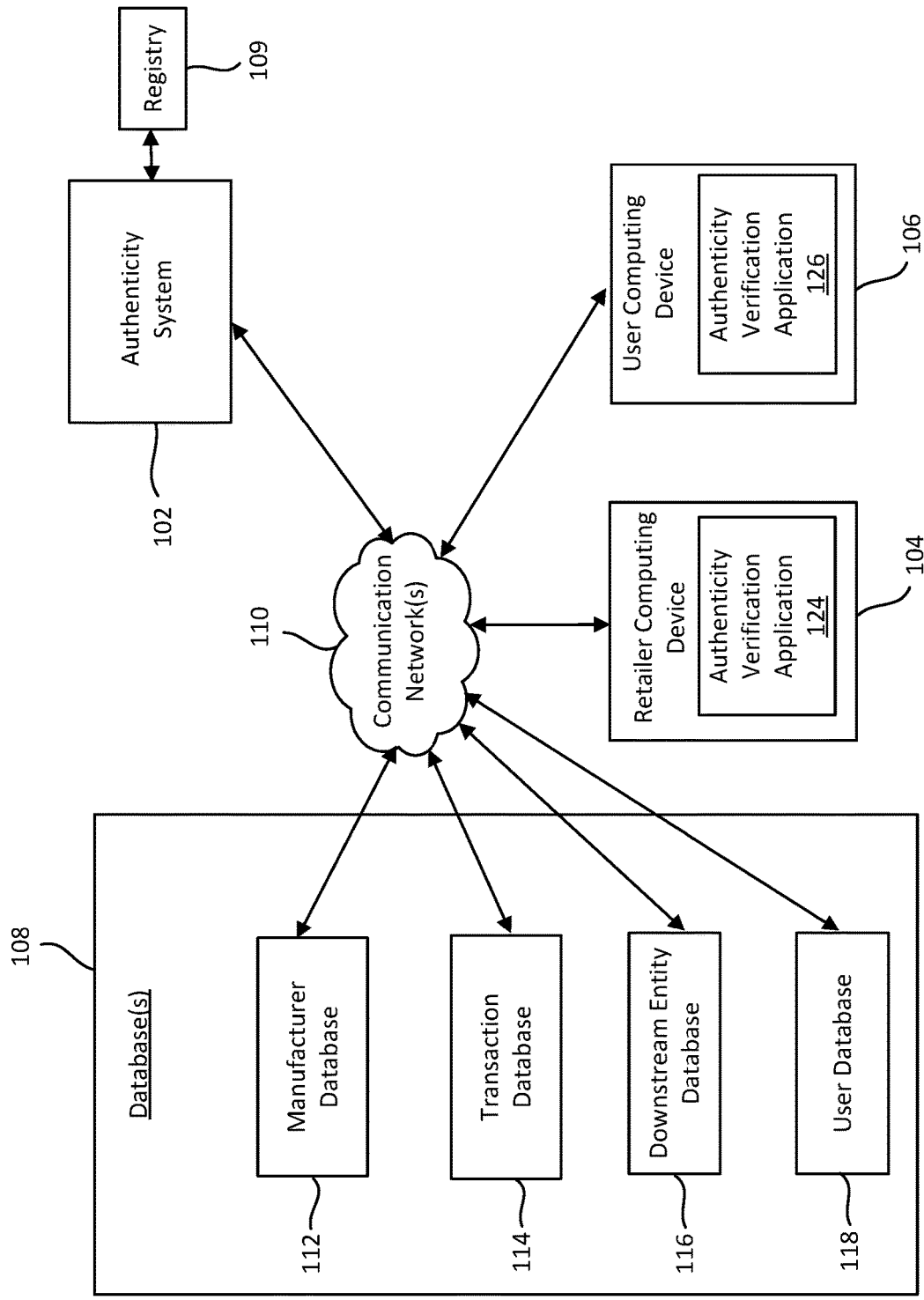
FIG. 1 illustrates a computing environment implementing an authenticity infrastructure according to certain embodiments.

In the following description, for the purposes of explanation, specific details are set forth in order to provide a thorough understanding of embodiments of the present disclosure. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates generally to computer implemented techniques for determining the authenticity of an item (e.g., a product offered for sale by a retailer). A distributed computing infrastructure is provided that is configured to, on demand, check for and determine the authenticity of an item. In certain embodiments, techniques are described for tracking ownership of an item and, more particularly, to techniques (e.g., a method, a system, and a computer-readable code stored in non-transitory memory and executed by one or more processors) for determining the authenticity of an item using a distributed computing infrastructure comprising one or more computers and computer networks (e.g., over the Internet). In some embodiments, the techniques may be implemented using a private network of computers that responds to a request from a user (e.g., a potential consumer interested in purchasing an item) to check the authenticity of the item. This private network may be operated or managed by an authenticity service provider (ASP) where the services provided by the ASP include a service to, on demand, verify the authenticity of items for a user requesting the service. The infrastructure or system for verifying the authenticity of items may include various computing devices communicatively coupled to one another via one or more communication networks. The computing devices may include computers of various types including, but not limited to, mobile devices (e.g., a smartphone or tablet), non-mobile devices (e.g., a desktop, a point-of-sale machine at a brick-and-mortar store, or a physical server), and the like.

For purposes of this disclosure, the term "authenticity infrastructure" is used to refer to a system or infrastructure that is configured to verify the authenticity of an item. For example, in certain embodiments, the authenticity infrastructure may be provided by an ASP. In response to a request to check the authenticity of a particular item, the authenticity infrastructure is configured to check the authenticity of the particular item and then provide information (authentication information) indicative of the authenticity of the item to the requesting user. The authentication information provided to the user may include information indicative of whether or not the particular item was deemed to be authentic by the authenticity infrastructure. The authentication information may include information indicative of the item's identity and its origin or parentage. The authentication information may also include information indicative of whether the retailer selling the particular item has the right to sell that item.

The authenticity infrastructure may include one or more computing systems communicatively coupled to each other via one or more communication networks. The authenticity infrastructure may store information about items and this information is used to perform the authenticity verification. For example, information regarding the items may be stored in one or more databases accessible to computing systems within the authenticity infrastructure. The authenticity infrastructure can thus store information that can be queried by a user to determine the authenticity of an item. The authenticity infrastructure enables information related to items whose authenticity can be verified to be stored and tracked in a distributed and secure manner. The item-related information is stored by the authenticity infrastructure in a manner that makes it difficult to be hacked or changed. For example, certain embodiments involve generating a cryptographic hash based on details of a transaction and storing the cryptograph hash in a record created for the transaction so that alterations in the recorded details of the transaction can be detected using the hash. In some embodiments, a unique code is stored in association with a product identifier by a trusted entity and an item is deemed authentic only if the same unique code is also stored in associated with the product identifier in a database associated with a retailer.

Accordingly to a typical use case, a user may, prior to the purchase of a particular item, send a request to the authenticity infrastructure to determine the authenticity of the item. The authenticity infrastructure may then, based upon the stored information, respond to the user's request with authenticity information that is indicative of the item's authenticity. In some embodiments, the authenticity information may include an authenticity certificate as proof that the authenticity of the item has been successfully verified by the authenticity infrastructure.

Given the complexities of modern sales and distribution channels, an item may change ownership multiple times before reaching an end user. For example, the item may be a product that is manufactured by a manufacturer M1. The item may then be sold by the manufacturer M1 to one or more retailers and/or one or more distributors, via one or more transactions. For example, a first transaction may transfer the ownership of the product from the manufacturer M1 to a first retailer R1, a second transaction may then transfer the product ownership from R1 to a second retailer R2, and so on until the product is with an "end" retailer that ultimately sells the item to the end user or consumer. In certain embodiments, information related to these various transactions is stored in a secure and distributed manner by the authenticity infrastructure. A user wishing to check the authenticity of the product prior to purchasing the product from the end retailer can do this by sending a request to the authenticity infrastructure. The authenticity infrastructure then responds to the user's request by providing authenticity information for the product. The authenticity information may indicate whether the product is authentic or not. In this manner, the authenticity infrastructure provides a mechanism that enables end users to determine the authenticity of products or items. The authenticity infrastructure also enables manufacturers to be notified, via the authenticity infrastructure, about fraudulent uses or counterfeiting of their products, e.g., based on users submitting reports about potential counterfeit sellers.

As indicated in the above example, an item can change hands after it is manufactured via multiple transactions. For example, the chain can include M1 to R1, R1 to R2, and so on to the "current" retailer and then to the end user or consumer. While the above description indicates use of the authenticity infrastructure by the end consumer, this is not intended to be limiting. Any of the entities in the chain of ownership can use the authenticity verification services provided by the authenticity infrastructure. For example, R1 may request an authenticity check prior to getting or purchasing rights to the product from M1. As another example, R2 may request an authenticity check prior to getting or purchasing rights to the product from R1. The "current" retailer may request an authenticity check prior to getting or purchasing rights to the product from an upstream entity in the chain. As described above, the end user may request an authenticity check prior to purchasing the product from the current retailer.

Authenticity Infrastructure

One or more embodiments of the present disclosure are directed to an authenticity infrastructure including a computer network that records transactions involving an item and/or other information relevant to determining or verifying the authenticity of an item. A chain of ownership can include multiple entities besides the manufacturer itself. For example, the chain may comprise at one or more distributors and one or more retailers. The authenticity infrastructure can include, for each entity in the chain, a node or computing system for the entity and a non-volatile memory accessible by the computing system, where the non-volatile memory stores (for example, in a database) information related to change of ownership transactions involving the item and that entity. Each entity in the chain can participate in the authenticity infrastructure by registering with the ASP, either directly, or through the manufacturer.

The authenticity infrastructure can employ various models for storing information relevant to determining or verifying the authenticity of an item. In some embodiments, a complete history of transactions involving an item is maintained in a single memory (e.g., a database associated with a manufacturer or a notary entity). In this manner, every transaction, from the time the item is sold or transferred by the manufacturer to a distributor/retailer to the time the item is ultimately sold or transferred to a consumer, may be recorded in a central location. Alternatively or additionally, the transaction history may be stored in a distributed fashion (e.g., with manufacturer, distributor, and retailer databases recording only those transactions to which the entity associated with the database is a party). For example, a retailer's database may store records of transactions between the retailer and other entities, but not transactions where the retailer is not involved.

Thus, in one model, the databases associated with entities downstream from the manufacturer store information about transactions involving only their associated entity, while the database associated with the manufacturer or notary stores information about all transactions irrespective of the entity involved. In another model, the databases associated with each entity in the chain of ownership (including the manufacturer) store information about transactions involving only their associated entity, with no single database storing all of the transactions. In yet another model, there is only one database (e.g., maintained by the node associated with the manufacturer or notary) and this single database stores information about all transactions.

FIG. 1 shows an example distributed environment 100 implementing an authenticity infrastructure according to certain embodiments. Distributed environment 100 comprises multiple systems communicatively coupled to each other via one or more communication networks 110. Communication networks 110 can include any number of wired and/or wireless networks. For example communication networks 110 may include the Internet, a cellular network, a WiFi network, and the like. The various systems in FIG. 1 include an authenticity infrastructure comprising an authenticity system 102 and a set of databases 108. The systems in FIG. 1 further include a retailer computing device 104 and a user computing device 106. Distributed environment 100 depicted in FIG. 1 is merely an example and is not intended to unduly limit the scope of claimed embodiments. One of ordinary skill in the art would recognize many possible variations, alternatives, and modifications. For example, in some implementations, distributed environment 100 may have more or fewer systems or components than those shown in FIG. 1, may combine two or more systems, or may have a different configuration or arrangement of systems. For example, although FIG. 1 shows only computing devices associated with one retailer and one user, in alternative embodiments, the distributed environment can include additional computing devices, including devices associated with a manufacturer, a distributor, additional retailers, etc.

As indicated above, in the embodiment depicted in FIG. 1, the authenticity infrastructure comprises an authenticity system 102 and databases 108. Authenticity system 102 may be implemented using one or more computer systems. Authenticity system 102 is configured to receive authenticity verification requests from requestors, and for each request, check the authenticity for the requested item and send a response indicative of the results of the authenticity verification back to the requestor.

Authenticity system 102 performs the authenticity verification based upon information stored in databases 108 that are accessible to authenticity system 102. In the embodiment depicted in FIG. 1, databases 108 include a manufacturer database 112, a transaction database 114, a downstream entity database 116 (e.g., a database associated with a retailer), and user database 118. Although FIG. 1 shows the databases 108 as a single block 108, the databases 108 are not necessarily co-located but may be distributed across one or more computing systems. In some embodiments, databases 108 can be part of the authenticity system 102. In certain embodiments, databases 108 can be hosted, managed, or maintained by an ASP. In some embodiments, such as the embodiment depicted in FIG. 21, at least some of the databases 108 are part of a private network. For example, a separate private network may be set up for each manufacturer. Transactions in one private network may be kept private within the network so as not to be shared with private networks of other manufacturers.

Authenticity system 102 has access to a registry 109 containing information about entities that are registered with the authenticity system 102. The information in registry 109 is indicative of which entities are authorized sellers of items for a particular manufacturer. For example, registry 109 may store information about manufacturers who are registered with the authenticity system 102 and, for each registered manufacturer, a list of retailer, distributors, or other downstream entities who are authorized to sell items manufactured by that particular manufacturer. In certain embodiments, downstream entities are registered via input from a manufacturer. For example, the manufacturer may communicate information about authorized retailers (e.g., seller name, country, location, etc.) to the authenticity system 102. Alternatively or additionally, a downstream entity can, in some embodiments, self-register by, for example, communicating their seller information together with information indicating which manufacturer(s) they are an authorized seller for. As part of registering with the authenticity system 102, a manufacturer or downstream entity may subscribe to the authenticity verification functionality or authenticity verification related services provided by the authenticity infrastructure.

Figure 28:
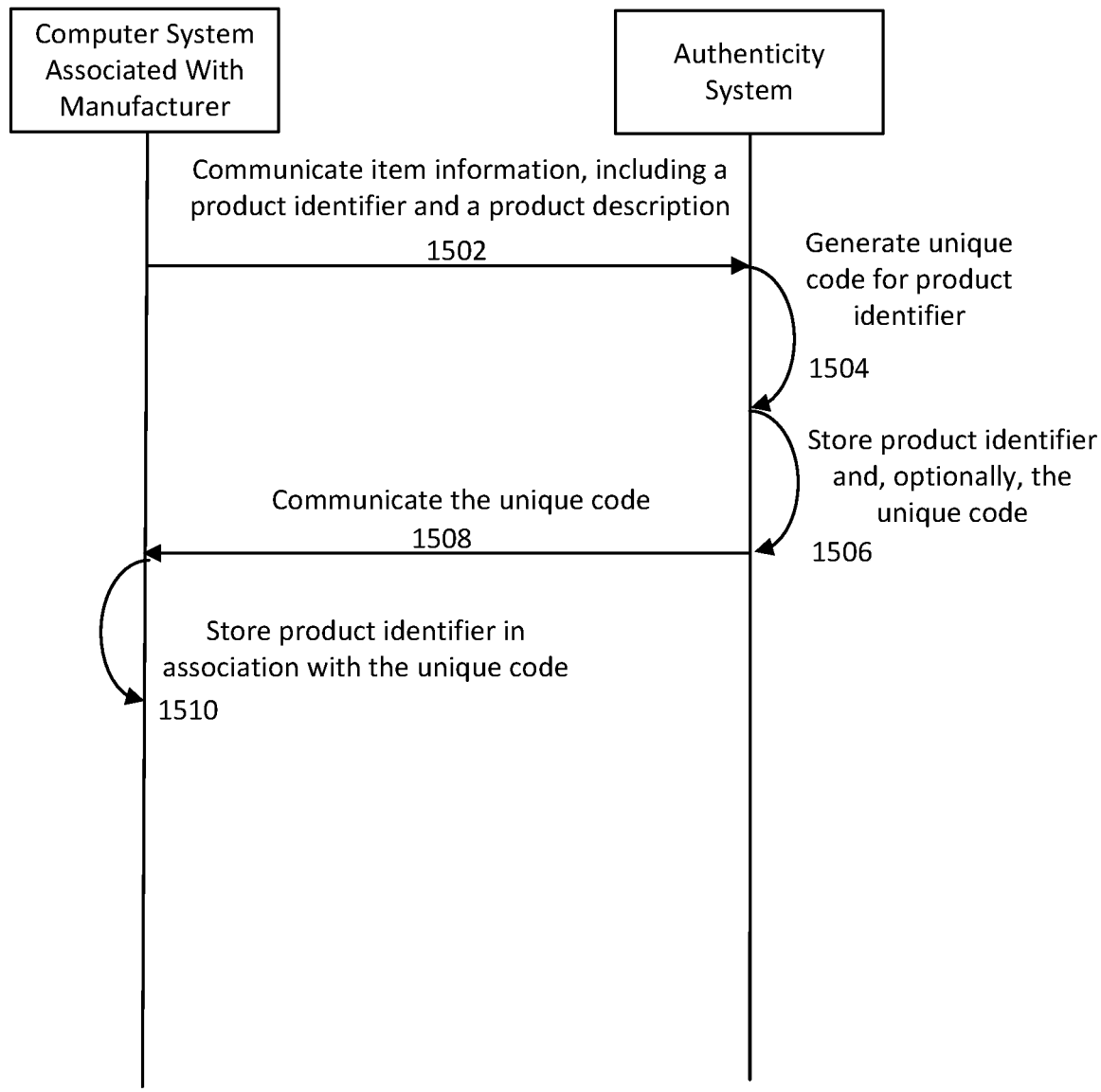
FIG. 28 illustrates a process for registering an item in an authenticity infrastructure according to certain embodiments.

Registry 109 is further configured to store information about items whose authenticity is verifiable using the authenticity infrastructure. In certain embodiments, in order for the authenticity verification functionality to be provided by the authenticity infrastructure for an item, the item is first registered with the authenticity system 102. As part of the item registration process, information about the item (e.g., a product identifier, a product description, and/or other product attributes) is communicated to the authenticity system 102 for storage in registry 109. The item information can be supplied by the item manufacturer. An example of item registration is depicted in FIG. 28 and involves storage of a product identifier and, optionally, a unique code generated for the item or a class of items (e.g., a batch of the same type of product).

Manufacturer database 112 is configured to store information related to items manufactured by a manufacturer. In some implementations, a separate manufacturer database 112 may be provided for each manufacturer that uses the authenticity verification functionality provided by the authenticity infrastructure. In certain embodiments, the manufacturer database 112 for a particular manufacturer may comprise a ledger of transactions involving that manufacturer. Such transactions may include, for example, the sale of an item by the manufacturer to a downstream entity. Alternatively or additionally, manufacturer database 112 may comprise an inventory database with records indicating what items have been manufactured by the manufacturer, which of the manufactured items have been sold and which still remain in the possession of the manufacturer, information about the downstream entities to which the items are sold, and the attributes of the manufactured items (e.g., serial number, part number, item description, etc.). For each transaction involving the manufacturer and an item, the manufacturer database 112 may include a record identifying details of the transaction, such as the date of the transaction, the entity to which the item was sold, attributes of the sold item, and the like.

Figure 23:
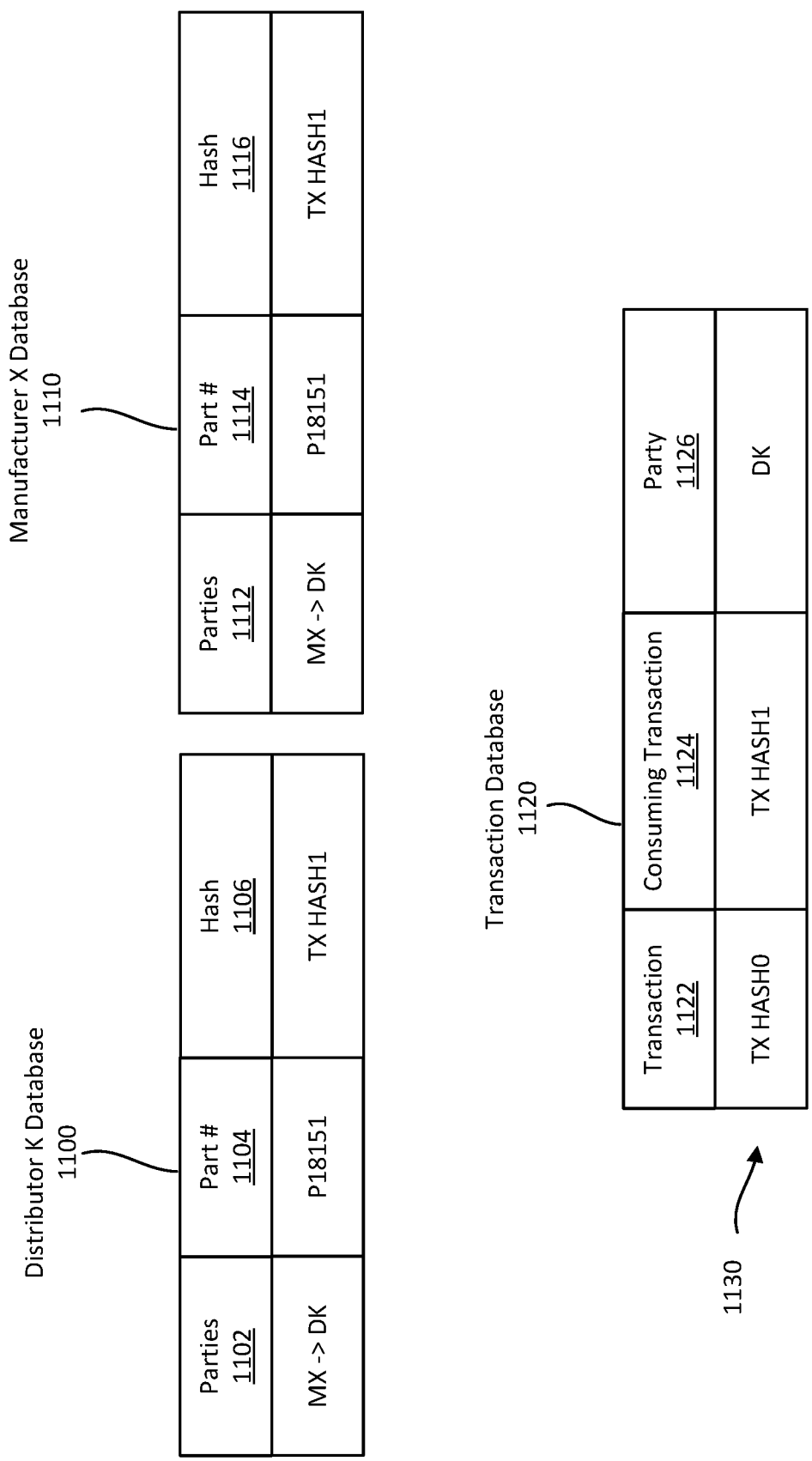
FIG. 23 illustrates databases updated to reflect the transaction in FIG. 22 according to certain embodiments.

An example manufacturer database 1110 showing a single record is depicted in FIG. 23. The manufacturer database 1110 includes a parties field 1112 identifying the parties involved in the transaction (manufacturer X to distributor K), a part number field 1114 identifying the part number of the item involved in the transaction, and a hash field 1116 identifying a cryptographic hash of the transaction record.

In general, information stored in any of the databases 108 for a transaction involving an item may include information identifying the participants in the transaction (e.g., name, location and/or country), information identifying the item (e.g., product identifier, serial number, and/or batch number), a date and/or timestamp for the transaction, and other transaction related information. Additionally, in some embodiments, each transaction record may include a cryptographic hash generated based on details of the transaction (e.g., a timestamp of when the transaction was executed, a serial number of the item, and/or other transaction information). Because the hash is generated based on details of the transaction, attempts to alter the recorded details of the transaction can be detected by, for example, regenerating the hash using the same algorithm and comparing the regenerated hash to the hash in the transaction record. If the hashes do not match, this indicates that the record has been altered. Further, in some embodiments, each participant may be issued a digital certificate with which a transaction record for a transaction involving that participant is signed. For example, a record for sale of an item from a distributor to a retailer may be signed by the distributor and the retailer (and optionally, the manufacturer) as proof that the transaction was authorized or accepted by the distributor and the retailer.

As indicated earlier, an item may undergo multiple changes of ownership as the item moves along a chain of ownership. For example, the item may be sold by a manufacturer to a first retailer or distributor, who may sell it to a second retailer/distributor, and so on, and then at some point the item may be made available for purchase to an end consumer or user. Accordingly, ownership of the item could pass from the manufacturer to zero or more entities downstream from the manufacturer (e.g., a retailer, a distributor, or some other downstream entity) before the item is made available to the end consumer. A downstream entity database 116 may be provided for each such downstream entity for storing information related to transactions involving the item and that downstream entity. For example, the downstream entity database 116 for a particular retailer may comprise a ledger of transactions involving the particular retailer and the item. Such transactions may include, for example, the retailer purchasing an item from a distributor or another retailer, or the retailer selling an item to another retailer or an end consumer.

An example downstream entity database 1100 for a distributor showing a single record is depicted in FIG. 23. The distributor database 1100 includes a parties field 1102 identifying the parties involved in the transaction (manufacturer X to distributor K), a part number field 1104 identifying the part number for the item involved in the transaction, and a hash field 1106 identifying a cryptograph hash generated for the transaction.

Transaction database 114 may comprise a master ledger storing information for all transactions involving items whose authenticity can be verified using the authenticity infrastructure. As such, for a particular item, the transaction database 114 stores information representative of a complete history of all transfers in the ownership of that particular item among various entities in the chain of ownership of the item starting with the manufacturer. The records stored in the transaction database 114 can, but need not be identical to records stored in other databases in the databases 108. FIG. 23 shows an example of such a transaction database, which can be a database associated with a notary entity (e.g., the ASP or some other trusted entity). In the embodiment of FIG. 23, a transaction database 1120 is configured to store transaction records which contain cryptographic hashes generated for individual transactions, and which further contain information indicating which party is the recipient for each transaction (except in the special case of a retailer selling an item to a consumer, in which case the indicated party is the retailer). In some embodiments, the transaction database 114 of FIG. 1 may be a database associated with a manufacturer. For example, transaction database 114 can be integrated into the manufacturer database 112.

In addition or as an alternative to the cryptographic hash described above, one or more of the databases 108 may store a unique code generated for a product identifier. For instance, in some embodiments, the manufacturer database 112 stores the unique code in association with the product identifier. The unique code and the product identifier are then communicated to a downstream entity in connection with a transfer of an item associated with the product identifier to the downstream entity. The downstream entity also stores the unique code in association with the product identifier, e.g., in downstream entity database 116. The existence of the same product identifier in association with the same unique code in both the manufacturer database 112 and the downstream entity database 116 is an indication that the downstream entity acquired the item from an entity in the chain of ownership. This prevents a counterfeiter from creating a record containing the product identifier (which may not be unique) and claiming that the item is authentic. The unique code can be any unique identifier and, in certain embodiments, is a Universally Unique Identifier (UUID) that is 128-bits long. In certain embodiments, the unique code may optionally be generated as a function of item information (e.g., the product identifier or other product attributes, or a time stamp of when the item was registered with the authenticity system 102). As explained below in connection with FIG. 28, the unique code can be generated by the authenticity system 102.

User database 118 may comprise records of purchases made by end users for items whose authenticity can be verified using the authenticity infrastructure. In some embodiments, a user database 118 may be provided for each individual user. In other embodiments, information for multiple users may be stored in a single database. For example, the user database 118 can include a history of purchases made by a user, warranty registration information, rewards points information (e.g., points awarded by a manufacturer based on purchases or based on reporting of counterfeit sellers), an authenticity certificate generated after the authenticity of an item has been confirmed and the user has completed the purchase of the item, and the like.

In certain embodiments, users can interact with the authenticity infrastructure using user computing devices 106. A user computing device 106 may execute an authenticity verification application 126 that enables a user to initiate and send a request to the authenticity infrastructure to check the authenticity of an item. For example, authenticity verification application 126 may provide an interface that enables a user to supply information for an item whose authenticity is to be verified. The user provided information is then communicated to authenticity system 102, which uses the user provided information and the information stored in databases 108 to check the authenticity of the item. After the authenticity verification has been performed by authenticity system 102, results of the authenticity verification generated by authenticity system 102 may be output to the user using authenticity verification application 126. Authenticity verification application 126 may also provide additional functionality such as enabling the user to access records of previous purchases of items, report sellers of counterfeit items, execute a purchase transaction, and perform other functions.

User computing device 106 may be of various types. In some embodiments, user computing device 106 may be a mobile device of the user such as the user's mobile phone, smartphone, or tablet. In other embodiments, user computing device 106 may be a device provided by a manufacturer.

As described above, the chain of ownership of an item can involve multiple entities, such as the original manufacturer, zero of more downstream retailers/distributors, the end user, and others. In certain embodiments, each entity in the chain that wants to use the functionality provided by the authenticity infrastructure may interact with the authenticity infrastructure using a respective computing device. For example, as depicted in FIG. 1, a retailer offering an item for sale may be provided a retailer computing device 104 that enables the retailer to interact with the authenticity infrastructure. A special application 124 executing on the retailer computing device 104 may enable the retailer to interact with the authenticity infrastructure in various ways, such as by enabling the retailer to initiate authenticity verification requests, to update information in a retailer database (e.g., downstream entity database 116) to reflect a transaction involving the retailer, and the like. In some embodiments, application 124 may be the same as application 126, but with functionality that is specifically provided for manufacturers, retailers, and distributors rather than end consumers.

In some embodiments, both applications 124 and 126 may be downloadable, e.g., from a web site provided by a provider of the authenticity infrastructure. For example, if the authenticity infrastructure is provided by an ASP, the ASP may provide a website that may require the consumer or retailer to register with the ASP before application 124 and/or application 126 can be downloaded and used.

Retailer computing device 104 may be of various types. For example, retailer computing device 104 may be a computer associated with a retailer/distributor/manufacturer in a brick-and-mortar store or an ecommerce setting. In certain embodiments, the authenticity infrastructure may be provided by an ASP and the authenticity verification functionality may be provided as cloud or web services by the ASP. For example, the authenticity verification service can be made available on-demand to users (e.g., potential consumers), to enable users to initiate authenticity verification requests using, for example, user computing devices 106. The authenticity verification functionality may be provided as a cloud service that can be subscribed to by one or more entities in the chain of ownership. For example, the service may be subscribed to by one or more retailers/manufacturers/distributors/etc. to enable customers of the retailers/manufacturers/distributors/etc. to check the authenticity of items provided for purchase or sale by the retailers/manufacturers/distributors/etc.

Figure 21:
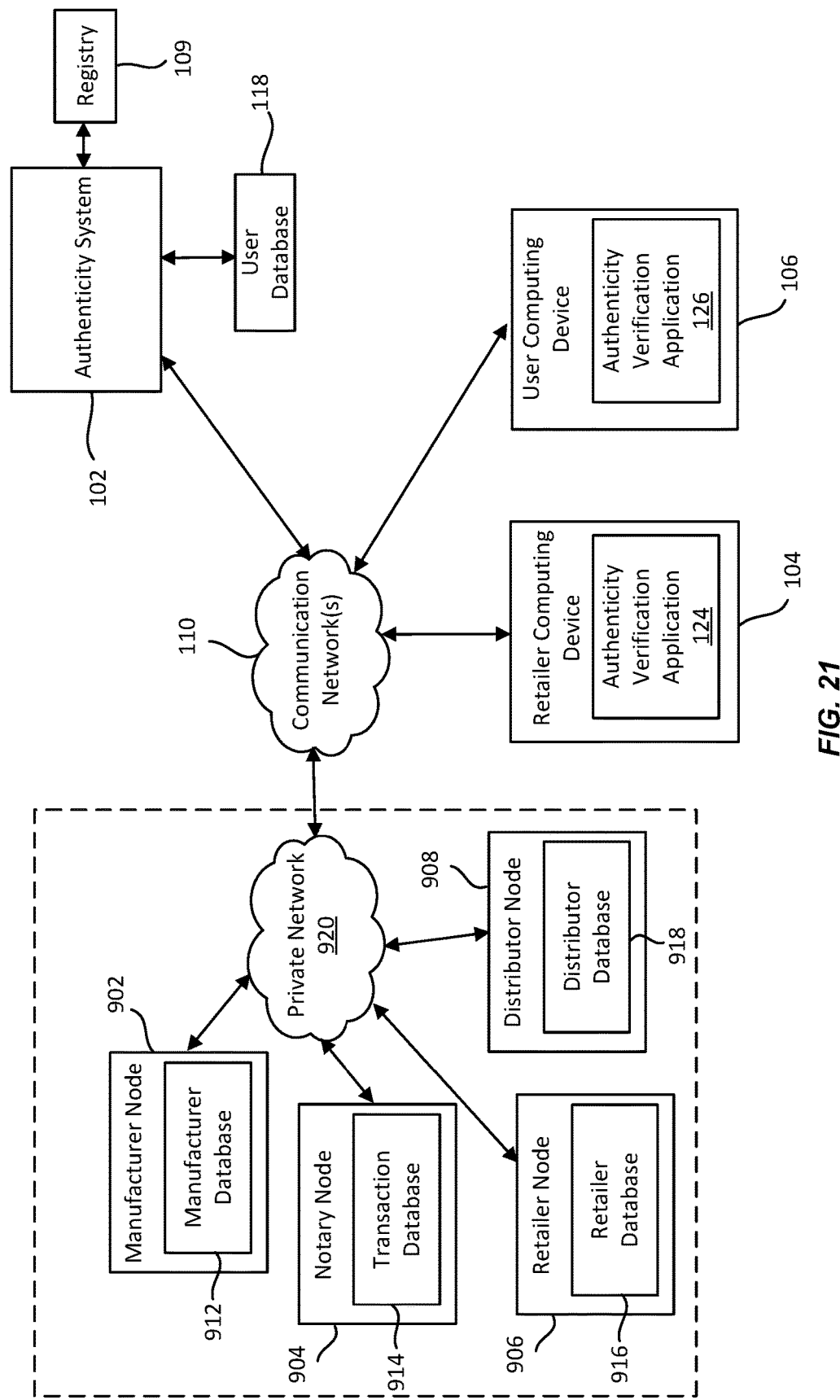
FIG. 21 illustrates a computing environment implementing an authenticity infrastructure according to certain embodiments.

As mentioned above, the databases 108 may be distributed across one or more computing systems. For example, in certain embodiments, such as the embodiment depicted in FIG. 21, the authenticity infrastructure includes a network of computing systems and/or a separate database for each entity in the chain of ownership. In FIG. 21, various databases analogous to those described earlier as being included in the databases 108 are communicatively coupled via a private network 920 in the authenticity infrastructure.

FIG. 21 illustrates a distributed environment 900 implementing an authenticity infrastructure according to certain embodiments. In FIG. 21, the authenticity infrastructure includes the authenticity system 102, the private network 920, and a plurality of nodes for various entities in the chain of ownership (e.g., a manufacturer node 902, a retailer node 906, and a distributor node 908). The private network 920 may be a wired and/or wireless network. Access to the private network 920 may be restricted to authorized computer systems and devices including, for example, the authenticity system 102, the retailer computing device 104, and the user computing device 106. In the example of FIG. 21, the private network 920 is accessed via the communication network(s) 110 (e.g., the Internet). The authenticity system 102, the retailer computing device 104, and the user computing device 106 may operate in the same manner as described earlier in connection with FIG. 1.

Distributed environment 900 depicted in FIG. 21 is merely an example and is not intended to unduly limit the scope of claimed embodiments. One of ordinary skill in the art would recognize many possible variations, alternatives, and modifications. For example, in some implementations, distributed environment 900 may have more or fewer systems or components than those shown in FIG. 21, may combine two or more systems, or may have a different configuration or arrangement of systems. For example, although FIG. 21 shows only nodes associated with one retailer and one distributor, in alternative embodiments, the distributed environment can include additional nodes associated with additional downstream entities.

In addition to nodes associated with entities in the chain of ownership, the authenticity infrastructure in FIG. 21 includes a notary node 904. The notary node 904 may be a node associated with an ASP or other trusted entity. Each of the nodes depicted in FIG. 21 can be implemented using one or more computer systems. In some embodiments, each entity associated with the private network 920 has multiple nodes that form a computing cluster for scalability and high availability. Access to the private network 920 may be controlled by a doorman service (e.g., a web gate). The nodes can directly communicate with each other. Preferably, communications between nodes are encrypted, with data being shared on a need-to-know basis. A mapping service may be provided which publishes addresses (e.g., Internet Protocol or other network addresses) through which the nodes can be reached.

Each node has access to a respective database. These databases can be local to the computer system(s) that form the nodes, or external databases. As depicted in FIG. 21, manufacturer node 902 has access to a manufacturer database 912, notary node 904 has access to a transaction database 914, retailer node has access to a retailer database 916, and distributor node 908 has access to a distributor database 918.

The manufacturer database 912 is analogous to the manufacturer database 112 in FIG. 1 and is configured to store information related to items manufactured by a manufacturer. For example manufacturer database 912 may comprise a ledger of transactions involving that manufacturer and/or an inventory database for the manufacturer. Similarly, the retailer database 916 is analogous to the retailer database discussed in connection with FIG. 1 (e.g., downstream entity database 116) and may comprise a transaction ledger and/or an inventory database for the retailer. Likewise, distributor database 918 may comprise a transaction ledger and/or inventory database maintained for a distributor.

The private network 920 can be a network created specifically for the manufacturer associated with the manufacturer node 902. For example, when a manufacturer registers with the authenticity system 102, the manufacturer may be given a configuration tool for creating an instance of a private network (e.g., the private network 920). Through registration via the manufacturer or self-registration, downstream entities can become associated with the private network 920. For example, the configuration tool may enable the manufacturer to specify which downstream entities are to be associated with the private network. In addition, the manufacturer may be provided with a management tool for managing the private network (e.g., to blacklist certain entities). Each entity associated with the private network 920 may be assigned a respective identity certificate (e.g., a digital certificate with which the entity signs transactions).

Each entity generally has, via its respective node, access to its own associated database. For example, a retailer may, using application 124, send a request to authenticity system 102 or retailer node 906 for updating the retailer database 916 to reflect a transaction involving the retailer. Likewise, manufacturers, distributors, and other entities in a chain of ownership may be provided with an application that permits the entity to communicate with their respective node, update their associated databases to reflect transactions to which they are a party, or access authenticity verification related functionality.

In FIG. 21, the user database 118 (corresponding to the user database 118 as depicted in FIG. 1) is communicatively coupled to the authenticity system 102, which manages stored user information (e.g., digital receipts, authenticity certificates, warranty registration related information, and rewards points history) on behalf of users. The user database 118 can be local or external to the authenticity system 102.

Transaction database 914 is analogous to transaction database 114 in FIG. 1 and may comprise a master ledger storing information for all transactions involving items whose authenticity can be verified using the authenticity infrastructure. As such, for a particular item, the transaction database 914 stores information representative of a complete history of all transfers in the ownership of that particular item among various entities in the chain of ownership of the item starting with the manufacturer. The transaction database 914 is managed by the notary entity which, as mentioned above, is a trusted entity. As such, the transaction database 914 can be relied upon as a source of truth about changes in ownership of items. Transaction database 914 is, along with the other databases that are accessed via the private network 920, updated to reflect transactions in which ownership of items are transferred between entities.

Registration of Items

As mentioned earlier in connection with FIG. 1, items can be registered with the authenticity system 102 to enable the authenticity of those items to be verified through the functionality provided by the authenticity infrastructure. FIG. 28 illustrates a process 1500 for registering an item according to certain embodiments. The processing depicted in FIG. 28 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 28 and described below is intended to be illustrative and non-limiting. Although FIG. 28 depicts the various processing steps occurring in a particular sequence or order, this is not intended to be limiting. In certain alternative embodiments, the steps may be performed in some different order or some steps may also be performed in parallel. In certain embodiments, such as in the embodiments depicted in FIGS. 1 and 21, the processing depicted in FIG. 28 may be performed by a combination of a computer system associated with a manufacturer and authenticity system 102.

At 1502, the manufacturer may, via the its associated computer system, communicate item information to the authenticity system. The item information includes a product identifier (e.g., a serial number generated by the manufacturer for a particular item or class of items) and a description of the item(s).

At 1504, the authenticity system generates a unique code for the product identifier supplied by the manufacturer at 1502. The unique code can, for example, be a numeric or alphanumeric code in a format that is specific to the authenticity system. For instance, the unique code could be a thirty-two-digit hexadecimal value generated using an algorithm that is proprietary to the authenticity system.

At 1506, the authenticity system stores the product identifier, for example, by creating an entry for the product identifier in the registry 109. The authenticity system may optionally store the unique code in association with the product identifier, in like manner to the manufacturer's computer system in 1510 below.

At 1508, the authenticity system communicates the unique code to the computer system associated with the manufacturer.

At 1510, the computer system associated with the manufacturer stores the product identifier in association with the unique code, e.g., in a record within the manufacturer database 112. The product identifier and the unique code may in turn be communicated to each downstream entity in the chain of ownership, e.g., during execution of a transaction transferring ownership of the item. As will be explained in connection with FIG. 30, the stored product identifier and unique code can be checked to verify that an item offered for sale has the same product identifier and unique code associated with it.

Tracking Changes in Ownership

As indicated above, databases in an authenticity infrastructure can be updated to reflect transactions in which ownership of items are transferred between entities. FIGS. 22-28 show examples of how databases can be updated to reflect transactions. The databases depicted in FIGS. 22-28 are merely examples and are not intended to unduly limit the scope of claimed embodiments. One of ordinary skill in the art would recognize many possible variations, alternatives, and modifications. For example, in some implementations, a manufacturer database may store transaction information together with the product identifier and unique code described above in the same entry or record.

Figure 22:
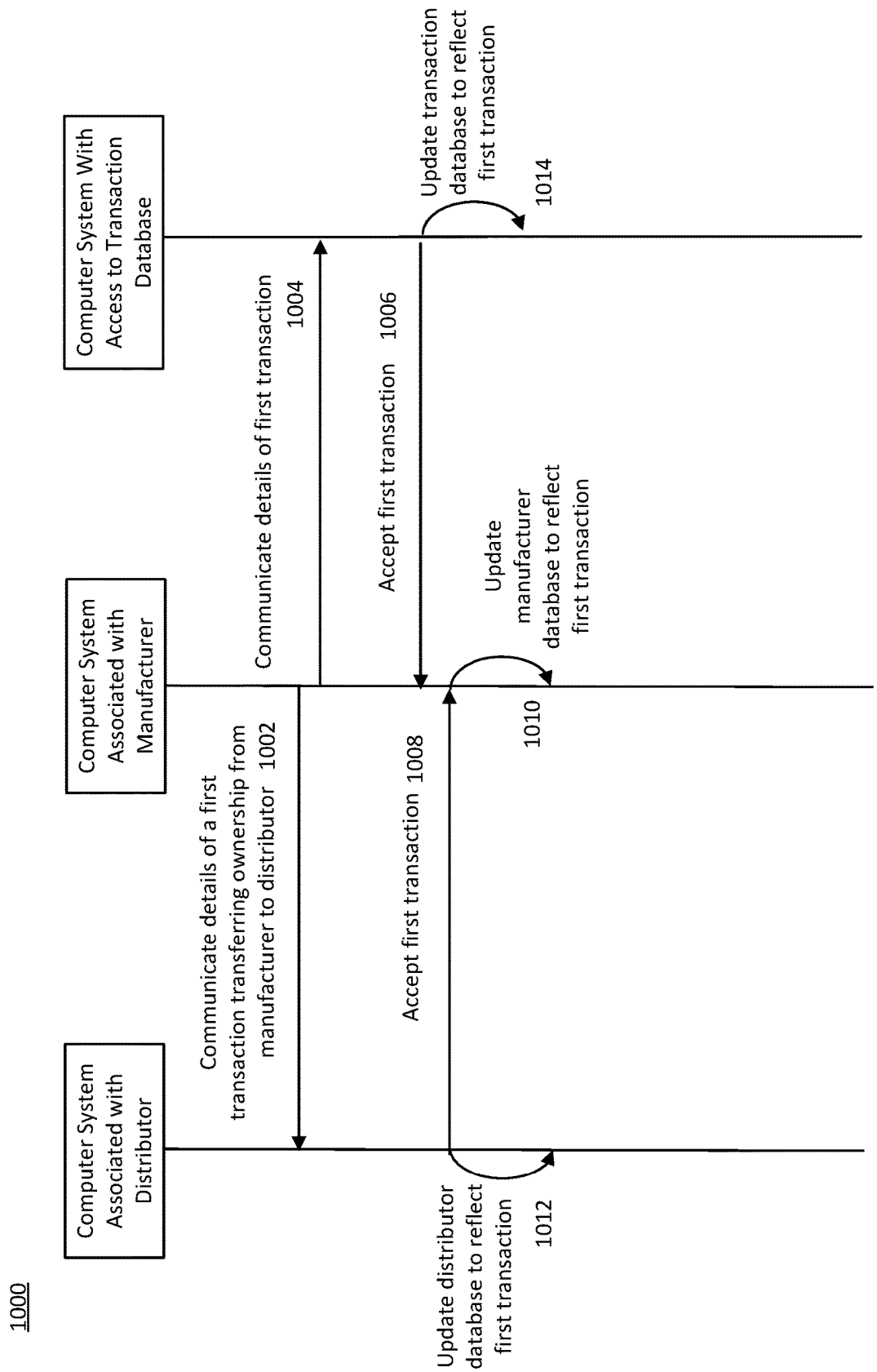
FIG. 22 illustrates a process for updating databases in an authenticity infrastructure based on a transaction between a manufacturer and a distributor according to certain embodiments.

FIG. 22 illustrates a process 1000 for updating databases in an authenticity infrastructure based on a transaction between a manufacturer and a distributor according to certain embodiments. The processing depicted in FIG. 22 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 22 and described below is intended to be illustrative and non-limiting. Although FIG. 22 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 21, the processing depicted in FIG. 22 may be performed by a combination of a computer system associated with a distributor (e.g., distributor node 908), a computer system associated with a manufacturer (e.g., manufacturer node 902), and a computer system with access to a transaction database (e.g., notary node 904).

At 1002, the computer system associated with the manufacturer communicates, to the computer system associated with the distributor, details of a first transaction transferring ownership from the manufacturer to the distributor. Such details may include, for example, item information (e.g., item description, quantity, product identifier, serial number, a unique code generated for the product identifier, etc.) and price information.

At 1004, the computer system associated with the manufacturer communicates, to the computer system with access to the transaction database, details of the first transaction.

The details communicated in 1004 are not necessarily identical to the details communicated in 1002. For example, 1004 may involve communicating a subset of the transaction information communicated in 1002. The communications in 1002 and 1004 may occur after the first transaction has been executed (e.g., upon receipt of payment from the distributor) and can be initiated, for example, by the manufacturer submitting a request to the manufacturer node 902.

At 1006, the computer system with access to the transaction database sends an acceptance of the first transaction to the computer system associated with the manufacturer. This indicates to the manufacturer that the transaction has been approved for recording within the authenticity infrastructure subject to further approval from the distributor at 1008.

At 1008, the computer system associated with the distributor sends an acceptance of the first transaction to the computer system associated with the manufacturer, thus signaling the distributor's approval. The communication in 1008 may be initiated, for example, by the distributor submitting a request to the distributor node 908 after verifying the accuracy of the details communicated in 1002.

Upon receiving the acceptances at 1006 and 1008, the computer system associated with the manufacturer updates, at 1010, a manufacturer database to reflect the first transaction and, further, sends a communication (not depicted) to the computer system associated with the distributor indicating that distributor database should be updated. For example, the manufacturer node may create a transaction record using the details communicated in 1002.

At 1012, the computer system associated the distributor updates the distributor database to reflect the first transaction. The updating of the distributor database may be performed in response to the communication from the computer system associated with the manufacturer in 1008. In some embodiments, the distributor database is updated by creating an entry with the same information as that which is stored in the manufacturer database in 1010. That is, the manufacturer database and the distributor database may include identical entries for the first transaction.

At 1014, the computer system with access to the transaction database updates the transaction database to reflect the first transaction. Although FIG. 22 only depicts the computer system associated with the manufacturer as receiving both the acceptance at 1006 and the acceptance at 1008, the updating in 1012 can be conditioned upon receipt of an acceptance from the computer system with access to the transaction database. Likewise, the updating in 1014 can be conditioned upon receipt of an acceptance from the computer system associated with the distributor. For example, in some implementations, the nodes in the authenticity infrastructure may communicate with each other so that no database is updated until the entities associated with every database to be updated have given their approval. In the example of FIG. 22, the manufacturer's approval is implicit because the process was initiated by the computer system associated with the manufacturer.

FIG. 23 illustrates databases updated to reflect the transaction in FIG. 22. The databases in FIG. 23 include a distributor database 1100, a manufacturer database 1110, and a transaction database 1120. The contents of the databases 1100, 1110, and 1120 reflect the states of these databases after completion of the processing depicted in FIG. 22. As shown in FIG. 23, the distributor database 1100 includes an entry with a parties field 1102, a part number field 1104, and a hash field 1106. The parties field 1102 indicates a transaction from manufacturer X to distributor K. The part number field 1104 includes a part number for the item that is the subject of the transaction. The hash field 1106 includes a cryptograph hash generated for the transaction. The hash can be generated, for example, based on at least some of the details sent in 1002. The entry in the distributor database 1100 can be created during 1012. In some embodiments, the hash is generated by a computer system associated with the originating party, e.g., the entity conveying the item to the recipient entity.

The manufacturer database 1110 includes a parties field 1112, a part number field 1114, and a hash field 1116. As shown in FIG. 23, the manufacturer database 1110 includes an entry identical to the entry in the distributor database 1100. The entry in the manufacturer database 1110 can be created during 1010.

The transaction database 1120 comprises an entry 1130 corresponding to a transaction record. In the example of FIG. 23, this entry comprises a transaction field 1122, a consuming transaction field 1124, and a party field 1126. The transaction field 1122 includes a hash created for an earlier transaction involving the same part number. For example, a hash labeled "TX HASH 0" may have been created when the item first entered the manufacturer's inventory. The consuming transaction field 1124 includes a hash for a transaction that supersedes or "consumes" the earlier transaction by transferring ownership to another party. For example, hash "TX HASH 1" can be a hash created for the transaction in FIG. 22. The party field 1126 indicates the primary party in the consuming transaction. In the case of a transfer between entities in the distribution chain, the primary party can be the recipient (in this example, distributor K).

Figure 24:
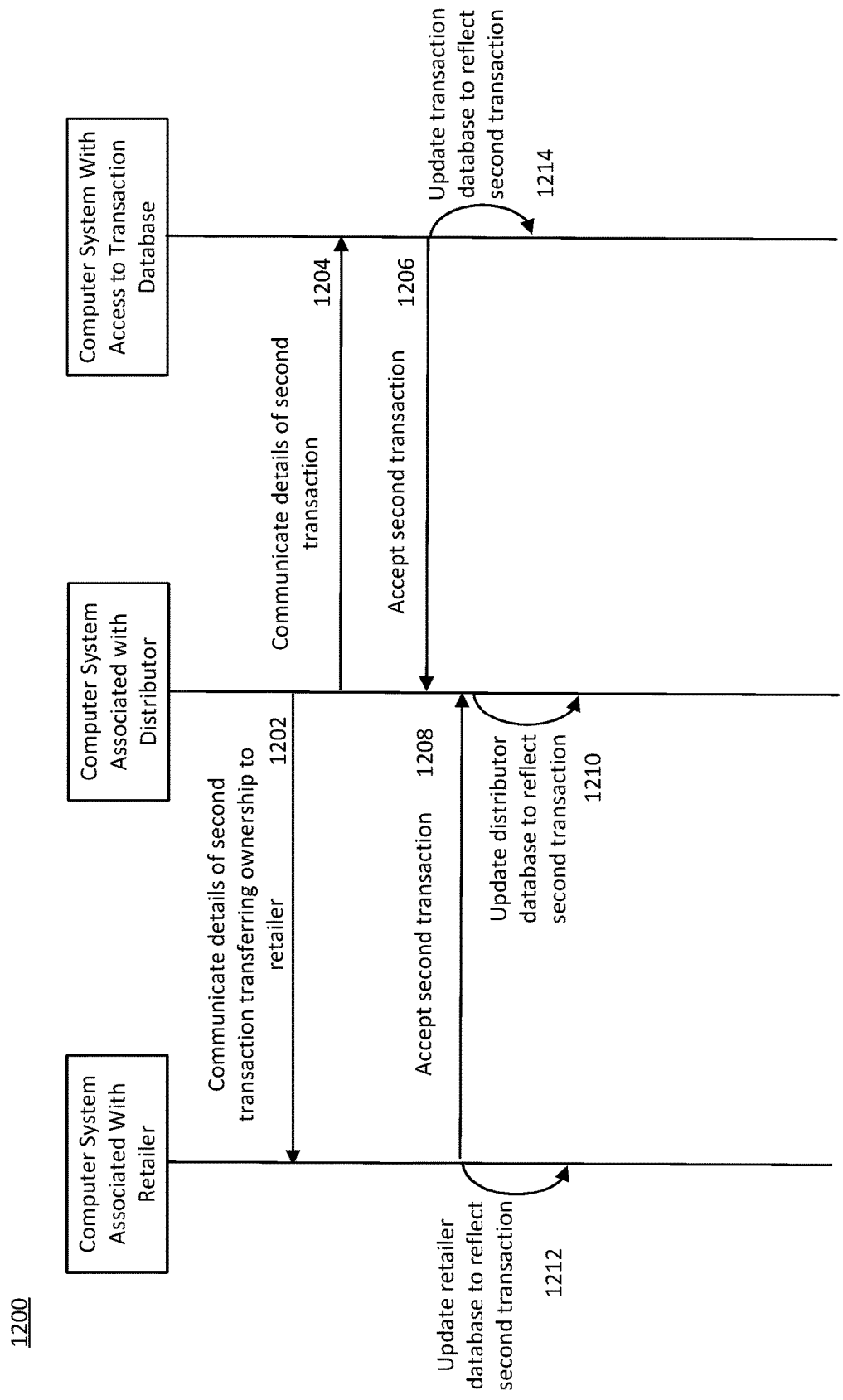
FIG. 24 illustrates a process for updating databases in an authenticity infrastructure based on a transaction between a distributor and a retailer according to certain embodiments.

FIG. 24 illustrates a process 1200 for updating databases in an authenticity infrastructure based on a transaction between a distributor and a retailer, according to certain embodiments. The processing depicted in FIG. 24 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 24 and described below is intended to be illustrative and non-limiting. Although FIG. 24 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 21, the processing depicted in FIG. 24 may be performed by a combination of computer system associated with a retailer (e.g., retailer node 906), a computer system associated with a distributor (e.g., distributor node 908), and a computer system with access to a transaction database (e.g., notary node 904). FIG. 24 continues the example discussed in connection with FIG. 22. The role of the distributor computer system in FIG. 24 is similar to that of the manufacturer computer system in FIG. 22.

At 1202, the computer system associated with the distributor communicates details of a second transaction transferring ownership (e.g., of the same item as the first transaction in FIG. 22) to the computer system associated with the retailer.

At 1204, the computer system associated with the distributor communicates the details of the second transaction to the computer system with access to the transaction database. The details communicated in 1202 and 1204 may include the same types of information described in connection with 1002 in FIG. 22.

At 1206, the computer system with access to the transaction database sends an acceptance of the second transaction to the computer system associated with the distributor.

At 1208, the retailer node sends an acceptance of the second transaction to the computer system associated with the distributor.

At 1210, the computer system associated with the distributor updates, in response to the acceptances sent in 1206 and 1208, the distributor database to reflect the second transaction.

At 1212, the computer system associated with the retailer updates a retailer database (e.g., retailer database 916 in FIG. 21) to reflect the second transaction.

At 1214, the computer system with access to the transaction database updates the transaction database to reflect the second transaction. As with the example in FIG. 22, in some implementations, no database is updated until the entities associated with every database to be updated have given their approval.

Figure 25:
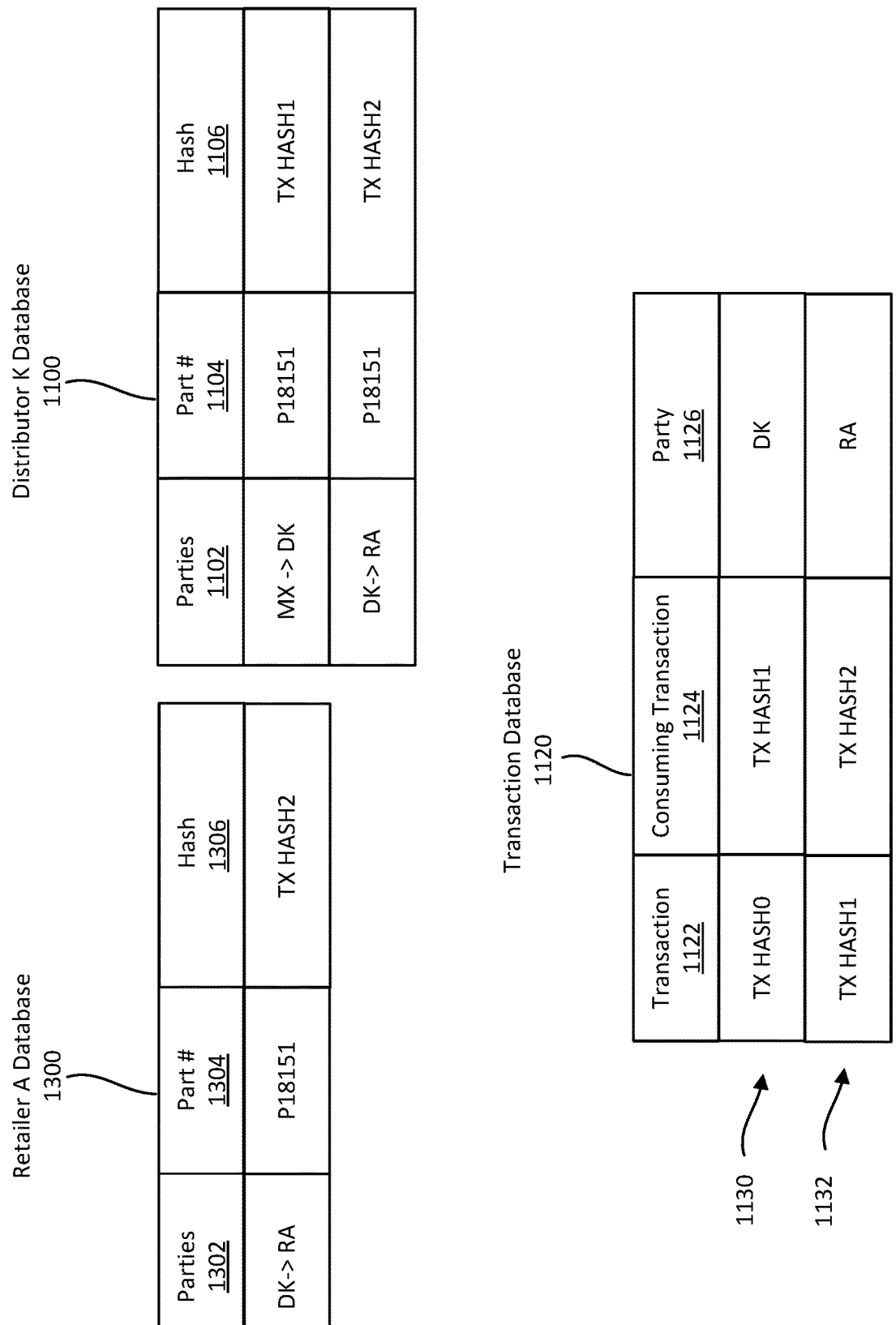
FIG. 25 illustrates databases updated to reflect the transaction in FIG. 24 according to certain embodiments.

FIG. 25 illustrates databases updated to reflect the second transaction in FIG. 24. In addition to the distributor database 1100 and the transaction database 1120 described in connection with FIG. 23, FIG. 24 depicts a retailer database 1300 which shows the state of the retailer database after updating to reflect the second transaction in FIG. 24. In the example of FIG. 25, the second transaction occurs after the first transaction (in FIG. 22) transferring ownership from manufacturer X to distributor K. The distributor database 1100 includes the same entry from FIG. 23, plus an additional entry for the second transaction. Similarly, the transaction database 1120 includes the same entry 1130 shown in FIG. 23, plus an additional entry 1132 for the second transaction. The retailer database 1300 only includes an entry for the second transaction since the retailer A was not a party to the first transaction.

FIGS. 23 and 25 illustrate a simple example in which an item is transferred from a manufacturer to a distributor and, in turn, from the distributor to a retailer. With each transfer of the item, databases associated with the entities involved in the transaction are updated along with a transaction database. The updating of databases can be performed in a similar manner for more complex distribution chains, as illustrated in FIGS. 26 and 27.

Figure 26:
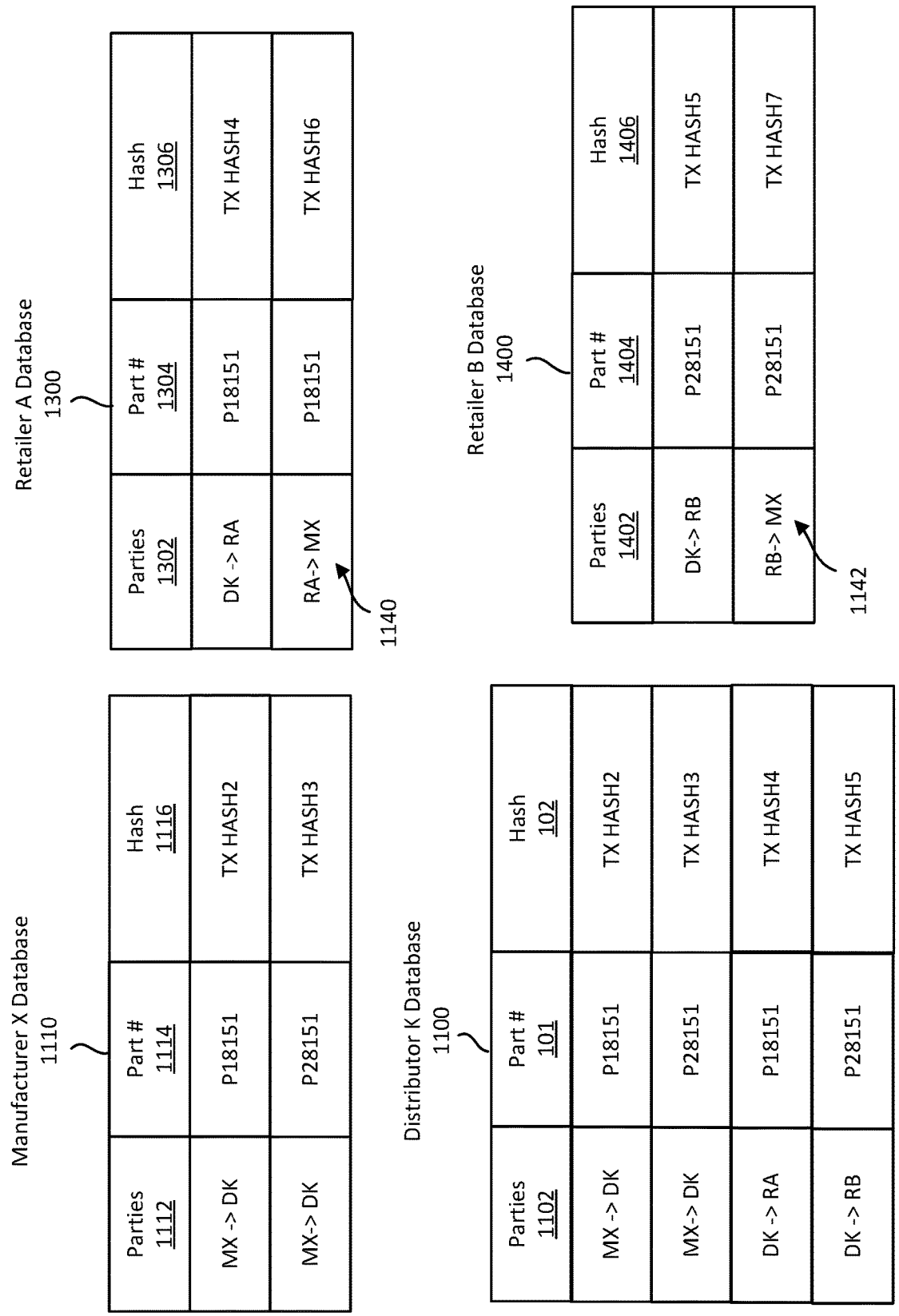
FIG. 26 illustrates databases updated to reflect a sequence of transactions involving a manufacturer, a distributor, a first retailer, and a second retailer according to certain embodiments.

FIG. 26 illustrates databases updated to reflect a sequence of transactions according to certain embodiments. In the example of FIG. 26, the transactions involve manufacturer X, distributor K, retailer A, and a second retailer "B". The depicted example includes transactions corresponding to those represented in FIGS. 23 and 25, specifically, a transfer of part number "P18151" from manufacturer X to distributor K, followed by a transfer of the same part from distributor K to retailer A. Additionally, FIG. 26 includes a retailer database 1400 that records transactions involving the retailer B, who receives a different item (part number "P28151") from the distributor K after transfer from manufacturer X to distributor K. Thus, the manufacturer database 1110 reflects transfers of two items, each to a different distributor, and the distributor database 1100 reflects transfers of the same two items, each to a different retailer. As shown in FIG. 26, each transaction has a unique hash associated with it. When an item is sold by a retailer to a consumer, the retailer's database can be updated accordingly, for example, to indicate a transfer back to the manufacturer, as shown in entries 1140 and 1142.

Figure 27:
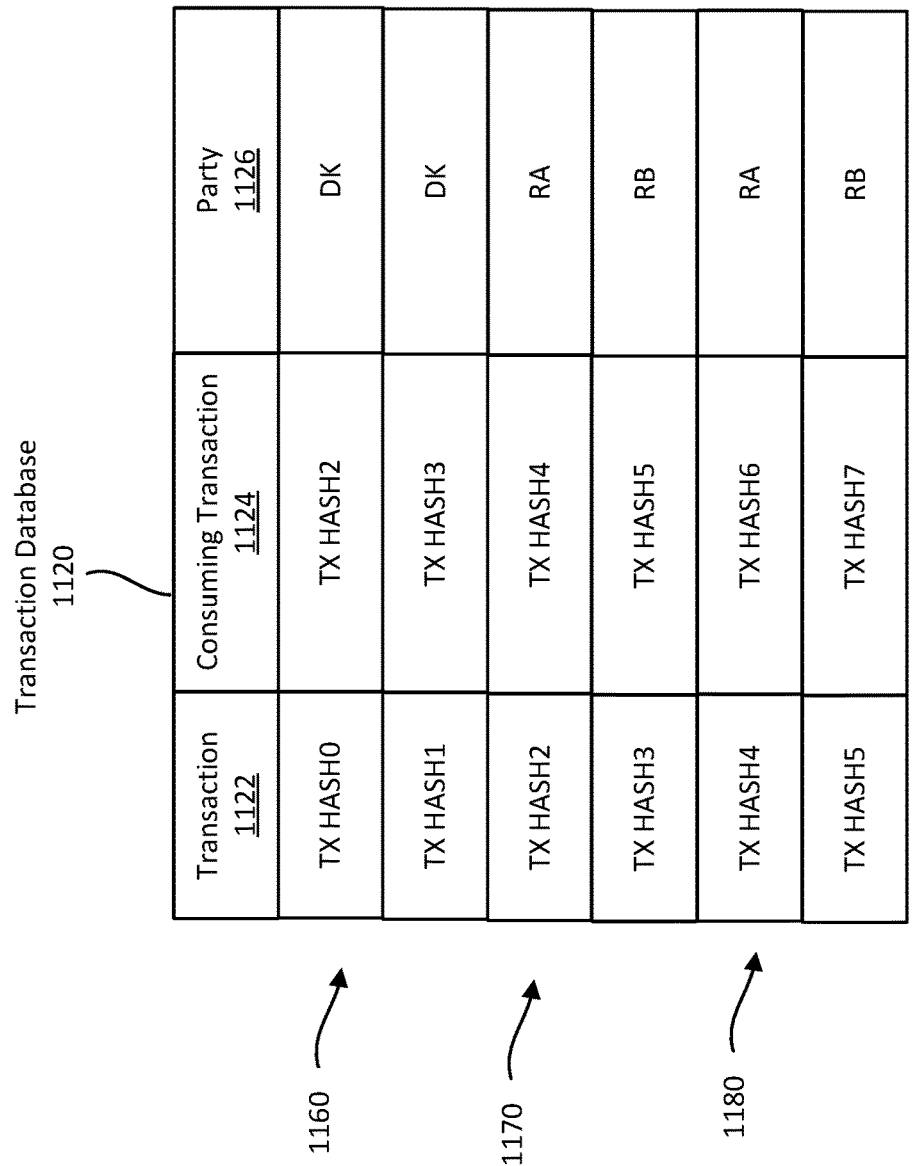
FIG. 27 illustrates a transaction database updated to reflect the sequence of transactions in FIG. 26 according to certain embodiments.

FIG. 27 illustrates the transaction database 1120 updated to reflect the sequence of transactions in FIG. 26. As with the examples in FIGS. 23 and 25, the transaction database 1120 includes, for each transaction, a separate entry indicating: 1) an earlier transaction involving the same item, 2) a consuming transaction that is the subject of the entry, and 3) the primary party in the consuming transaction. In the case of a sale to a consumer, the primary party can be the retailer. The sale of an item to a consumer is a special case because it potentially marks the end of the chain of ownership. However, in some embodiments, it may be possible for a consumer to become a reseller of the item. For instance, the consumer may submit a request to the authenticity system 102 to associate himself or herself with the manufacturer. Thus, the consumer could potentially access the same authenticity verification functionality provided to downstream entities such as retailers or distributors, and the chain of ownership would be extended. To accommodate this possibility, the sale of an item to a consumer may not always be treated as a special case. Instead, the transaction database 1120 could record the consumer as the party in such cases.

As an example of how subsequent transactions can consume earlier transactions, the transfer of part number P18151 from manufacturer X to distributor K (indicated by an entry 1160 with hash "TX HASH2") is superseded or "consumed" by the transfer of part number P18151 from distributor K to retailer A (indicated by an entry 1170 with a hash "TX HASH4"). In turn, the transfer associated with the entry 1170 is consumed by a transaction involving a sale of part number P18151 to a consumer (indicated by an entry 1180 with a hash "TX HASH6").

The contents of the transaction database 1120 can be used to determine whether an entity still owns an item. For example, the transaction database 1120 can be searched to determine whether there exists a transaction (e.g., the transaction in which the entity acquired the item) which was consumed by a subsequent transaction, as indicated by comparing the hashes of both transactions. Thus, the transaction database 1120 can be used to confirm: (1) that an entity has acquired an item from another entity in the chain and (2) that the entity is the current owner of the item.

In certain embodiments, a transfer of an item from a first entity in the chain of ownership to a second entity in the chain of ownership may involve the following:

1. The first entity updating their database to indicate the item was sold. The updating of the first entity's database can be performed in the manner depicted in FIGS. 22-26, e.g., by adding to the first entity's database an entry associating information identifying the item (e.g., the part number as depicted in FIG. 23 and/or the product identifier in FIG. 28) with a cryptographic hash generated for the sale.

2. The first entity communicating the product identifier and the unique code in FIG. 28 to the second entity. The communication of the product identifier and the unique code may occur, for example as part of the communication in 1002 of FIG. 22 or 1202 of FIG. 24.

3. The second entity updates their database to indicate acquisition of the item (e.g., by creating an identical entry to the entry created in the first entity's database, as depicted in FIGS. 23, 25, and 26). The second entity may optionally mark the item in their database as being available for sale. Further, the second entity may store the product identifier in association with the unique code which, as indicated above, were both received from the first entity. In this manner, the product identifier and the unique code can be propagated along the chain of ownership to each downstream entity. The association between the product identifier and the unique code can be stored in the same entry that indicates acquisition of the item (e.g., together with the cryptographic hash) or separately.

In embodiments featuring a notary or other entity that maintains a complete transaction history, the transfer of the item from the first entity to the second entity may further involve:

4. Communication of transaction details to the entity maintaining the transaction history (e.g., as part of the communication in 1004 of FIG. 22 or 1204 of FIG. 24). The transaction details can include, for example, item information (e.g., part number) and entity information identifying at least the receiving entity (e.g., the second entity), and a cryptographic hash generated for the transaction.

5. Updating of a transaction database to reflect the transaction. For example, the notary node 904 in FIG. 21 may update the transaction database 914 to include an entry associating a hash generated for an earlier transaction in which the first entity acquired the item with a hash generated for the current transaction, i.e., the "consuming" transaction, between the first entity and the second entity.

As will now be explained in connection with FIGS. 2-4 and 30-32, the authenticity of an item can be determined by using one or more of the above-mentioned databases to perform various types of checks. For example, as part of determining whether an item is authentic, the authenticity infrastructure can perform one or more of the following: checking a registry to determine whether a retailer is an authorized seller, checking if a record of an item exists in a manufacturer database in order to confirm that the item originates with the manufacturer, checking if a record of the item exists in a retailer database to confirm that the retailer is the current owner and/or that the item is available for sale by the retailer, checking a retailer database to locate a transaction transferring ownership of the item to the retailer, and checking a transaction database to confirm that the item was transferred to the retailer from another entity in the chain of ownership or to trace the complete transaction history from the manufacturer to the retailer.

Figure 2:
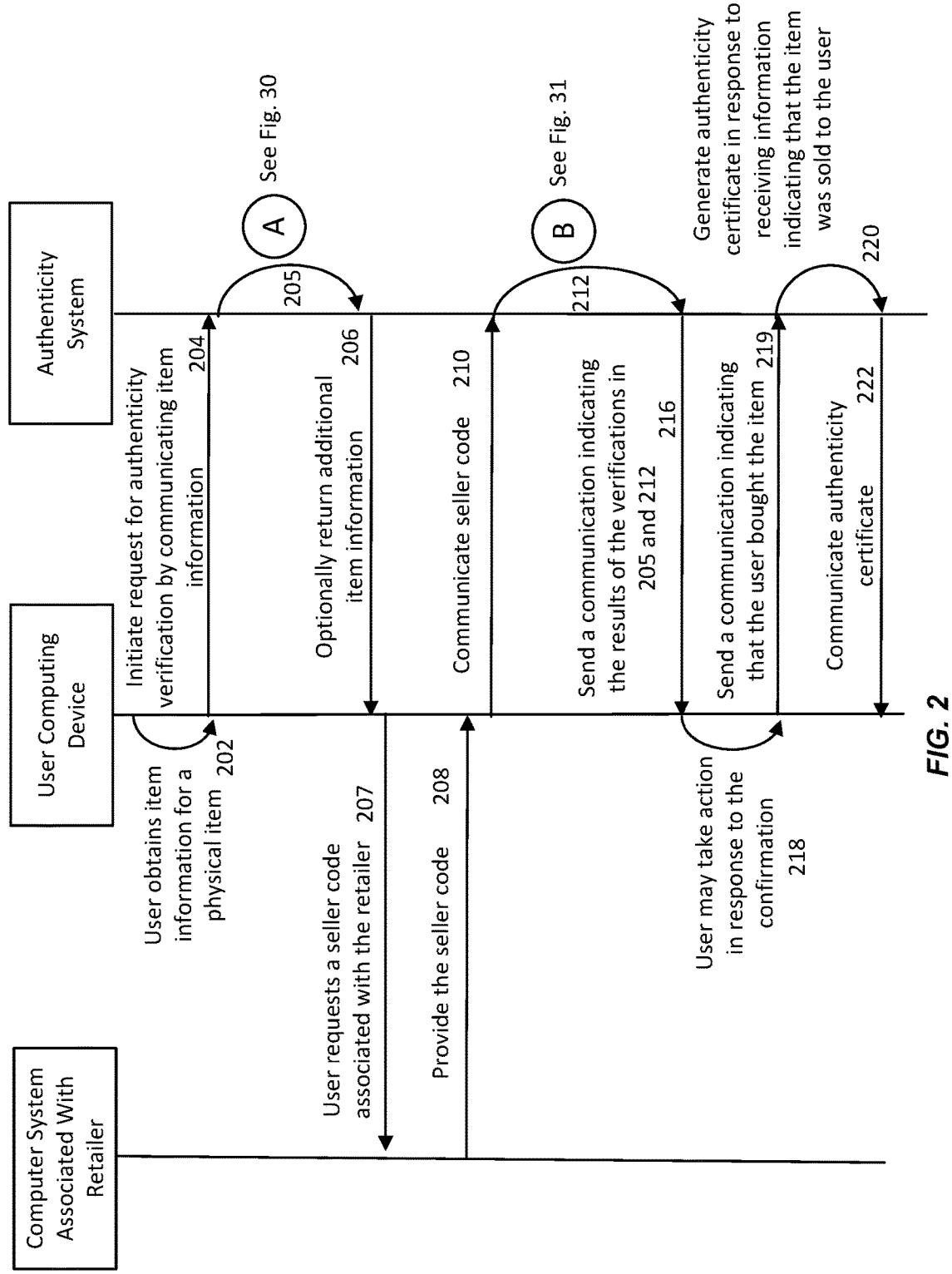
FIG. 2 illustrates a process for determining authenticity in a brick-and-mortar retail environment according to certain embodiments.
Figure 3:
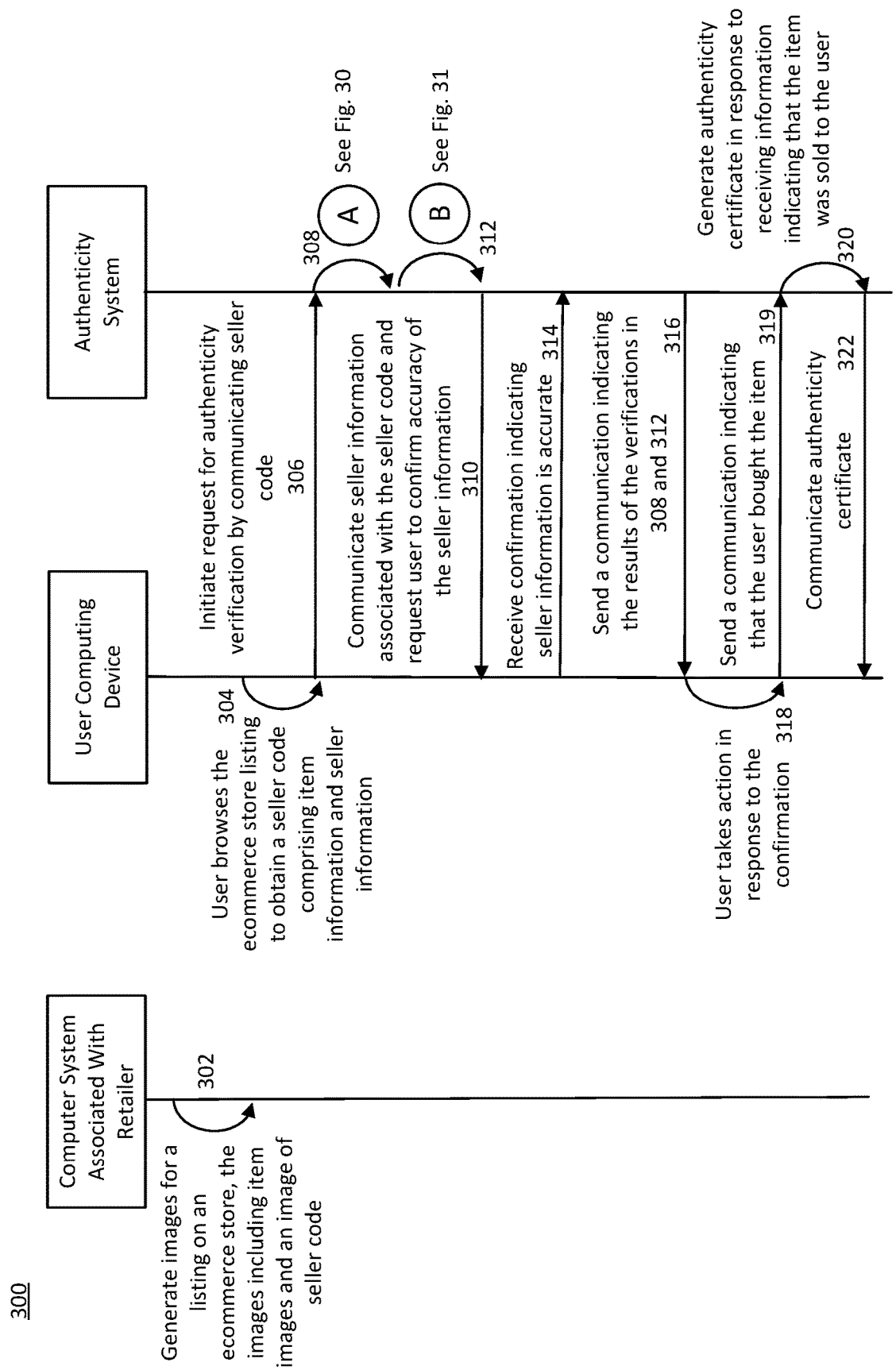
FIG. 3 illustrates a process for determining authenticity in an electronic commerce environment according to certain embodiments.
Figure 4:
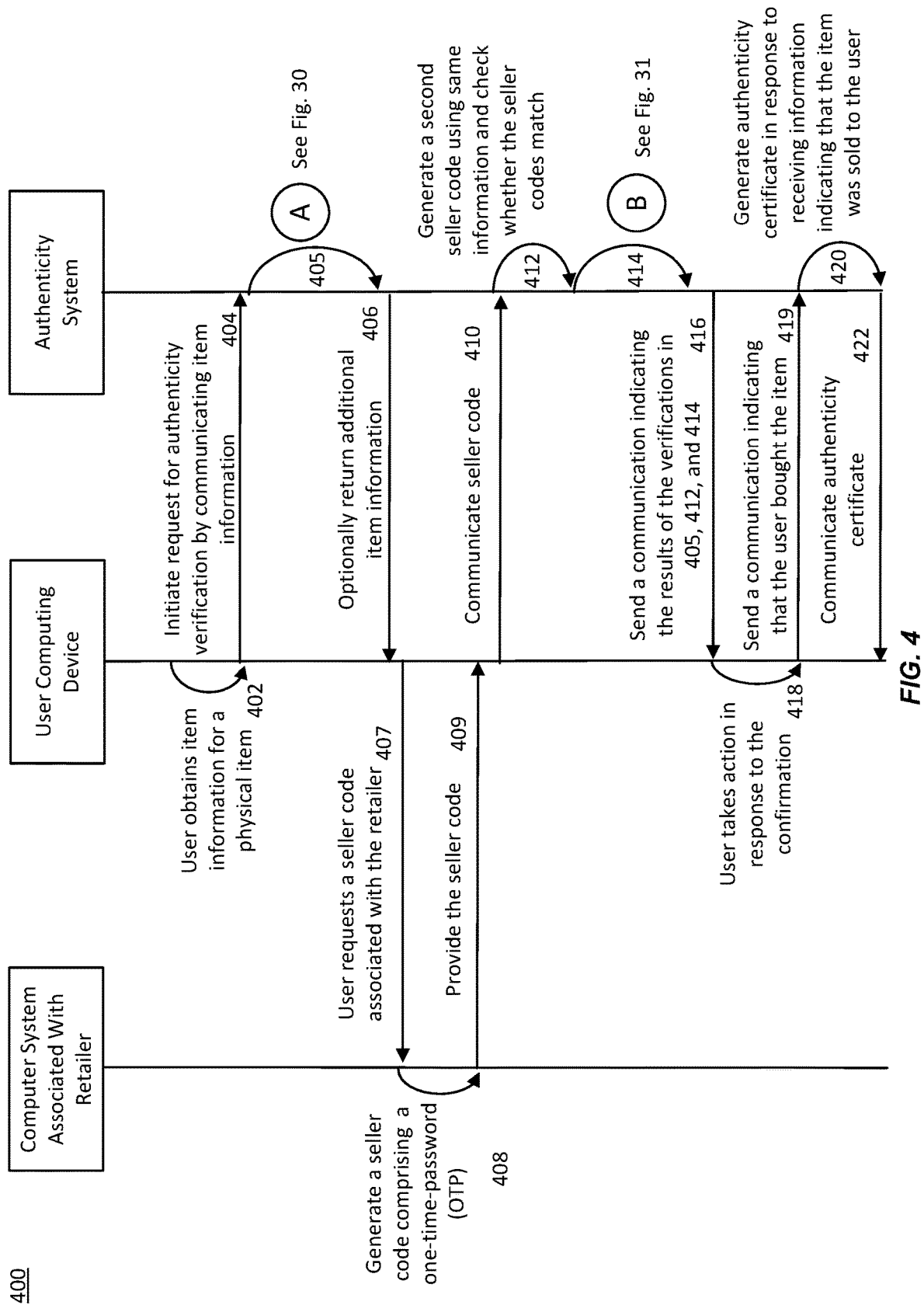
FIG. 4 illustrates a process for determining authenticity in a retail environment according to certain embodiments.

FIGS. 2-4 depict processing that occurs in connection with a potential sale of an item offered by a retailer to a user-consumer. However, the processing in FIGS. 2-4 can be applied to an item offered by any entity in the chain of ownership and upon request from any entity that wishes to verify the authenticity of the item.

Authenticity Check Based on a Seller Code—Physical Retail Example

FIG. 2 illustrates a process 200 for determining authenticity using the authenticity infrastructure in a brick-and-mortar retail environment according to certain embodiments. The processing depicted in FIG. 2 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 2 and described below is intended to be illustrative and non-limiting. Although FIG. 2 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 2 may be performed by a combination of a computer system associated with the retailer (e.g., retailer computing device 104), user computing device 106, and authenticity system 102.

The process 200 assumes that a user is present in a physical brick-and-mortar retailer store. At 202, the user obtains item information for a physical item in the retailer store. The item information can be obtained, for example, from information printed on the item, printed on a tag or label on the item, from information printed on the item's packaging, from a brochure depicting the item, and the like. The item information may include details related to the item such as a product identifier (ID) assigned to the item by its manufacturer (e.g., the product identifier discussed in connection with FIG. 28) and a serial number. In some instances, the item information may be displayed in plain text on a body of the item or on product packaging. Item information can also be displayed as a product code (e.g., a barcode) or embedded in a near-field communication (NFC) or other wireless communication tag attached to the item. In some embodiments, the item information may be obtained in 202 by scanning the product code or wireless communication tag.

At 204, a request for performing authenticity verification for the item is initiated by communicating the information obtained in 202 to authenticity system 102.

Figure 5:
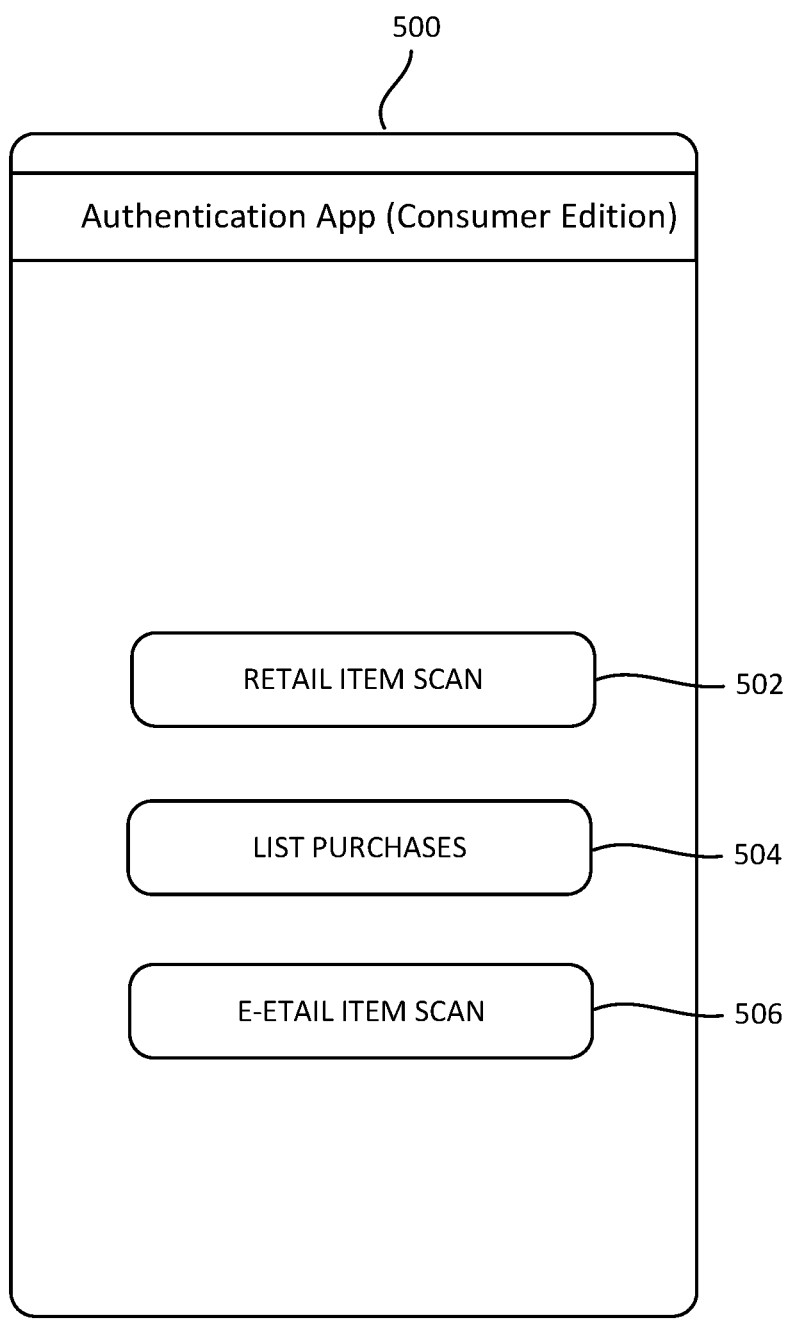
FIG. 5 illustrates a user interface displaying options for initiating capture of a product code according to certain embodiments.

FIG. 5 shows an example user interface 500 that enables a user to initiate an authenticity verification request according to certain embodiments. As depicted in FIG. 5, user interface 500 comprises an option 502 to initiate an authenticity verification request by scanning information related to the item. For example, selection of option 502 causes an interface to be shown that enables the user to scan a product code (e.g., a barcode or other machine-readable information) associated with the physical item. For example, selecting option 502 may bring up the user interface depicted in FIG. 6. As shown in the embodiment depicted in FIG. 5, user interface 500 may also provide other options such as an option 504 to display a list of previous purchases, an option 506 to initiate a scan to capture a product code of an item in an electronic product listing (e.g., in connection with processing depicted in FIG. 3), and the like. In certain embodiments, user interface 500 may be provided by application 126 executing on user computing device 106, as depicted in FIG. 1.

Figure 6:
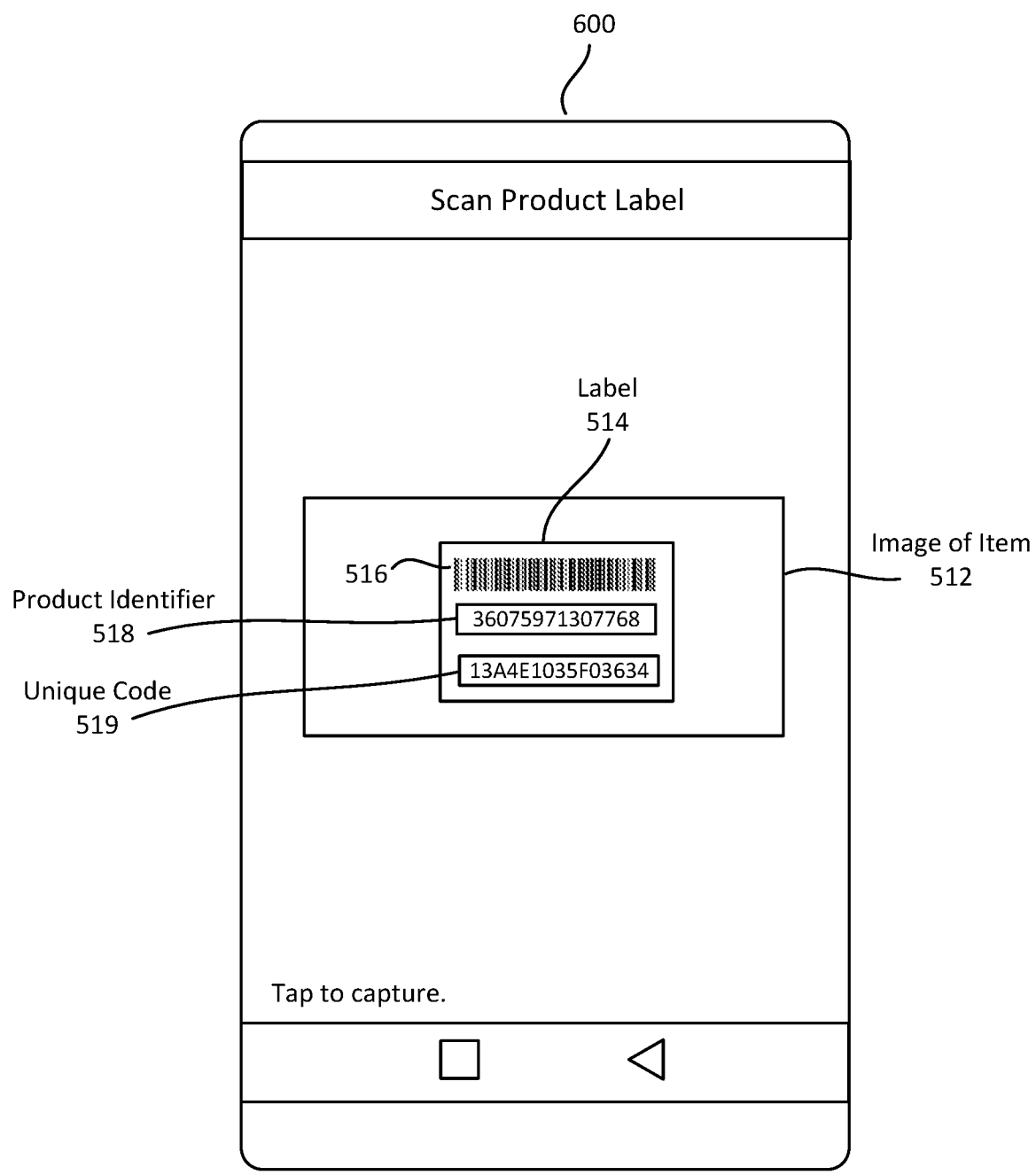
FIG. 6 illustrates a user interface displaying an image of a product code that is about to be captured according to certain embodiments.

FIG. 6 shows a user interface 600 that enables a user to scan and capture a product code associated with an item whose authenticity is to be checked. In certain embodiments, user interface 600 can be displayed in response to selection of option 502 or option 506 in FIG. 5. In the example of FIG. 6, the product code is contained in an image 512 scanned from the item, and is shown as both a barcode 516 and plain text 518. The barcode 516 and the plain text 518 may both correspond to a serial number or other item identifier. In certain embodiments, user interfaces 500 and 600 depicted in FIGS. 5 and 6 respectively, may be generated by an application, such as authenticity verification application 126 executing on user computing device 106 as depicted in FIG. 1.

Upon receiving the information in 204, and as part of the authenticity verification, authenticity system 102 is configured to perform various checks to (1) verify the source (e.g., the manufacturer) of the item; and (2) verify whether the retailer from whom the user is buying the product is actually authorized to sell the item. This processing begins at 205 and can be performed according to the embodiments illustrated in FIGS. 30 and 31. In certain embodiments, the item is deemed to be authentic if each of the following is true: the entity selling the item (e.g., the retailer) is associated with the manufacturer; a database associated with the entity selling the item comprises an entry corresponding to the item identifier; and the database associated with the entity selling the item contains information indicating that the item is available for sale by the entity.

Figure 30:
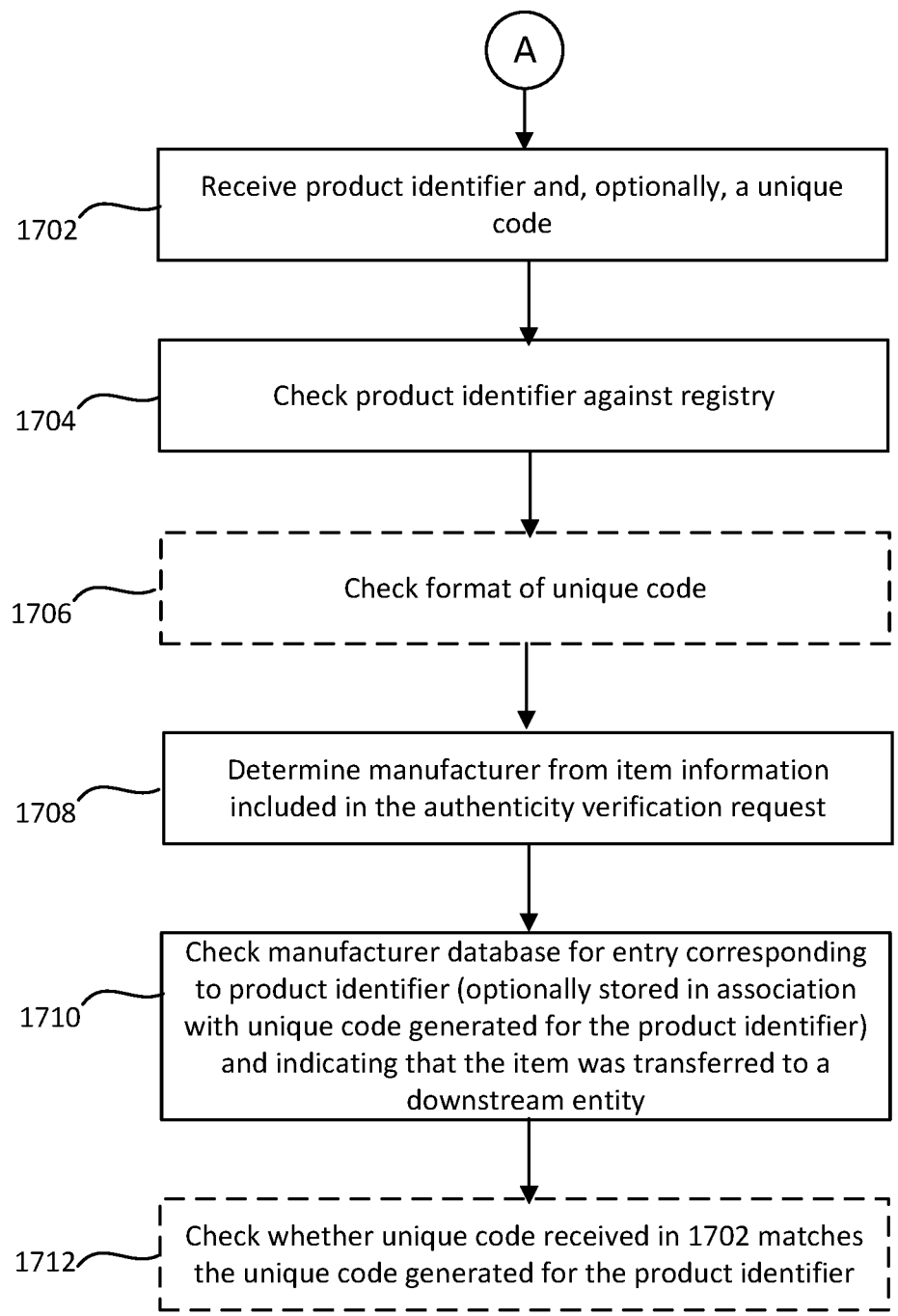
FIG. 30 illustrates processing that can occur during the processes depicted in FIGS. 2, 3, and 4 according to certain embodiments.

Referring to FIG. 30, at 1702, the authenticity system 102 receives a product identifier as part of the item information communicated in 204. The item information may optionally include a unique code generated for the product identifier (e.g., the unique code in FIG. 28).

At 1704, the authenticity system 102 checks the product identifier received in 1702 against a registry comprising product identifiers for items that have been registered with the authenticity system 102 (e.g., the registry 109 in FIG. 1). If there is no such product identifier in the registry, the authenticity verification for the item has failed and processing ends. If a matching product identifier is found in the registry, processing proceeds to 1706 or 1708.

At 1706, assuming the unique code was received in 1702, the authenticity system 102 checks a format of the product identifier received in 1702. The check in 1706 is a preliminary check of the unique code to confirm that the unique code is facially valid, e.g., that the unique code is plausibly a code that was generated by the authenticity system for the product identifier because the format is as expected. If the format of the unique code is invalid, the authenticity verification for the item is deemed to have failed. If unique code has a valid format, processing proceeds to 1708.

At 1708, the authenticity system 102 determines the manufacturer of the item from the item information communicated with the authenticity verification request in 204. In certain implementations, the manufacturer is determined based on an association between the product identifier and the manufacturer. The association may have been stored, for example, in the registry 109 during an earlier registration of the item.

At 1710, the authenticity system 102 checks a database associated with the manufacturer determined in 1708 by searching the database (e.g., via a request to the manufacturer node 902 in FIG. 21) to locate an entry corresponding to the product identifier. If a unique code was previously generated for the product identifier, the product identifier may be stored in the manufacturer database in association with the previously generated unique code. At 1710, the authenticity system 102 may also check that the entry in the manufacturer database indicates that the item associated with the product identifier was transferred to a downstream entity. For example, the entry may include transaction information indicating that the manufacturer sold the item to a distributor, as depicted in FIG. 26. If such an entry is located, it confirms that an item matching the information communicated in 204 exists and was sold by the manufacturer.

At 1712, assuming a unique code was received in 1702, the authenticity system 102 checks whether the received unique code matches the unique code generated for the product identifier. The check in 1712 can be performed based on a comparison of the received unique code to the unique code in the manufacturer database. Alternatively, the authenticity system 102 may already have a copy of the unique code stored in the registry 109, in which case the received unique code can be compared to the unique code in the registry.

If the checks at 1704, 1706, 1710, and 1712 are all successful, then the item is tentatively deemed authentic subject to further verification, and processing proceeds to 206. However, if any of the checks in 1704, 1706, 1710, and 1712 fails, then authenticity verification is deemed to have failed. In such a scenario, authenticity system 102 may send a message back to the requesting user's computing device indicating that authenticity verification for the item has failed and processing ends.

Returning to FIG. 2, at 206, the authenticity system 102 optionally generates and communicates to the user computing device additional item information for display at the user computing device. The additional item information can be generated and/or obtained by authenticity system 102, for example, from the matching entry in the manufacturer database, and may include an item description, information on eco-friendly and sustainable processes used in manufacturing the item, consumer reviews of the item, and/or other information that assists the user in making a purchase decision with respect to the item.

Figure 7:
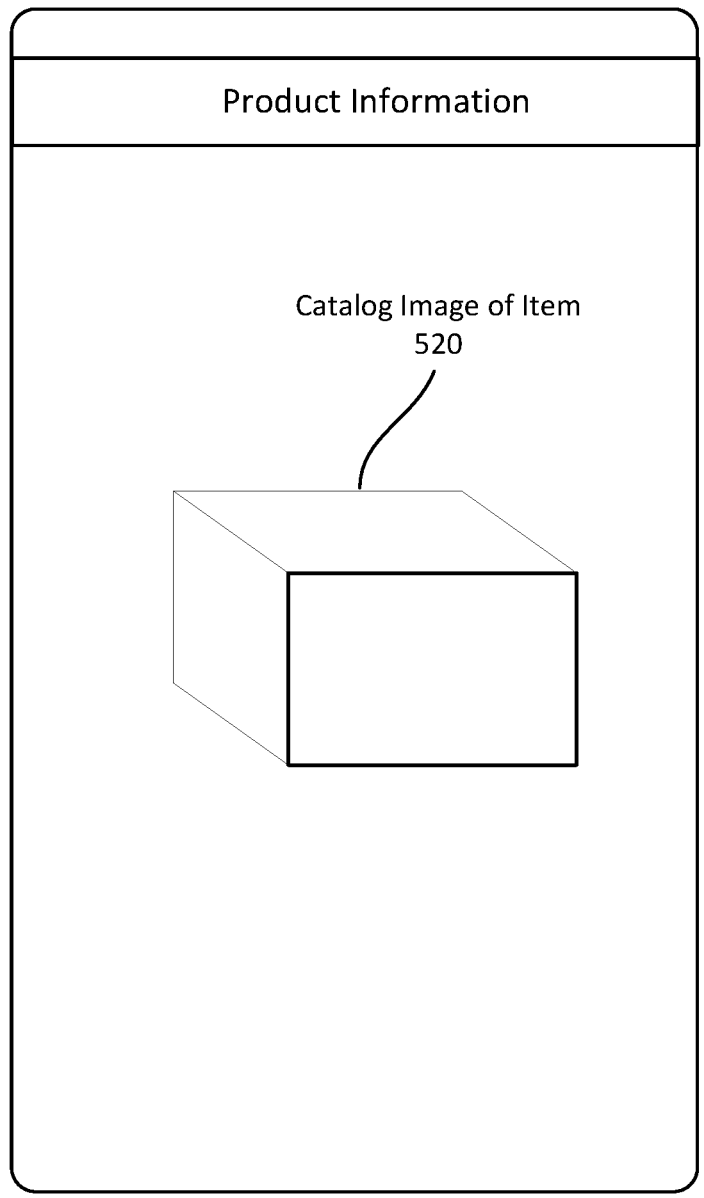
FIG. 7 illustrates a user interface displaying a catalog image of an item based on scanning of a product code according to certain embodiments.

The additional information sent to the user device in 206 may also include a catalog image 520 of the item, as shown in FIG. 7. The user can use this catalog image to verify that the item that the user is desiring to purchase matches the catalog image.

After the user has reviewed the additional information, processing continues with the second part of the authenticity verification check. At 207, the user requests a seller code associated with the retailer. The request in 207 may be an in-person request from the user to the retailer. Alternatively, the request in 207 can be sent from the user computing device to the computer system associated with the retailer (e.g., retailer computing device 104).

At 208, the computer system associated with the retailer may provide a seller code associated with the retailer for input to the user computing device. For example, the seller code may be in the form of a machine-readable code such as a QR code assigned to the retailer by the authenticity system 102 (or by an ASP providing the authenticity infrastructure) and may contain information uniquely identifying the retailer (e.g., a unique number associated with the retailer). In certain embodiments, the QR code may contain additional seller information such as name, city, and/or country.

There are various ways in which a seller code may be provided to the user. In one embodiment, a retailer computing device may display the seller code through a user interface of an authenticity verification application executed by the retailer computing device (e.g., by application 124 depicted in FIG. 1). Alternatively, the retailer may provide a physical copy (e.g., a printout) of the seller code to the user. Because the seller code identifies the retailer and is presented to the user as proof of authenticity (subject to further verification), the seller code can be considered to be a form of provisional authenticity certificate. The retailer may provide the seller code in response to the user requesting proof that the item is authentic.

Figure 8:
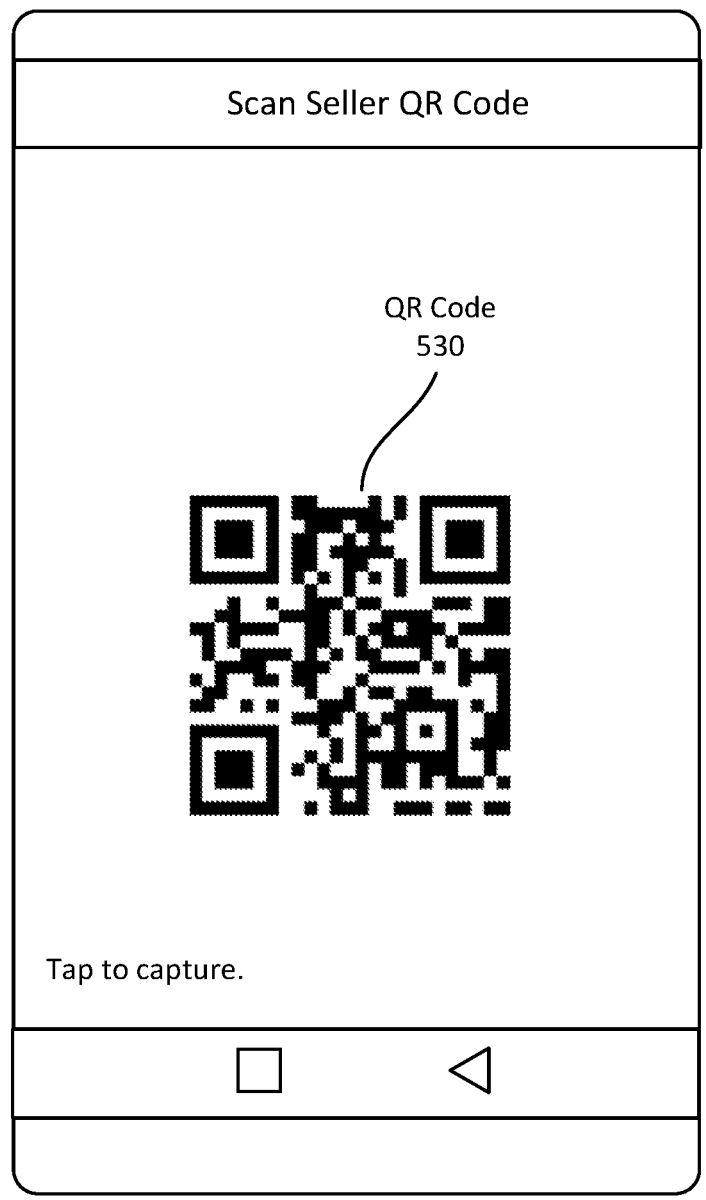
FIG. 8 illustrates a seller code in the form of a Quick Response code according to certain embodiments.

At 210, the seller code is communicated from the user device to the authenticity system 102. This can be done, for example, by scanning the seller code using application 126 executing on the user device and using a camera built into or coupled to the user computing device, which then causes the seller code to be communicated to authenticity system 102. FIG. 8 shows an example QR code 530 about to be captured by a user computing device. Once captured, the seller code is communicated to authenticity system 102, and processing proceeds to 212.

Figure 31:
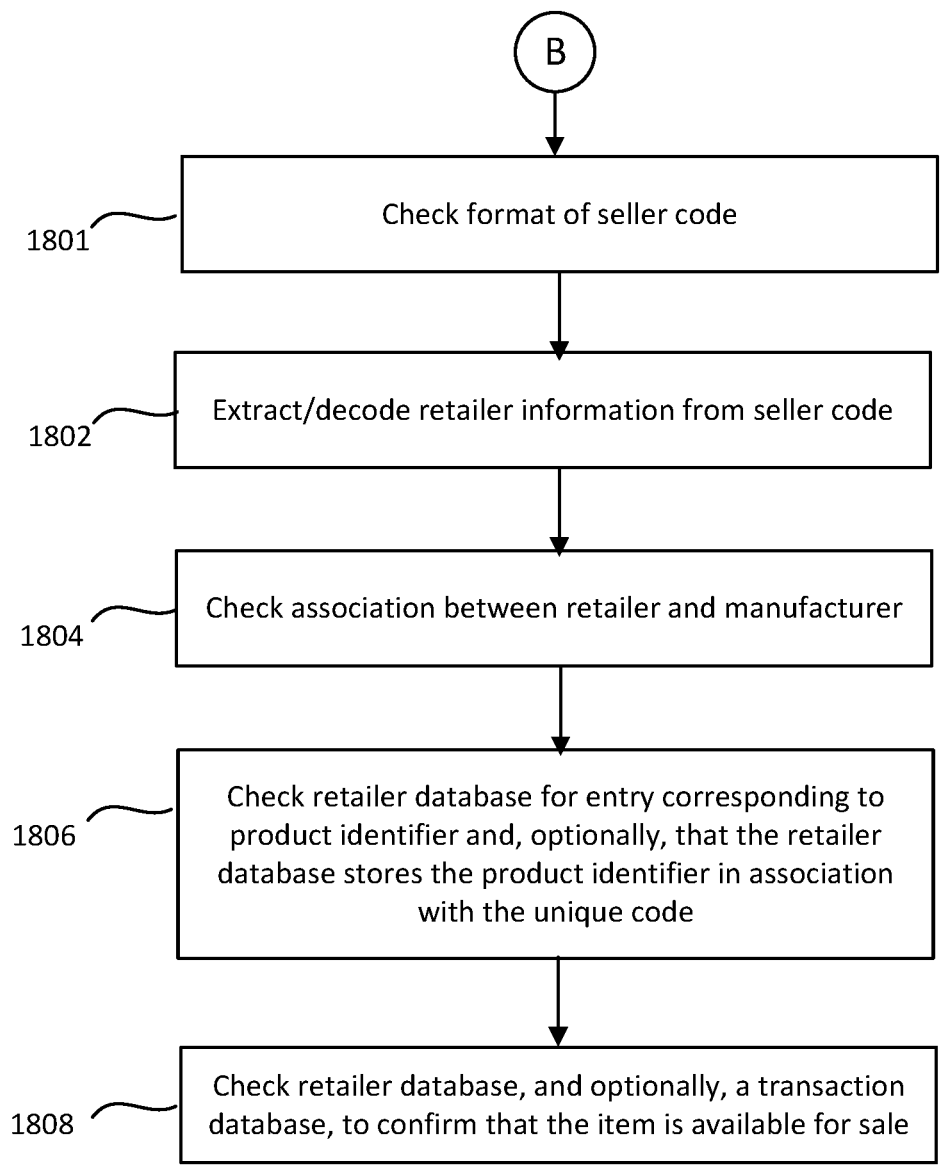
FIG. 31 illustrates processing that can occur during the processes depicted in FIGS. 2, 3, and 4 according to certain embodiments.

FIG. 31 depicts processing which can be performed to implement 212 of FIG. 1. At 1801, the authenticity system 102 checks the format of the seller code received from the user device in 210. The check in 1801 is a preliminary check of the seller code to confirm that the seller code is facially valid, e.g., that the seller code is plausibly a seller code that was generated by the authenticity system for the retailer because the format is as expected. If the format is not as expected, the seller code is deemed invalid, a message may be sent to the user computing device indicating that the seller is unauthorized, and processing ends. Otherwise, processing proceeds to 1802.

Figure 12:
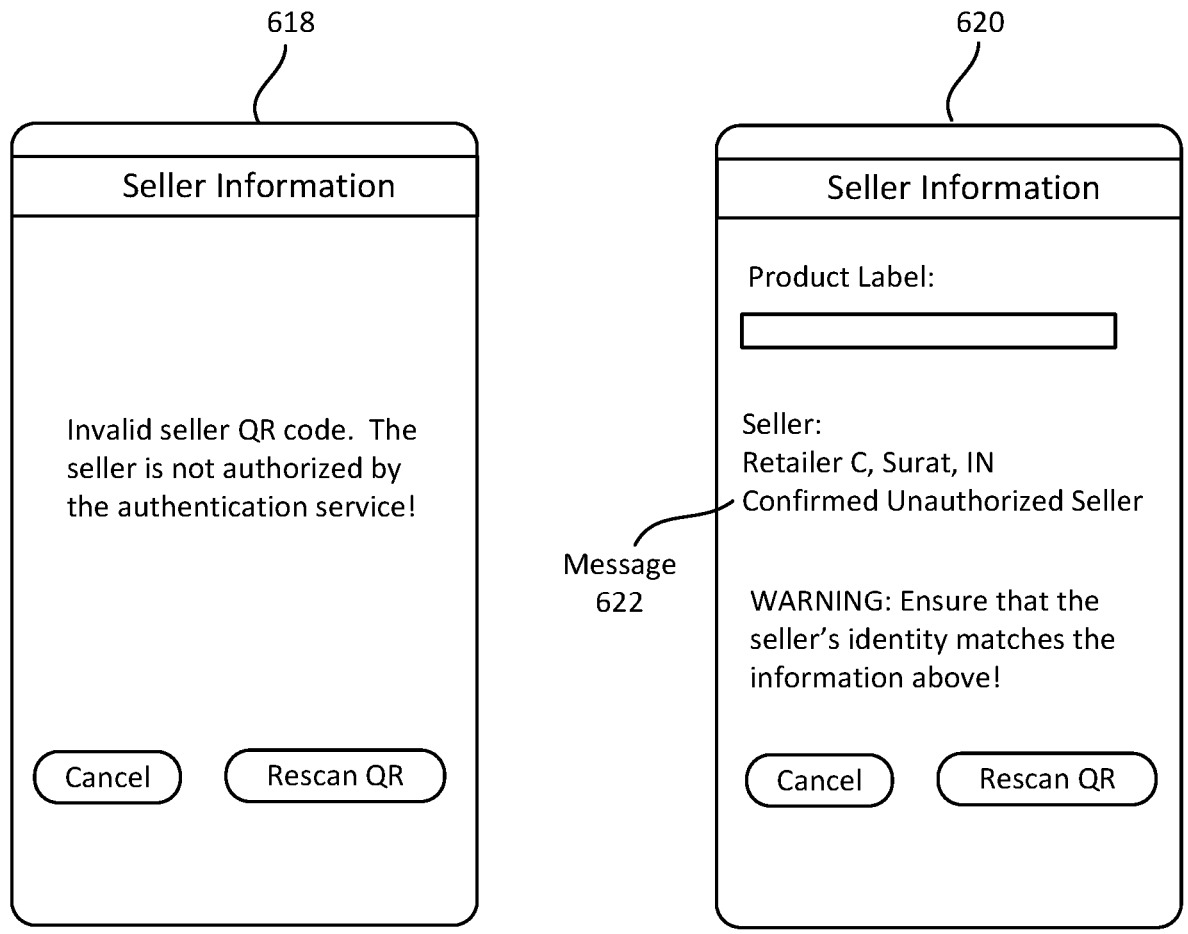
FIG. 12 illustrates user interfaces confirming that a seller is an unauthorized seller according to certain embodiments.

FIG. 12 illustrates a user interface 618 that can be output when the seller code is determined to be invalid. In some embodiments, the user interface 618 is provided by the authenticity verification application executing on the user computing device in response to a message communicated to the user computing device after determining that the seller code is invalid in 1801.

At 1802, the authenticity system 102 extracts/decodes retailer information from the seller code received from the user device in 210. Authenticity system 102 then uses the decoded retailer information to, based on the processing in 1804, 1806, and 1808, verify whether the retailer identified by the seller code is an authorized seller and authorized to sell the item identified by the item information decoded from the seller code.

At 1804, the authenticity system 102 checks for an association between the retailer identified by the seller code and the manufacturer determined in 1708 of FIG. 30. The check in 1804 can be performed, for example, by searching the registry 109 to determine whether the registry contains information indicating that the retailer is associated with the manufacturer. For instance, the authenticity system 102 can store, in the registry 109 and for each downstream entity associated with the manufacturer, information about the downstream entity's name, location, country, etc. This information may be provided during entity registration and is typically supplied by the manufacturer, but may also be supplied by the downstream entity. If the retailer is associated with the manufacturer, then the retailer is deemed to be an authorized seller and processing continues to 1806. Otherwise, authenticity system 102 may respond with a message indicating that the seller is not an authorized seller.

FIG. 12 further illustrates a user interface 620 that can be output when a retailer is determined to be unauthorized. In some embodiments, the user interface 620 is provided by the authenticity verification application executing on the user computing device and in response to a message communicated to the user computing device upon determining in 1804 that there is no association between the retailer and the manufacturer. As shown in FIG. 12, the user interface 620 may display a message 622 indicating that the retailer has been confirmed to be unauthorized.

At 1806, the authenticity system 102 checks the database associated with the retailer identified by the seller code (e.g., via a request sent to the retailer node 906 in FIG. 21) for an entry corresponding to the product identifier received in 1702 of FIG. 30. Further, the authenticity system 102 can check whether the matching product identifier is stored in the retailer database in association with the same unique code as that which is stored by the manufacturer database or the registry 109. If there is no entry corresponding to the product identifier or the product identifier is not stored in association with the unique code, then the authenticity system 102 may respond with a message indicating that the item is counterfeit. Otherwise, processing proceeds to 1808.

At 1808, the authenticity system 102 checks the database associated with the retailer identified by the seller code to confirm that the item identified by the information communicated in 204 is available for sale (e.g., marked or otherwise indicated as unsold). In some embodiments, the authenticity system 102 may search the retailer database to locate a transaction record (which may be part of the matching entry from 1806) indicating that the retailer acquired the item from another entity in the chain of ownership. Additionally, the authenticity system 102 may optionally search a transaction database (e.g., transaction database 914 in FIG. 21) to further confirm that the item is available for sale, e.g., by determining that there is a record of the same transaction in which the retailer acquired the item and/or by determining there is no transaction record indicating that the retailer in turn sold the item to another entity. In some embodiments, the authenticity system 102 may search the transaction database to trace the entire ownership history of the item and confirm that the chain of ownership terminates with the retailer.

Returning to FIG. 2, at 216, the authenticity system 102 sends a communication to the user computing device indicating the results of the verifications performed in 205 and 212. For example, authenticity system 102 may send a message to the user computing device indicating that the retailer is an authorized seller and that the item is authentic. Alternatively, the message sent to the user device from authenticity system 102 may indicate that the retailer is not an authorized seller and/or that the item is counterfeit, and hence the authenticity verification for the item has failed.

At 218, the user may take action in response to the message received from authenticity system 102 in 216, which may be displayed in a user interface of the authenticity verification application executing on the user computing device. For example, the user may decide to proceed with purchasing the item if the response from the authenticity system 102 in 216 indicates that the all authenticity verifications passed successfully. Alternatively, if the response received from authenticity system 102 in 216 indicates that authenticity verification failed, the user may decide not to purchase the item.

As part of the action performed in 218, the user may purchase the item using the authenticity verification application. For example, the action performed in 218 may include an action taken by the user to "checkout" by tendering physical or electronic currency, thus completing payment. Authenticity system 102 may request that the computer system associated with the retailer generate a transaction receipt for the user upon completion of payment.

At 219, the user computing device may, in response to a checkout related action performed in 218, send a communication indicating that the user has bought the item. In some embodiments, the authenticity system 102 may operate as an intermediary between the user and the retailer during completion of the purchase. For example, when the user goes to checkout, the authenticity system 102 can generate a record of intent to purchase, mark the item as temporarily being on hold (e.g., by updating the retailer's database) and inform the retailer that the user is waiting to complete the purchase.

If the user completes payment at 218, the authenticity system 102 may, at 220, generate an authenticity certificate for the user in response to receiving the communication in 219 and further in response to receiving information indicating that the item was sold to the user. For example, upon receipt of payment, the retailer can mark the item as sold (e.g., by using the authentication application executing on the retailer computing device to update the retailer's database) and generate a receipt for the user. Once the item is marked as sold, the authenticity system 102 may generate the authenticity certificate based on the details of the transaction.

In some embodiments, the authenticity certificate may include a combination of the following items of information: manufacturer information (e.g., name, location, and/or country), retailer information (e.g., name, location, and/or country), item information (e.g., product identifier and/or serial number), consumer information (e.g., user name, email address, and/or phone number), a date or timestamp indicating the time of generation of the authenticity certificate, and a cryptographic hash generated specifically for the authenticity certificate.

Additionally, at 220, the authenticity system 102 may apply any discount or rewards points provided by the manufacturer and automatically register the user for the manufacturer's warranty. Processing then proceeds to 220. If the purchase transaction isn't completed for some reason (e.g., the retailer does not receive payment for the item), then the retailer can remove the temporary hold by updating the retailer database or requesting that the authenticity system remove the hold, no receipt or authenticity certificate is generated, and processing ends.

At 222, the authenticity system communicates the authenticity certificate to the user computing device, e.g., by sending the authenticity certificate along with a copy of the receipt to the user's email address. The authenticity certificate and receipt can also be stored in a user database (e.g., a record in the user database 118) and accessed on demand via the authenticity verification application executing on the user computing device.

Figure 11:
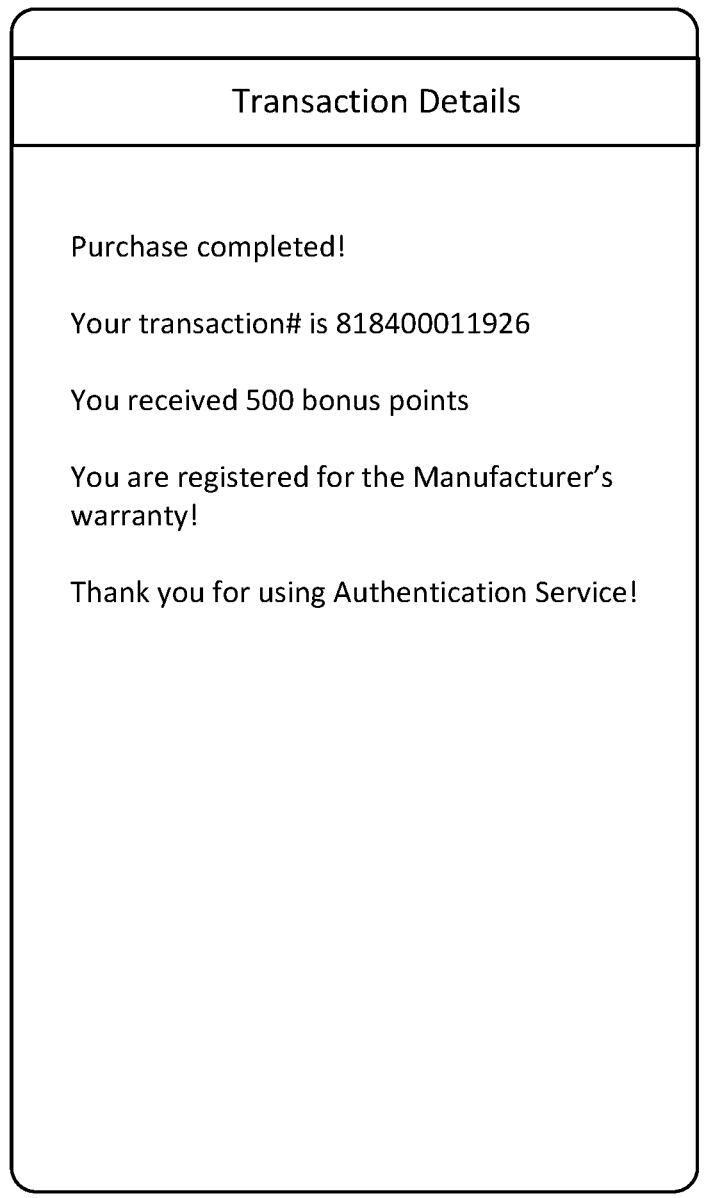
FIG. 11 illustrates a user interface confirming completion of a purchase transaction according to certain embodiments.

FIG. 11 illustrates a user interface confirming completion of a purchase transaction, according to an embodiment. The user interface of FIG. 11 shows a purchase transaction number (e.g., order number), rewards points accumulated as a result of the purchase, and a confirmation that the user has been registered for a manufacturer warranty.

The processing depicted in FIGS. 30 and 31 (described above) may be implemented in software (e.g., code, instructions, program) executed by one or more processing units (e.g., processors, cores) of the respective systems, hardware, or combinations thereof. The software may be stored on a non-transitory storage medium (e.g., on a memory device). The methods presented in FIGS. 30 and 31 and described above are intended to be illustrative and non-limiting. Although FIGS. 30 and 31 depict the various processing steps occurring in a particular sequence or order, this is not intended to be limiting. In certain alternative embodiments, the steps may be performed in some different order or some steps may also be performed in parallel. Additionally, the steps depicted in FIGS. 30 and 31 can be combined in various ways. For example, at least some of the database searches performed in FIGS. 30 and 31 can be incorporated into other processes for verifying the authenticity of an item, such as the process depicted in FIG. 32.

Figure 32:
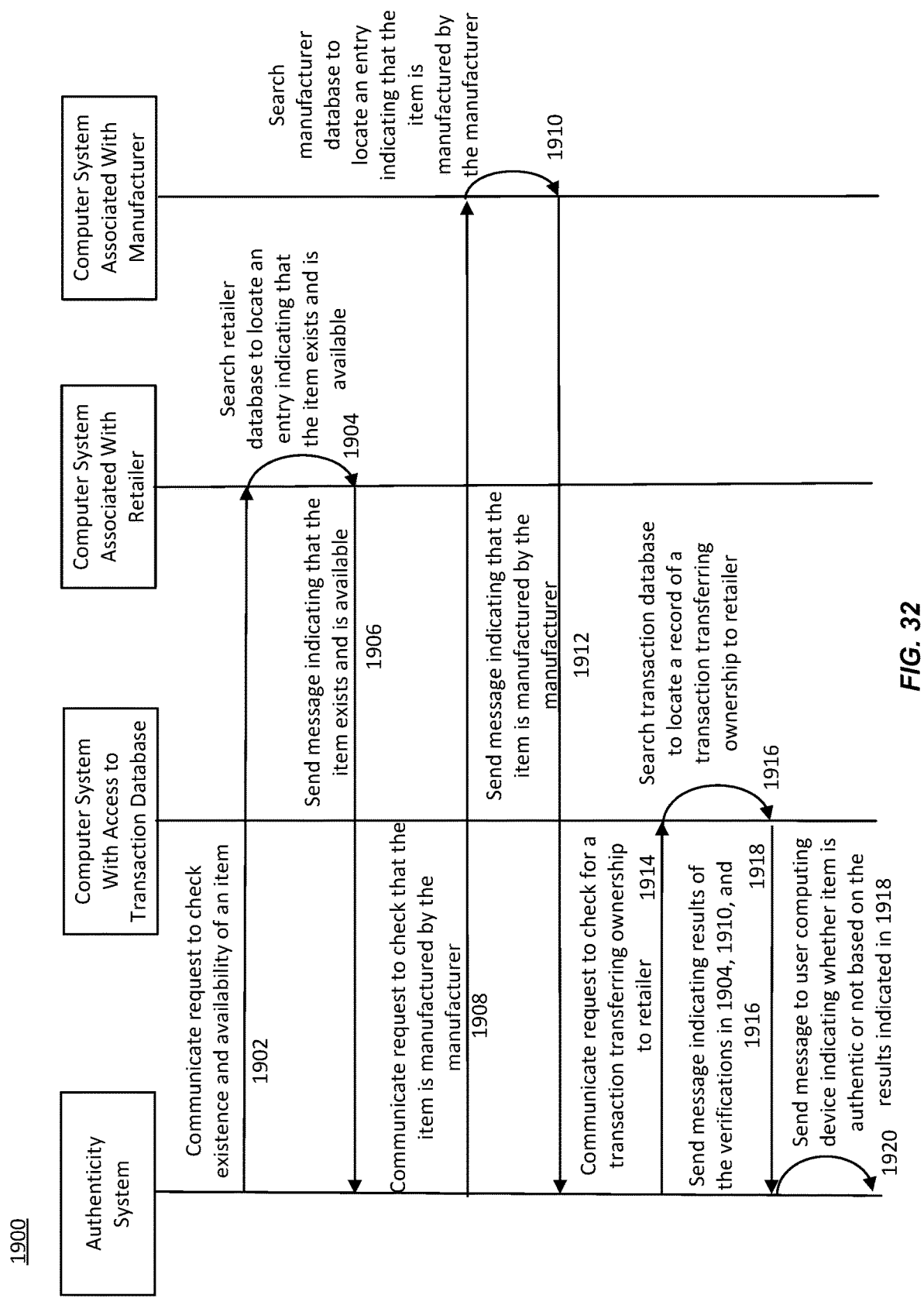
FIG. 32 illustrates a process for verifying the authenticity of an item based on checking various databases in an authenticity infrastructure according to certain embodiments.

FIG. 32 illustrates a process 1900 for verifying the authenticity of an item based on checking various databases in an authenticity infrastructure according to certain embodiments. The processing depicted in FIG. 32 is applicable to both a physical retail setting and an ecommerce setting, and can be incorporated, in whole or in part, into the processes depicted in FIGS. 2-4.

The processing depicted in FIG. 32 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 32 and described below is intended to be illustrative and non-limiting. Although FIG. 32 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 21, the processing depicted in FIG. 32 may be performed by a combination of authenticity system 102, a computer system with access to a transaction database (e.g., notary node 904), a computer system associated with a retailer (e.g., retailer node 906), and a computer system associated with a manufacturer (e.g., manufacturer node 902).

At 1902, the authenticity system 102 communicates a request to the computer system associated with the retailer to check the existence and availability of an item. The request may include information associated with the item whose authenticity is to be determined (e.g., a part number or other product identifier).

At 1904, the computer system associated with the retailer searches a retailer database associated with the retailer to confirm that the item exists and is available for sale by the retailer.

For example, the search in 1904 may involve locating an entry in the retailer database indicating that the item identified by the information communicated in 1902 is available (e.g., marked or otherwise indicated as unsold). If the retailer database is structured as shown in FIG. 26, the search may involve (1) determining that there exists a record of a transaction conveying the item to the retailer and/or (2) determining that there does not exist a record of a transaction in which the retailer has sold the item to another entity, e.g., to a consumer.

At 1906, the computer system associated with the retailer sends a message to the authenticity system 102 indicating that the item exists and is available.

At 1908, the authenticity system 102 communicates a request to the computer system associated with the manufacturer to check that the item is an item manufactured by the manufacturer. The request in 1908 can include the same item information communicated in 1902.

At 1910, the computer system associated with the manufacturer searches a database associated with the manufacturer to locate an entry indicating that the item is manufactured by the manufacturer. For example, if the manufacturer database is structured as shown in FIG. 26, the search in 1910 may involve determining that there is a record of a transaction in which the manufacturer conveyed the same item to another entity in the chain of ownership. Alternatively or additionally, the search in 1910 may involve locating an entry corresponding to a product identifier (e.g., based on the processing in 1710 of FIG. 30).

At 1912, the computer system associated with the manufacturer sends a message to the authenticity system 102 indicating that the item is manufactured by the manufacturer.

At 1914, the authenticity system 102 communicates a request to the computer system with access to the transaction database to check for a transaction transferring ownership to the retailer. The request in 1914 can include the same item information communicated in 1902.

At 1916, the computer system with access to the transaction database searches the transaction database (e.g., transaction database 914) to locate a record of a transaction transferring ownership of the item to the retailer. If the transaction database is structured as shown in FIG. 27, then the search in 1916 may involve determining that the retailer acquired the item from another entity, but the identity of the conveying party may not be determined. The search in 1916 may further involve determining that there is no record of a transaction in which the retailer is the conveyer of the same item (e.g., a second transaction that "consumed" the earlier transaction in which the retailer acquired the item).

Accordingly, the database searches performed in 1904, 1910, and 1916 may be used to collectively determine that: (1) there exists an unsold item in the retailer's database, e.g., an item that matches item information provided by the consumer using the authentication application executing on the user computing device, (2) there exists a record of sale of the same item in the manufacturer's database, and (3) there exists a record of a transaction in the transaction database indicating that the retailer has acquired this item from another entity in the chain of ownership.

At 1918, the computer system with access to the transaction database sends a message to the authenticity system 102 indicating the results of the verifications performed in 1904, 1910, and 1916. If the message indicates that the verifications in 1904, 1910, and 1916 were all successful, then the item may be deemed authentic and processing proceeds to 1920. Otherwise, the verification of the authenticity of the item fails.

At 1920, the authenticity system 102 sends a message to the user computing device indicating whether the item is authentic or not based on the results indicated in the message from the computer system with access to the transaction database in 1918. In some embodiments, the message sent in 1920 is displayed via a user interface provided by the authentication application executing on the user computing device.

Authenticity Check Based on a Seller Code—Electronic Commerce Example

FIG. 3 illustrates a process 300 for determining authenticity using the authenticity infrastructure in an ecommerce environment according to certain embodiments. The processing depicted in FIG. 3 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 3 and described below is intended to be illustrative and non-limiting. Although FIG. 3 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 21, the processing depicted in FIG. 3 may be performed by a combination of a computer system associated with a retailer (e.g., retailer node 906), user computing device 106, and authenticity system 102.

The process 300 assumes that a user is browsing an ecommerce store (e.g., a web store on the Internet) through user computing device 106. The ecommerce store can be a store operated by a single retailer or a marketplace through which the user can purchase from multiple retailers, possibly including retailers who are not registered with the authenticity system 102.

At 302, the computer system associated with a retailer generates images for a listing on the ecommerce store. The images may comprise item images (e.g., photos of the item from different perspectives) and an image of a seller code. The image of the seller code can be in a stand-alone image or part of an item image. The images can be exported to the ecommerce site, e.g., by uploading the images to a web server that hosts the ecommerce store.

Like the seller code described in connection with FIG. 2, the seller code for which an image is generated in 302 is a code associated with the retailer offering the item for sale. The seller code can therefore include seller information. The seller code can be displayed as a stand-alone image (a QR code by itself), in an image of the item, or in an image of the item's packaging. This enables the retailer to work under constraints that the ecommerce store may impose with respect to what types of information the retailer can communicate to the user via the ecommerce store. For example, the retailer may be constrained to providing product images, product description and pricing information.

Because the user cannot obtain item information in the same manner as in a brick-and-mortar store (e.g., according to 202 in FIG. 2), item information can be provided to the user in other ways. For instance, in some embodiments, as a convenience to the user, the seller code may, in addition to seller information, also include the same item information as that obtained in 202, and possibly other information relevant to verifying the authenticity of an item, such as manufacturer information. The information in the seller code may also be included elsewhere in the listing, e.g., as plaintext.

At 304, the user browses the listing to obtain the seller code. For example, the user may access the ecommerce store using a web browser executed on the user computing device 106 to display the listing in a user interface of the web browser. The seller code can therefore be obtained by taking a screen capture or using a camera integrated into or coupled to the user computing device.

Figure 16:
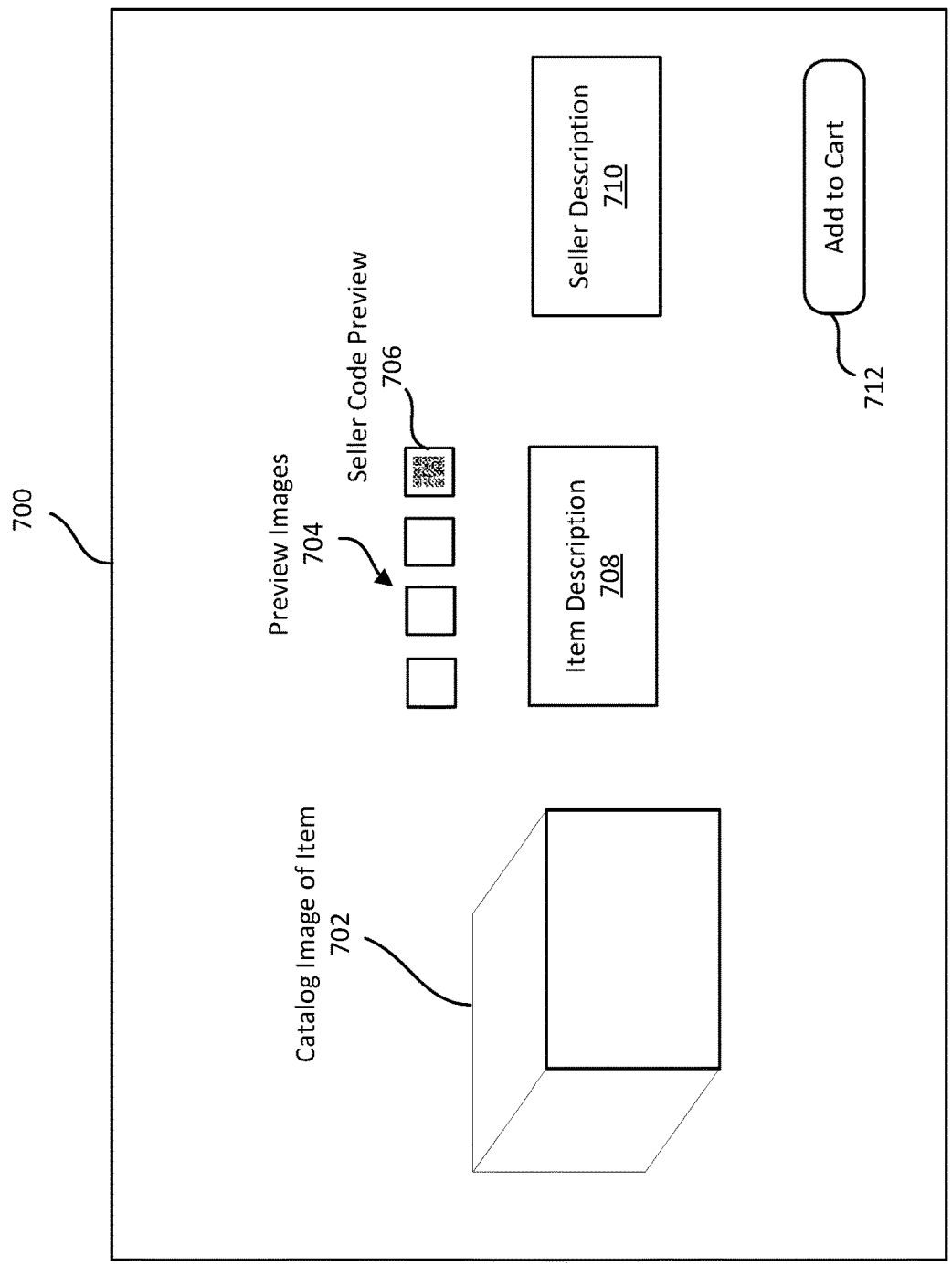
FIG. 16 illustrates a user interface displaying an electronic product listing according to certain embodiments.

FIG. 16 shows a user interface 700 displaying a listing for an ecommerce store according to certain embodiments. The user interface 700 shows a catalog image 702 of an item, a set of preview images 704 (e.g., thumbnails), an item description 708, a seller description 710, and an option 712 to add the item to a shopping cart. The catalog image 702 may correspond to a larger sized version of a currently selected preview image from among the preview images 704. To display the seller code, the user can select a preview image 706 containing the seller code. In certain embodiments, user interface 700 may be provided by application 126 executing on user computing device 106, as depicted in FIG. 1. In other embodiments, user interface 700 may be provided by a web browser executing on user computing device 106 or some other device associated with the user.

Figure 17:
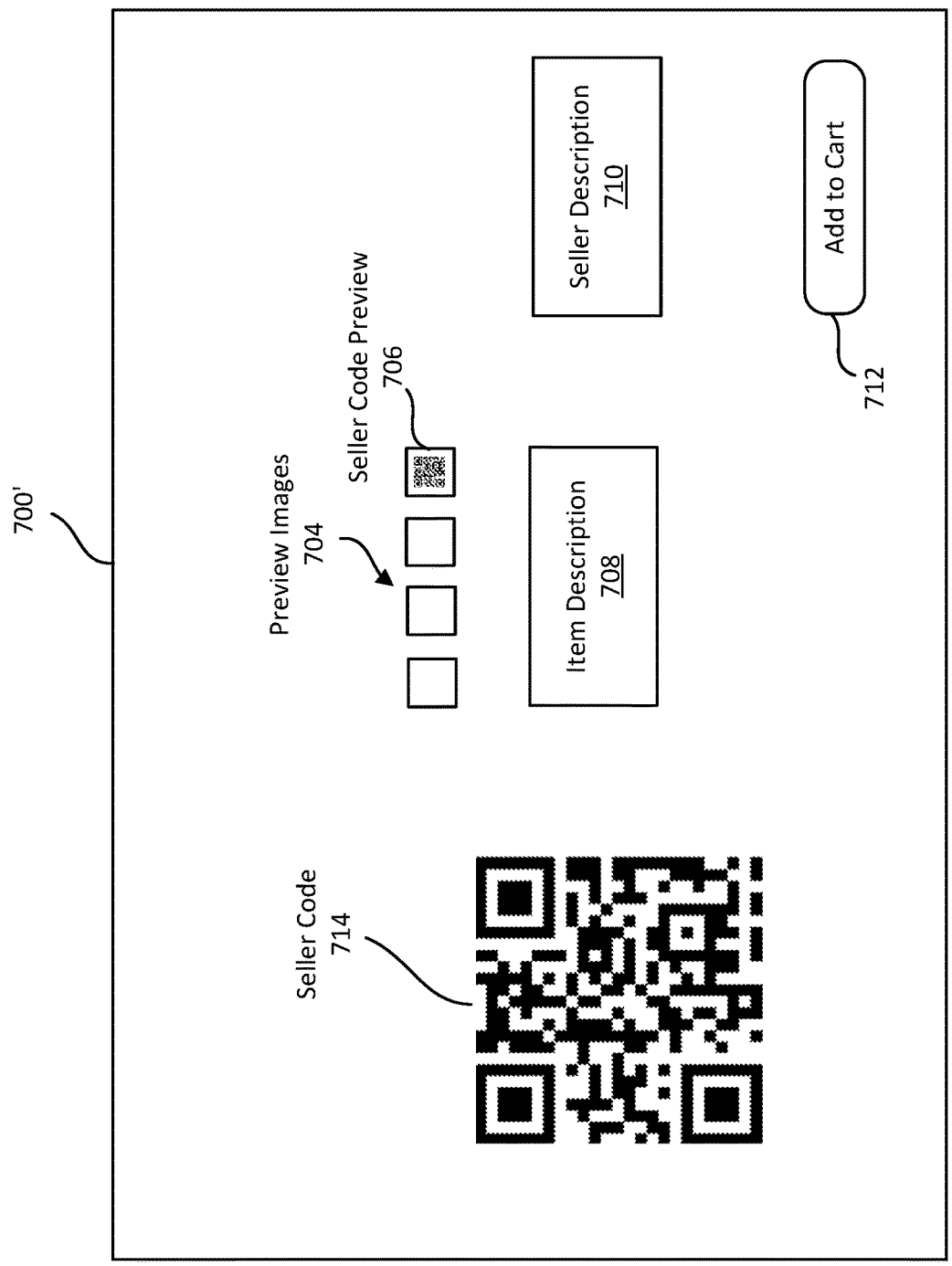
FIG. 17 illustrates a user interface displaying a seller code as part of an electronic product listing according to certain embodiments.

FIG. 17 shows a user interface 700' corresponding to the user interface 700 of FIG. 16 updated to reflect selection of the preview image 706. The catalog image 702 of the item has been replaced with a larger size image of a seller code 714 which, as depicted in FIG. 17, can be a QR code.

At 306, the user initiates a request for authenticity verification of the item by communicating the seller code obtained in 304. The initiation of the request in 306 can be performed in a similar manner as 204 of FIG. 2, except that the seller code is communicated with the request. As indicated above, the seller code may include both item information and seller information. Therefore, item information may be communicated as part of communicating the seller code in 306.

Upon receiving the seller code in 306, and as part of the authenticity verification, authenticity system 102, at 308, performs the same checks as in 205 of FIG. 2, e.g., based on the processing depicted in FIG. 30.

At 310, the authenticity system 102 communicates seller information associated with the seller code (e.g., a seller name obtained from the registry 109) along with a request that the user confirm the accuracy of the seller information. The authenticity system 102 may also communicate, along with the seller information, item information (e.g., information stored in registry 109 in association with a product identifier obtained from the seller code). The information and request communicated in 310 can be output on a user interface provided by the authenticity verification application executing on the user computing device, e.g., the user interface depicted in FIG. 18.

Figure 18:
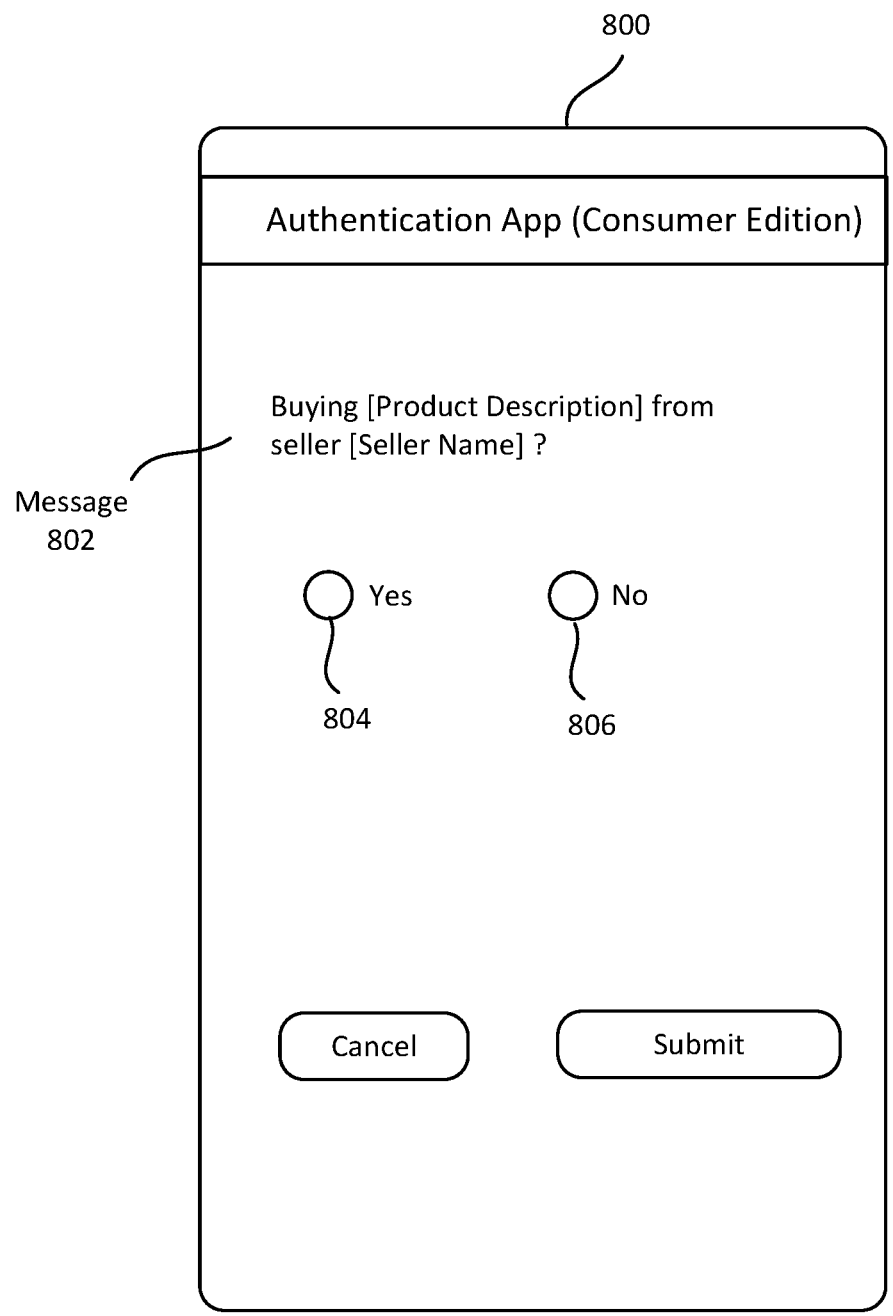
FIG. 18 illustrates a user interface requesting user confirmation of the accuracy of seller information according to certain embodiments.

In FIG. 18, a user interface 800 includes a message 802 asking the user to confirm whether the user is purchasing a particular item (indicated by an item description) from a particular retailer (indicated by a seller name). The user interface 800 includes options 804 and 806 for confirming that the displayed information is accurate or inaccurate, respectively.

At 312, the authenticity system 102 performs the same checks as in 212 of FIG. 2, e.g., based on the processing depicted in FIG. 31. As depicted in FIG. 3, the processing in 312 can be performed prior to sending the communication to the user computing device in 310.

At 314, the authenticity system 102 receives, from the user computing device, a confirmation indicating that the information communicated in 310 is accurate (e.g., based on selection of the option 804 in FIG. 18). The user may provide the confirmation after comparing the displayed information to information contained in the ecommerce listing.

At 316, the authenticity system 102 sends, in response to the confirmation in 314, a communication indicating the results of the verifications in 308 and 312 for display on the user computing device.

Figure 19:
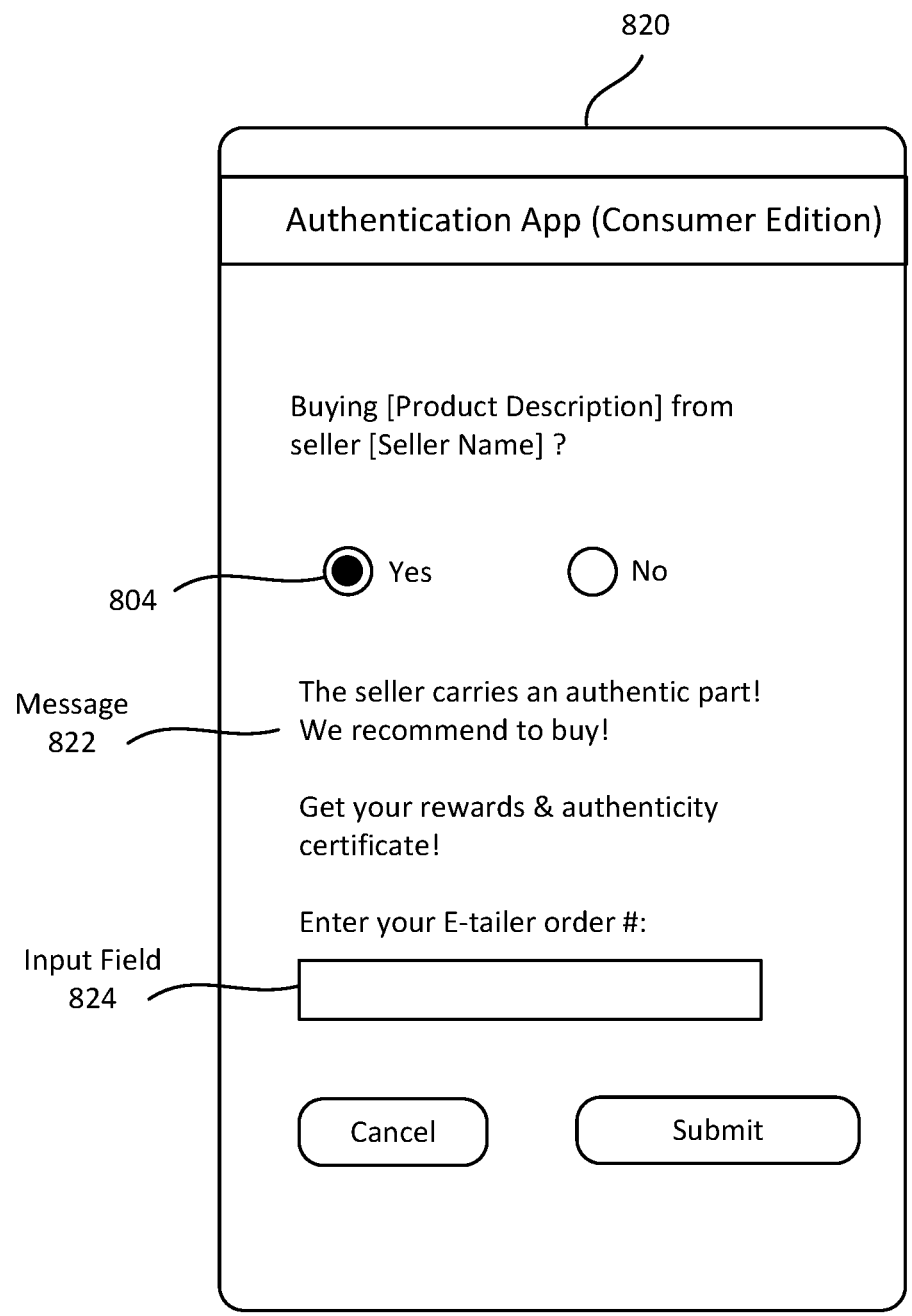
FIG. 19 illustrates the user interface of FIG. 18 after the user has confirmed the accuracy of seller information according to certain embodiments.

FIG. 19 shows a user interface 820 according to certain embodiments. The user interface 820 can be displayed after the user has confirmed that the information communicated by the authenticity system 102 regarding the item and the retailer are accurate, and after the authenticity system 102 has verified that the item is authentic. The user interface 820 shows a message 822 indicating that the item is authentic. The user interface 820 further includes an input field 824 for inputting an order number (e.g., a number obtained after completing purchase of the item through the ecommerce store) in order to receive rewards points and an authenticity certificate.

If the user indicates that the displayed information is inaccurate (e.g., because the information communicated in 310 does not match the information in the listing), then the authenticity system 102 may communicate a message indicating that the retailer may be a counterfeiter. This message can be displayed through a user interface provided by the authentication application along with an option to report the retailer as a potential counterfeiter.

Figure 20:
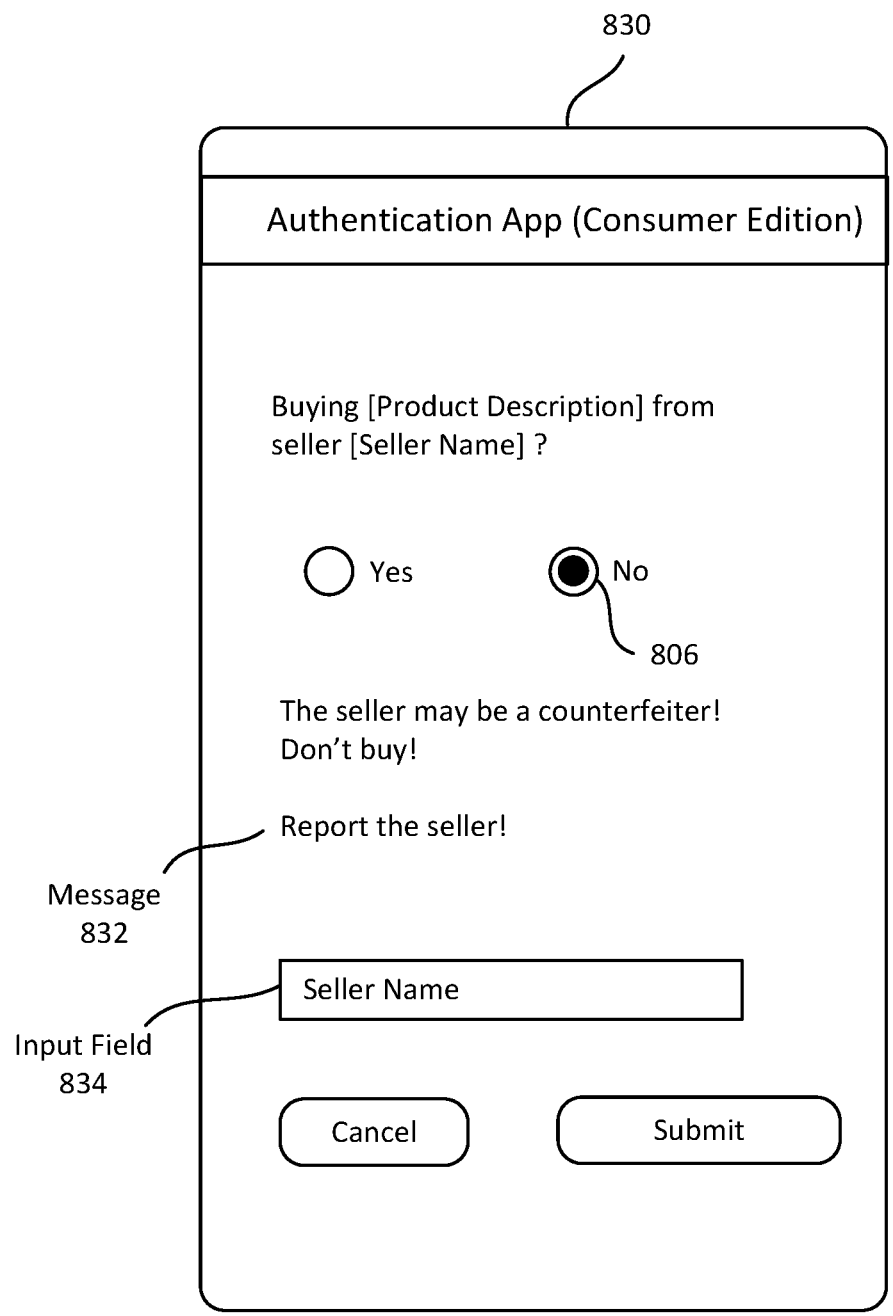
FIG. 20 illustrates the user interface of FIG. 18 after the user has confirmed that seller information is not accurate according to certain embodiments.

For example, FIG. 20 shows a user interface 830 displaying a message 832 recommending that the user report the retailer and further displaying an input field 834 for inputting the retailer's name. The same message 832 may be displayed, along with the option to report the retailer, if any of the checks in 308 and 312 fail (e.g., the retailer is not recognized as an authorized seller or the item is not owned by the retailer). If the user reports the retailer, the authenticity system 102 can alert the manufacturer that the retailer is a potential counterfeiter, e.g., via a communication sent to the computer system associated with the manufacturer.

At 318, the user takes action in response to the communication in 316. For example, the user may complete the purchase of the item through the ecommerce store, e.g., using a browser executing on the user computing device. The action taken at 318 can be performed in a similar manner as in 218 of FIG. 2.

At 319, the user computing device may, in response to a checkout related action performed in 318, send a communication indicating that the user agrees to buy the item. The communication in 319 can be performed in a similar manner as the communication in 219 of FIG. 2.

At 320, the authenticity system generates an authenticity certificate. The generating of the authenticity certificate at 320 can be performed in a similar manner as in 220 of FIG. 2, e.g., in response to receiving the communication in 319 indicating the user bought the item.

At 322, the authenticity system communicates the authenticity certificate generated in 320 to the user. The communication of the authenticity certificate in 322 can be performed in a similar manner as in 222 of FIG. 2.

Authenticity Check Based on a Dynamic Seller Code

FIG. 4 illustrates a process for determining authenticity using the authenticity infrastructure in a brick-and-mortar retail environment according to certain embodiments. The processing depicted in FIG. 4 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 4 and described below is intended to be illustrative and non-limiting. Although FIG. 4 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 21, the processing depicted in FIG. 4 may be performed by a combination of a computer system associated with a retailer (e.g., retailer node 906), user computing device 106, and authenticity system 102.

The process 400 involves the use of a dynamically generated seller code instead a static seller code. The process 400 assumes a physical retail setting, but dynamic codes can also be used for determining authenticity of an item in an ecommerce setting. Additionally, one of ordinary skill in the art will understand that different embodiments may be combined. For example, various user interfaces that are described with respect to the process 300 or process 400 can also be generated in connection with other embodiments, such as the embodiment of FIG. 2.

At 402, the user obtains item information for a physical item in the retailer store. The obtaining of the item information in 404 can be performed in to similar manner as in 202 of FIG. 2.

At 404, a request for performing authenticity verification for the item is initiated by communicating the information obtained in 402 to authenticity system 102. The request in 404 can be initiated in a similar manner as in 204 of FIG. 2.

Upon receiving the information in 404, and as part of the authenticity verification, authenticity system 102 is configured to perform various checks to (1) verify the source (e.g., the manufacturer) of the item; and (2) verify whether the retailer from whom the user is buying the product is actually authorized to sell the item. This processing begins at 405, which is analogous to 205 of FIG. 2 and can include the processing depicted in FIG. 30.

At 406, the authenticity system 102 optionally generates and communicates to the user computing device additional item information for display at the user computing device. The processing at 406 can be performed in a similar manner as in 206 of FIG. 2.

At 407, the user requests a seller code associated with the retailer. The request at 407 can be communicated in a similar manner as in 207 of FIG. 2.

At 408, the computer system associated with the retailer generates a seller code associated with the retailer. The seller code generated in 408 is, in certain respects, analogous to the seller code provided in 208 of FIG. 2. For example, the seller code in 408 can include information by which the identity of the retailer can be ascertained. In certain embodiments, the seller code generated in 408 is a QR code. Additionally, the seller code generated in 408 further comprises a one-time-password (OTP), which can be a numeric or alphanumeric code that is time-based. In some embodiments, the seller code is generated based on the retailer communicating, to the retailer node 906 and via the authenticity verification applying executing on retailer computing device 104, information about the item whose authenticity is to be verified. For example, the OTP can be generated as a function of a product identifier, a serial number of the item, and/or a unique code associated with the item. The OTP can be generated further as a function of time and, in certain embodiments, has a validity period associated with it. The item information can be input manually or by scanning a barcode or wireless communication tag on the item, similar to the scanning described in connection with 202 of FIG. 2.

Figure 14:
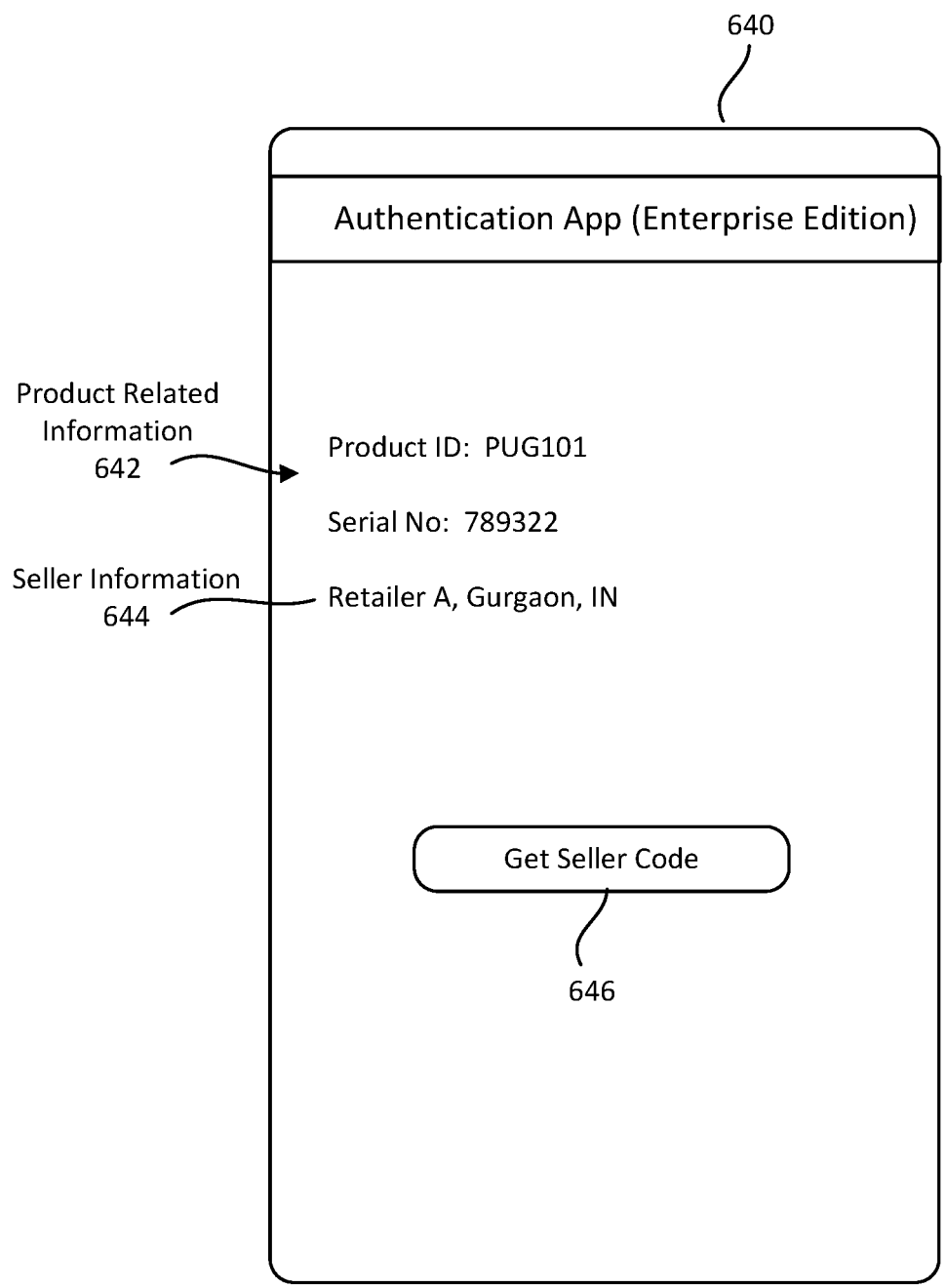
FIG. 14 illustrates a user interface displaying an option to obtain a seller code according to certain embodiments.

FIG. 14 shows a user interface 640 displaying an option 646 to obtain a seller code according to certain embodiments. The user interface 640 may be generated by the authentication application on the retailer computing device and based on item information received from a retailer (e.g., information provided in 408), and shows product related information 642 (e.g., a unique code generated for a product identifier) and seller information 644 (e.g., the name, location, and/or country of the retailer).

At 409, the computer system associated with the retailer provides the seller code generated in 408 for input to the user computing device. The providing of the seller code in 409 can be performed in a similar manner as in 208 of FIG. 2.

At 410, the seller code is communicated from the user device to the authenticity system 102. The communicating of the seller code in 410 can be performed in a similar manner as in 210 of FIG. 2.

At 412, the authenticity system 102 receives the seller code communicated in 410 and generates a second seller code to determine whether the second seller code matches the received seller code. The second seller code is generated using the same information and the same algorithm as that used to generate the seller code in 408. The OTP portion of the second seller code can be a function of item information (e.g., a product identifier, a serial number of the item, and/or a unique code associated with the item) extracted from the received seller code. The OTP portion of the second seller code can, additionally, be a function of time (e.g., based on the same time source used to generate the OTP in 408). In certain embodiments, only the OTP portions of the seller codes are compared to determine whether the seller codes match. If the seller codes don't match, this indicates that the seller may be an impostor and the authenticity verification is deemed to have failed. In such a scenario, authenticity system 102 may send a message back to the requesting user's computing device indicating that authenticity verification for the item has failed and processing ends. Additionally, as indicated above, the OTP generated at 408 may, in certain embodiments, have a limited period of validity. Thus, if the validity period of the OTP generated at 408 has expired, the authenticity verification for the item may be deemed to have failed because the OTP portion of the seller codes won't match. If the seller codes match and the OTP generated at 408 has not expired, then processing proceeds to 414.

At 414, the authenticity system 102 performs the same checks as in 212 of FIG. 2, e.g., based on the processing depicted in FIG. 31. In some embodiments, the process 400 may include processing analogous to that performed in 310 and 312 of FIG. 3. For example, the authenticity system 102 may, after confirming that the retailer is an authorized seller based on checking the association between the retailer and the manufacturer in 1804 of FIG. 31, send a message to the user's computing device requesting that the user confirm that the information extracted from the received seller code is accurate. The message may be displayed on a user interface provided by the authenticity verification application executing on the user computing device, as shown in FIG. 9.

Figure 9:
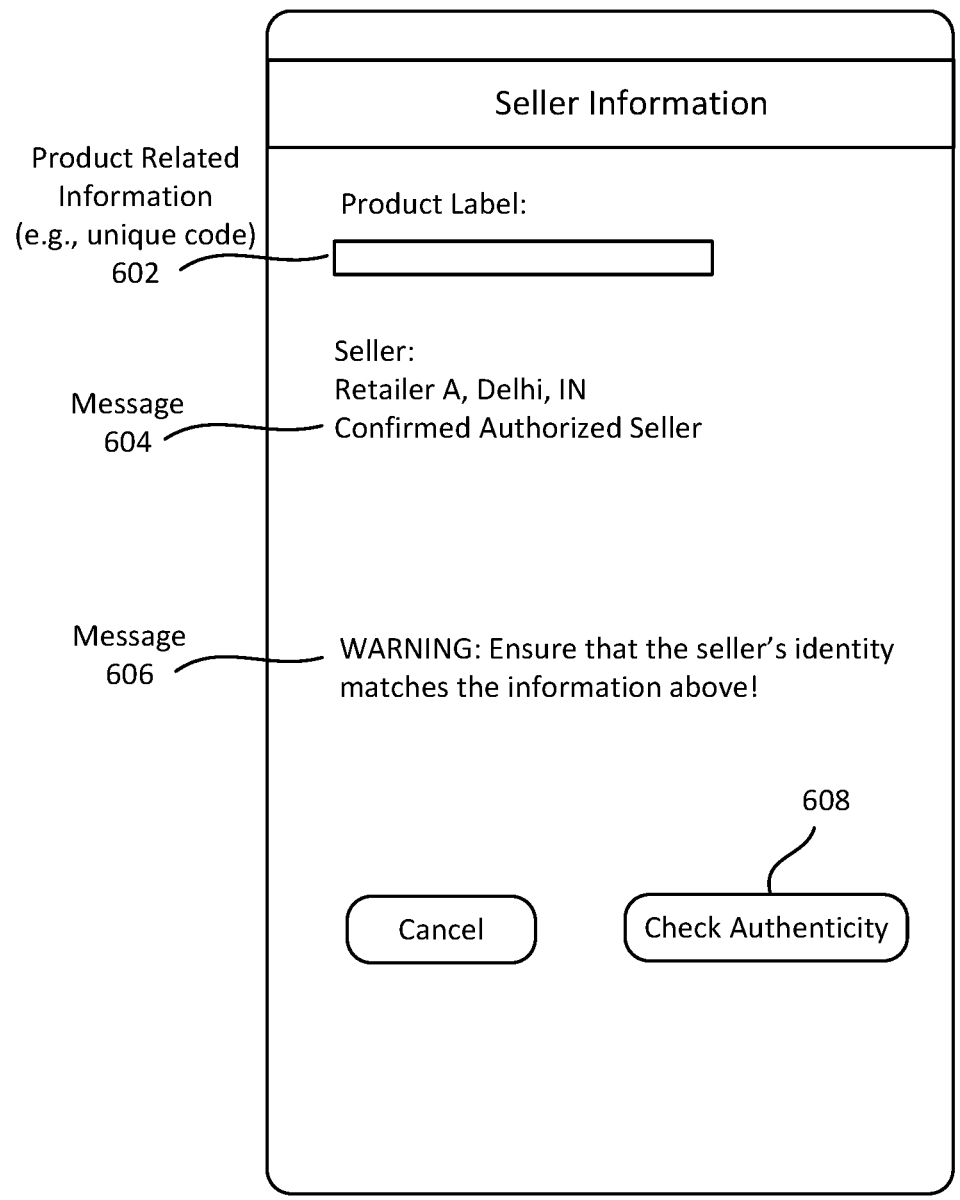
FIG. 9 illustrates a user interface displaying an option to check the authenticity of an item according to certain embodiments.

FIG. 9 shows a user interface displaying product related information 602 (e.g., the unique code generated for the product identifier), seller information (e.g., seller name, city/state, and country), a message 604 indicating that the retailer is an authorized seller, and a message requesting the user to confirm that the displayed information matches that of the retailer. The user interface of FIG. 9 further displays an option 608 to proceed with checking the authenticity of the item since at this point in time the authenticity of the item has not been fully determined.

At 416, authenticity system 102 sends a communication to the user computing device indicating the results of the verifications performed in 405, 412, and 414. The results can be communicated in a similar manner as in 216 of FIG. 2.

Figure 13:
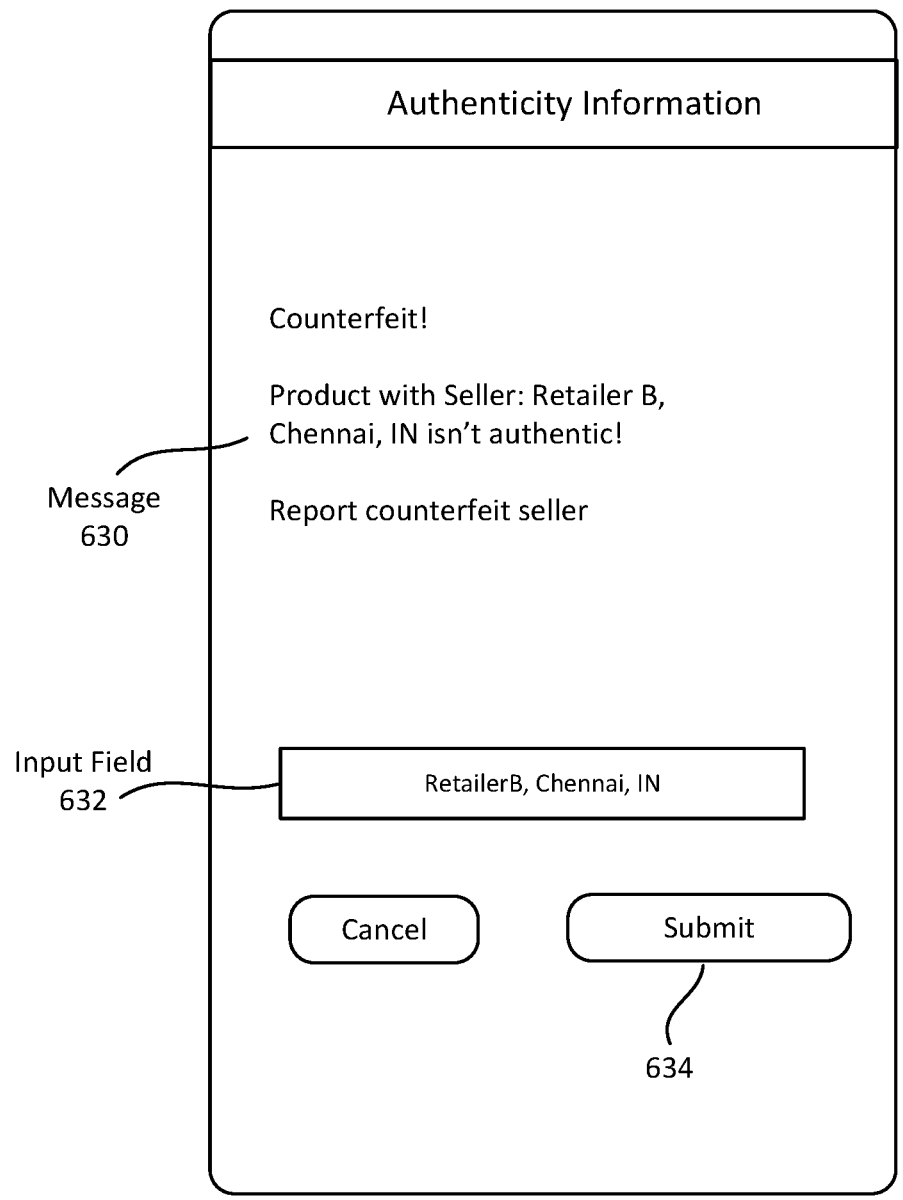
FIG. 13 illustrates a user interface displaying an option to report an unauthorized seller according to certain embodiments.
Figure 15:
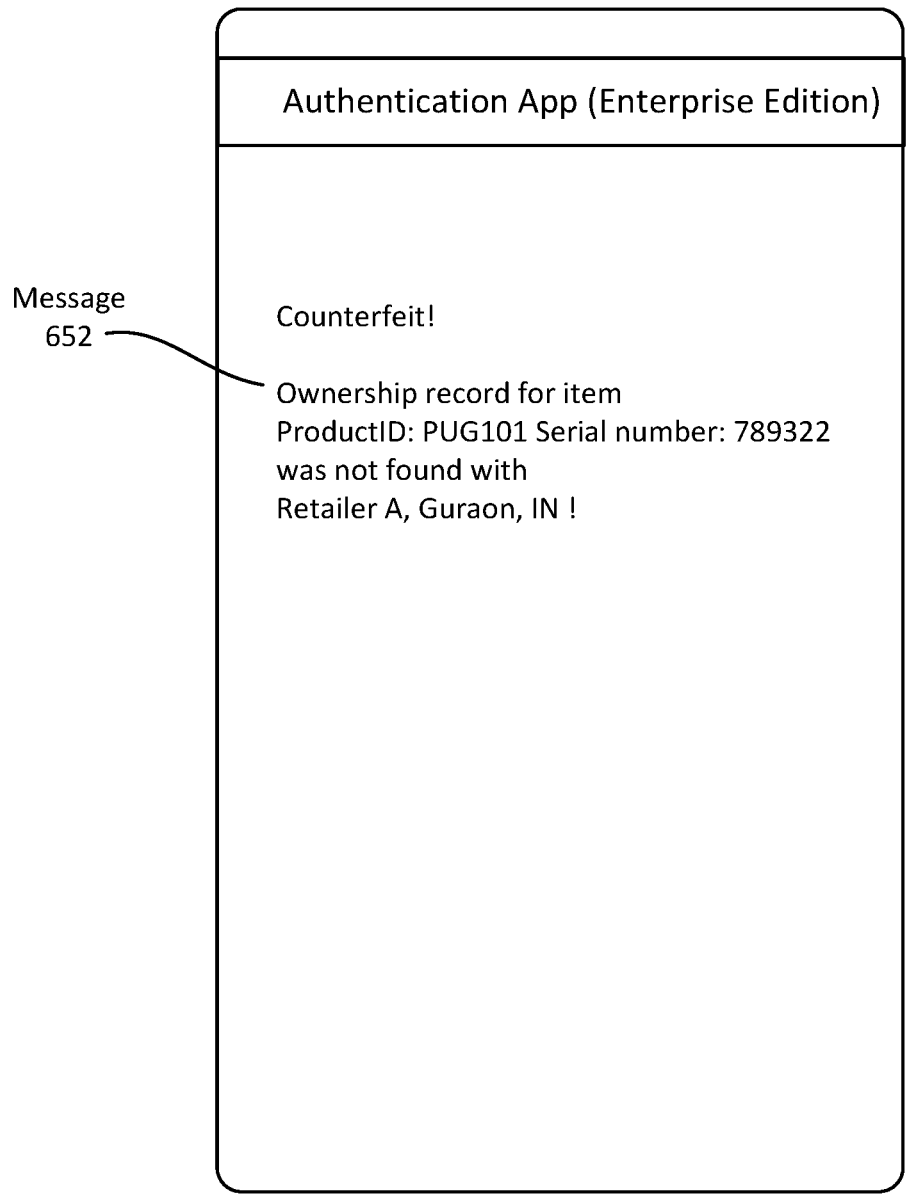
FIG. 15 illustrates a user interface confirming detection of a non-authentic item based on a database lookup according to certain embodiments.

If any of the verifications in 405, 412, and 414 fail, then authenticity verification is deemed to have failed and the authenticity system 102 may communicate a message to the user computing device indicating that the item in not authentic. The message can be displayed on a user interface provided by an authenticity verification application executing on a consumer's computing device (e.g., a message 630 as shown in FIG. 13) or executing on a retailer's computing device (e.g., a message 652 as shown in FIG. 15). The authenticity verification application may also provide an option to report the retailer (e.g., an input field 632 in combination with a submit option 634 in FIG. 13).

Figure 10:
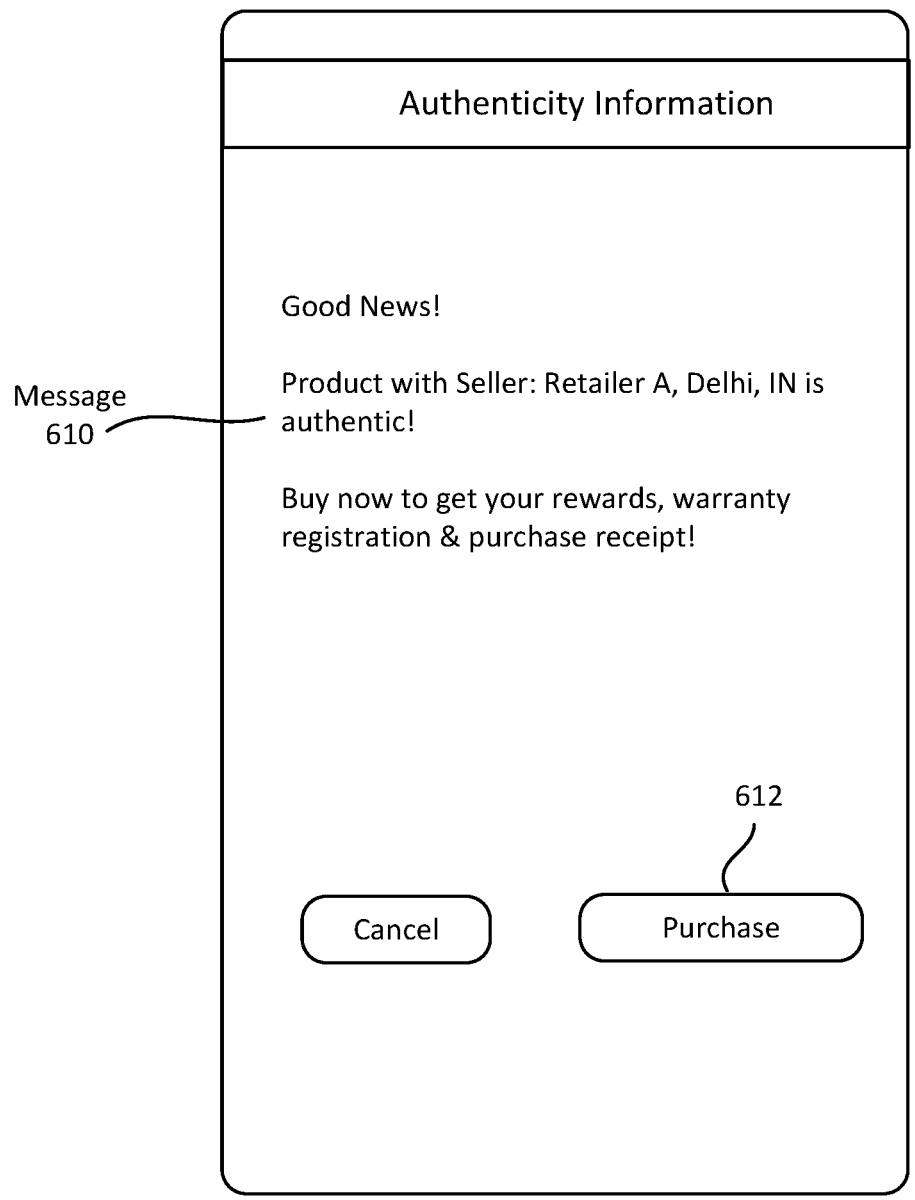
FIG. 10 illustrates a user interface displaying an option to proceed with purchasing an item after the authenticity of the item has been confirmed according to certain embodiments.

FIG. 10 shows an example of a user interface displaying a message 610 in response to the authenticity system 102 communicating that the item has been determined to be authentic (e.g., the communication in 416). The user interface in FIG. 10 may be provided by the authentication application executing on the user computing device and includes an option 612 to purchase the item.

At 418, the user may take action in response to the message received from authenticity system 102 in 416, which may be displayed in a user interface of the authenticity verification application executing on the user computing device. The action taken in 418 can be performed in a similar manner as in 218 of FIG. 2. For example, as part of the action performed in 418, the user may purchase the item using the authenticity verification application.

At 419, the user computing device may, in response to a checkout related action performed in 418, send a communication indicating that the user bought the item. The communication in 419 can be performed in a similar manner as the communication in 219 of FIG. 2.

If the user completes payment, the authenticity system 102 may, at 420, generate an authenticity certificate for the user. The generating of the authenticity certificate in 420 can be performed in a similar manner as in 220 of FIG. 2.

At 422, the authenticity system 102 communicates the authenticity certificate to the user computing device. The communication of the authenticity certificate in 422 can be performed in a similar manner as in 222 of FIG. 2.

Computer System

Figure 29:
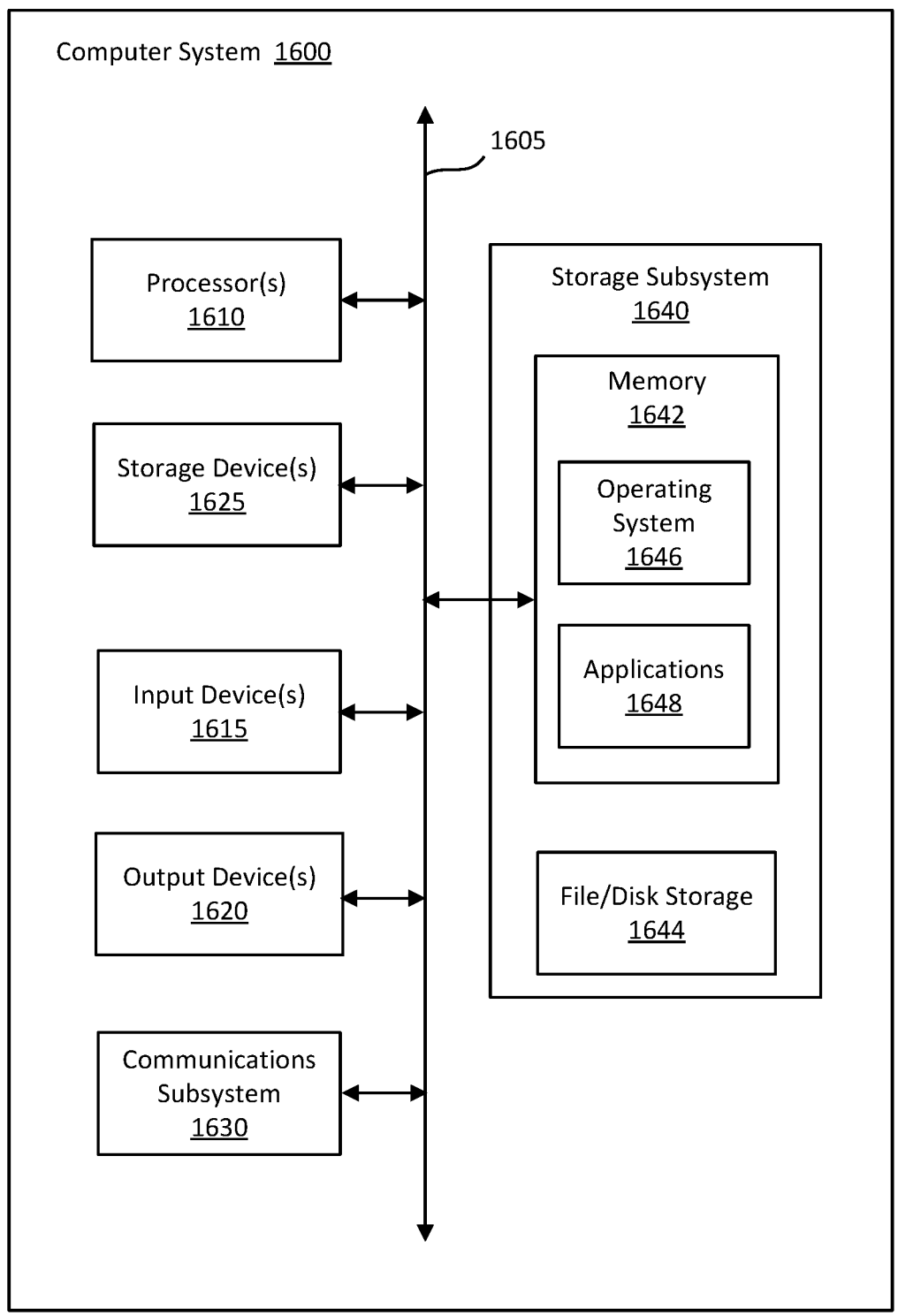
FIG. 29 is a simplified block diagram of a computer system that may be used to implement certain embodiments.

FIG. 29 is a simplified block diagram of a computer system 1600 that may be used to implement certain embodiments. For example, the computer system 1600 may be used to implement a computing device in FIG. 1, the authenticity system 102, or a node in FIG. 21.

Computer system 1600 can be of various types including, without limitation, a personal computer, a portable computer, a workstation, a network computer, a mainframe, a kiosk, a mobile device such as a PDA or cell phone, a physical network device (e.g., a router, switch), or any other data processing system. Due to the ever-changing nature of computers and networks, the description of computer system 1600 depicted in FIG. 29 is intended only as a specific example for purposes of illustrating the preferred embodiment of the computer system. Many other configurations having more or fewer components than the system depicted in FIG. 29 are possible.

As shown in FIG. 29, computer system 1600 may comprise several components that can be communicatively coupled via a bus 1605. The components may include one or more processors 1610, one or more input devices 1615, one or more output devices 1620, a communications subsystem 1630, storage devices 1625, and a storage subsystem 1640. Bus subsystem 1605 provides a mechanism for letting the various components and subsystems of computer system 1600 communicate with each other as intended. Although bus subsystem 1605 is shown schematically as a single bus, alternative embodiments of the bus subsystem may utilize multiple busses.

Processors 1610 represent the processing resources of computer system 1600 and may include without limitation one or more general-purpose processors and/or one or more special-purpose processors (such as digital signal processing chips, graphics acceleration processors, and/or the like). Processors 1610 may include one or more single or multi-core processors.

Input devices 1615 may include one or more different mechanisms for providing inputs to computer system 1600 such as, without limitation, a mouse, a keyboard, a touchpad, a tablet, a digital camera, a barcode scanner, and/or the like. Output devices 1620 may include one or more different mechanisms for outputting information from computer system 1600 such as, without limitation, a display unit, audio output devices, a printer, and/or the like.

Computer system 1600 may also include a communications subsystem 1630, which facilitates communications to and from computer system 1600. Communications subsystem 1630 can include without limitation a modem, a network card (wireless or wired), an infrared communication device, a wireless communication device and/or chipset (such as a Bluetooth® device, an 802.11 device, a WiFi device, a WiMax device, cellular communication facilities, etc.), and/or the like that facilitates communication of data. Communications subsystem 1630 enables computer system 1600 to receive and/or transmit data to one or more other computer systems (e.g., the authenticity system 102), one or more networks (e.g., the communication networks 110 in FIGS. 1 and 21 or the private network 920 in FIG. 21), and/or any other devices.

Storage subsystem 1640 provides a non-transitory medium for storing data and code (instructions) that can be executed by one or more processors 1610 for performing the various methods and processing described in this disclosure. For example, storage subsystem 1640 may be configured to store the basic programming and data constructs that provide the functionality of certain embodiments. According to certain embodiments, software code instructions or modules implementing the functions described in this disclosure may be stored in storage subsystem 1640. These software modules may be executed by one or more processor(s) 1610. Storage subsystem 1640 may also provide a repository for storing data used in accordance with certain embodiments. For example, in a computer system implementing a node, storage subsystem 1640 may provide a repository for storing transactions in a ledger.

In certain embodiments, storage subsystem 1640 may comprise a memory subsystem 1642 and a file/disk storage subsystem 1644. Memory subsystem 1642, sometimes also referred to as system memory, may include a number of memories such as a main random access memory (RAM) for storage of instructions and data during program execution, a read only memory (ROM) in which fixed instructions are stored, flash memory, and the like. Various software elements may be located within memory subsystem 1642 such as an operating system 1646, device drivers, executable libraries, and/or other code, such as one or more application programs 1648, which may comprise computer programs provided by various embodiments, and/or may be designed to implement methods, and/or configure systems, provided by other embodiments, as described herein.

File storage subsystem 1644 provides persistent (non-volatile) storage for program and data files, and may include a hard disk drive, a floppy disk drive along with associated removable media, a Compact Disk Read Only Memory (CD-ROM) drive, an optical drive, removable media cartridges, local and/or network accessible storage, and other like storage media and devices. As shown in FIG. 29, computer system 1600 may also include one or more storage devices 1625 that are part of computer system 1600 or are accessible by computer system 1600. The computer system 1600 may provide storage for one or more of the databases described earlier. For example, data entries in a ledger may be stored by file storage subsystem 1644, by storage devices 1625, or by some other storage device.

In the preceding figures, software components may be implemented by code or instructions that are executable by one or more processors. The code or instructions may be stored on a computer-readable medium and may be executed by one or more processors of one or more computer systems. The terms "machine-readable medium" and "computer-readable medium," as used herein, refer to any non-transitory medium that stores data and/or instructions (e.g., code, program) that cause one or more computer systems, machines, or processors to operate in a specific fashion and perform certain functions. In an embodiment implemented using computer system 1600, various computer-readable media might be involved in storing instructions/code that are/is executable by one or more processor(s) 1610. A computer-readable medium may be embodied in various forms such as non-volatile memory or volatile memory.

The methods, systems, and devices discussed above are examples and are not intended to be limiting. Various embodiments may omit, substitute, or add various procedures or components as appropriate. For instance, in alternative configurations, the methods described may be performed in an order different from that described, and/or various stages may be added, omitted, and/or combined. Features described with respect to certain embodiments may be combined in various other embodiments. Different aspects and elements of the embodiments may be combined in a similar manner. Technology evolves and, thus, many of the elements are examples that do not limit the scope of the disclosure to those specific examples.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the claimed embodiments. Rather, the preceding description of the embodiments will provide those skilled in the art with an enabling description for implementing claimed embodiments. Various changes may be made in the function and arrangement of elements without departing from the spirit and scope of the disclosure.

Although specific embodiments have been described, various modifications, alterations, alternative constructions, and equivalents are also encompassed within the scope of claimed embodiments. Embodiments are not restricted to operation within certain specific data processing environments, but are free to operate within a plurality of data processing environments. Additionally, although certain embodiments have been described using a particular series of transactions and steps, it should be apparent to those skilled in the art that the scope of the claimed embodiments is not limited to the described series of transactions and steps. Although some flowcharts describe operations as a sequential process, many of the operations can be performed in parallel or concurrently. In addition, the order of the operations may be rearranged. A process may have additional steps not included in the figure.

Further, while certain embodiments have been described using a particular combination of hardware and software, it should be recognized that other combinations of hardware and software are also within the scope of this disclosure. Certain embodiments may be implemented only in hardware, or only in software (e.g., code programs, firmware, middleware, microcode, etc.), or using combinations thereof. The various processes described herein can be implemented on the same processor or different processors in any combination. Where components, modules, systems, or devices are described as being configured to perform certain operations or functions, such configuration can be accomplished, e.g., by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof, and the like. Processes can communicate using a variety of techniques including but not limited to conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A computer-implemented method, comprising:
    receiving, by a computer system and through a computer network, information from a requester device, the information including an item identifier identifying an item;
    searching, by the computer system, a first database to determine that the item identifier exists in the first database, the first database storing a plurality of item identifiers, each item identifier of the plurality of item identifiers corresponding to an item whose authenticity is verifiable;
    identifying, by the computer system, a manufacturer based upon the item identifier;
    searching, by the computer system, a second database associated with the manufacturer to determine that the second database stores a first entry corresponding to the item identifier, the first entry indicating that the item identified by the item identifier is manufactured by the manufacturer;
    receiving, by the computer system, an entity identifier from the requester device, the entity identifier identifying an entity offering the item for sale;
    searching, by the computer system, the first database to determine that the first database stores an association between the entity and the manufacturer;
    searching, by the computer system, a third database associated with the entity to determine that the third database stores a second entry corresponding to the item identifier;
    determining, by the computer system, that the second entry contains information indicating that the item is available for sale by the entity;
    generating, by the computer system, a message indicating successful authenticity verification of the item due to the item being manufactured by the manufacturer, the entity being associated with the manufacturer, the second entry corresponding to the item identifier, and the second entry containing information indicating that the item is available for sale by the entity; and
    communicating, by the computer system and through the computer network, the message to the requester device.

2. The computer-implemented method of claim 1, wherein the information is received from the requester device after the information is captured as a machine-readable code by a software application executed on the requester device.

3. The computer-implemented method of claim 2, wherein the machine-readable code is a Quick Response (QR) code provided by the first entity.

4. The computer-implemented method of claim 2, wherein the machine-readable code is captured from an image displayed on a web site, the image being one of a plurality of images that are associated with the item and displayable through the web site.

5. The computer-implemented method of claim 1, wherein the information received from the requester device further comprises a unique identifier associated with the item identifier, the method further comprising:
    verifying, by the computer system and prior to identifying the manufacturer, that the unique identifier has an expected format.

6. The computer-implemented method of claim 5, further comprising:
    verifying, by the computer system, that in the first entry the item identifier is associated with the unique identifier.

7. The computer-implemented method of claim 5, further comprising:
verifying, by the computer system, that in the second entry the item identifier is associated with the unique identifier.

8. The computer-implemented method of claim 1, further comprising:
receiving, by the computer system, a first time-based code from the requester device, the first time-based code being generated by a computer system associated with the entity;
generating, by the computer system, a second time-based code; and
comparing, by the computer system, the first time-based code to the second time-based code to determine that the first time-based code matches the second time-based code.

9. The computer-implemented method of claim 8, wherein the first time-based code and the second time-based code are generated as a function of information associated with the item, the information associated with the item comprising the item identifier.

10. The computer-implemented method of claim 1, further comprising:
searching, by the computer system, a fourth database to determine that the fourth database stores a record of a transaction in which the item was transferred to the entity.

11. The computer-implemented method of claim 10, further comprising:
verifying, by the computer system, that the fourth database stores a plurality of records indicative of a chain of ownership leading from the manufacturer to the entity.

12. The computer-implemented method of claim 10, wherein the record of the transaction comprises a cryptographic hash generated based on details of the transaction.

13. The computer-implemented method of claim 1, further comprising:
verifying, by the computer system, that the item is marked as sold in the first entry.

14. The computer-implemented method of claim 1, further comprising:
receiving, by the computer system and after communicating the message to the requester device, information indicating completion of a transaction transferring ownership of the item from the entity to a user associated with the requester device;
generating, by the computer system, an authenticity certificate based on details of the transaction; and
communicating, by the computer system, the authenticity certificate to the requester device.

15. A system comprising:
one or more processors; and
a memory coupled to the one or more processors, the memory storing a plurality of instructions that, when executed by the one or more processors, causes the one or more processors to perform processing comprising:
receiving, through a computer network, information from a requester device, the information including an item identifier identifying an item;
searching a first database to determine that the item identifier exists in the first database, the first database storing a plurality of item identifiers, each item identifier of the plurality of item identifiers corresponding to an item whose authenticity is verifiable;
identifying a manufacturer based upon the item identifier;
searching a second database associated with the manufacturer to determine that the second database stores a first entry corresponding to the item identifier, the first entry indicating that the item identified by the item identifier is manufactured by the manufacturer;
receiving an entity identifier from the requester device, the entity identifier identifying an entity offering the item for sale;
searching the first database to determine that the first database stores an association between the entity and the manufacturer;
searching a third database associated with the entity to determine that the third database stores a second entry corresponding to the item identifier;
determining that the second entry contains information indicating that the item is available for sale by the entity;
generating a message indicating successful authenticity verification of the item due to the item being manufactured by the manufacturer, the entity being associated with the manufacturer, the second entry corresponding to the item identifier, and the second entry containing information indicating that the item is available for sale by the entity; and
communicating, through the computer network, the message to the requester device.

16. The system of claim 15, wherein the information is received from the requester device as a machine-readable code.

17. The system of claim 15, wherein the information received from the requester device further comprises a unique identifier associated with the item identifier, and wherein the plurality of instructions, when executed by the one or more processors, further causes the one or more processors to perform processing comprising:
verifying, prior to identifying the manufacturer, that the unique identifier has an expected format.

18. The system of claim 17, wherein the plurality of instructions, when executed by the one or more processors, further causes the one or more processors to perform processing comprising:
verifying that in the first entry the item identifier is associated with the unique identifier; and
verifying that in the second entry the item identifier is associated with the unique identifier.

19. The system of claim 15, wherein the plurality of instructions, when executed by the one or more processors, further causes the one or more processors to perform processing comprising:
receiving a first time-based code from the requester device, the first time-based code being generated by a computer system associated with the entity;
generating a second time-based code; and
comparing the first time-based code to the second time-based code to determine that the first time-based code matches the second time-based code.

20. A non-transitory computer-readable memory storing a plurality of instructions executable by one or more processors, the plurality of instructions comprising instructions that when executed by the one or more processors causes the one or more processors to perform processing comprising:
receiving, through a computer network, information from a requester device, the information including an item identifier identifying an item;

searching a first database to determine that the item identifier exists in the first database, the first database storing a plurality of item identifiers, each item identifier of the plurality of item identifiers corresponding to an item whose authenticity is verifiable;

identifying a manufacturer based upon the item identifier;

searching a second database associated with the manufacturer to determine that the second database stores a first entry corresponding to the item identifier, the first entry indicating that the item identified by the item identifier is manufactured by the manufacturer;

receiving an entity identifier from the requester device, the entity identifier identifying an entity offering the item for sale;

searching the first database to determine that the first database stores an association between the entity and the manufacturer;

searching a third database associated with the entity to determine that the third database stores a second entry corresponding to the item identifier;

determining that the second entry contains information indicating that the item is available for sale by the entity;

generating a message indicating successful authenticity verification of the item due to the item being manufactured by the manufacturer, the entity being associated with the manufacturer, the second entry corresponding to the item identifier, and the second entry containing information indicating that the item is available for sale by the entity; and communicating, through the computer network, the message to the requester device.

* * * * *